(12) United States Patent
Hu et al.

(10) Patent No.: US 12,539,728 B2
(45) Date of Patent: Feb. 3, 2026

(54) MULTI-DEGREE-OF-FREEDOM ACTIVE DAMPING MECHANISM CONTROL METHOD, SYSTEM, AND DAMPING MECHANISM

(71) Applicant: Ningbo Gauss Robot Co., Ltd., Ningbo (CN)

(72) Inventors: Jingchen Hu, Ningbo (CN); Zhiqing Li, Ningbo (CN); Hanxin Qian, Ningbo (CN); Miao Chen, Ningbo (CN); Qiyin Guo, Ningbo (CN)

(73) Assignee: Ningbo Gauss Robot Co., Ltd., Ningbo (CN)

( * ) Notice: Subject to any disclaimer, the term of this patent is extended or adjusted under 35 U.S.C. 154(b) by 119 days.

(21) Appl. No.: 18/371,511

(22) Filed: Sep. 22, 2023

(65) Prior Publication Data
US 2024/0181828 A1 Jun. 6, 2024

(30) Foreign Application Priority Data
Nov. 18, 2022 (CN) .......................... 202211445250.7
Dec. 19, 2022 (CN) .......................... 202211631708.8
(Continued)

(51) Int. Cl.
*B60G 17/0165* (2006.01)
*B60G 17/015* (2006.01)

(52) U.S. Cl.
CPC ..... *B60G 17/0165* (2013.01); *B60G 17/0157* (2013.01); *B60G 2202/42* (2013.01);
(Continued)

(58) Field of Classification Search
CPC ............ B60G 17/0157; B60G 17/0165; B60G 17/033; B60G 2202/42; B60G 2400/821; B60G 2600/182; B60G 2600/1873
(Continued)

(56) References Cited

U.S. PATENT DOCUMENTS 10,486,485 B1 * 11/2019 Levinson ............ B60G 17/0162
11,130,382 B2 * 9/2021 Nong ..................... B60G 17/06
(Continued)

OTHER PUBLICATIONS

L.V.V. Gopala Rao, S. Narayanan, "Preview control of random response of a half-car vehicle model traversing rough road", Sep. 27, 2007, Journal of Sound and Vibration, 310 (2008), pp. 352-365.*

(Continued)

*Primary Examiner* — Erick R Solis
(74) *Attorney, Agent, or Firm* — JCIPRNET

(57) ABSTRACT

A multi-degree-of-freedom active damping mechanism control method, system and a damping mechanism are provided. A skyhook active damping control algorithm is used for controlling an electric cylinder output force in a vertical damping direction, and an adaptive control algorithm with an adaptive rate is used for correcting a load moment of inertia in pitch and roll damping directions. At the same time, a predictive model is established according to a task space linearization equation near an equilibrium point, and states of the system at N future moments are predicted in advance at each moment to achieve optimal control under complex constraints and reduce the influence of system delay. At the same time, the three control methods may further improve the active damping effect of the damping device by combining road information obtained by a visual sensor in real time.

19 Claims, 23 Drawing Sheets

(30) Foreign Application Priority Data

Feb. 16, 2023 (CN) .......................... 202310123613.3
Mar. 17, 2023 (CN) .......................... 202310258591.1
 Jul. 3, 2023 (CN) .......................... 202310810232.2

(52) U.S. Cl.
CPC .... *B60G 2400/823* (2013.01); *B60G 2500/10* (2013.01); *B60G 2600/182* (2013.01); *B60G 2600/1873* (2013.01); *B60G 2600/60* (2013.01)

(58) Field of Classification Search
USPC ...................................................... 701/38, 40
See application file for complete search history.

(56) References Cited

U.S. PATENT DOCUMENTS

2020/0317018 A1* 10/2020 Nong ...................... G05D 1/027
2023/0286347 A1*  9/2023 Zhao .................... B60G 17/018

OTHER PUBLICATIONS

Johan Theunissen et al, "Preview-based techniques for vehicle suspension control: a state-of-the-art review", Jun. 8, 2021, Annual Reviews in Control, vol. 51, 2021, pp. 206-235.*

* cited by examiner

MULTI-DEGREE-OF-FREEDOM ACTIVE DAMPING MECHANISM CONTROL METHOD, SYSTEM, AND DAMPING MECHANISM

CROSS REFERENCE TO THE RELATED APPLICATIONS

This application is based upon and claims priority to Chinese Patent Applications No. 202310258591.1, filed on Mar. 17, 2023; No. 202310123613.3, filed on Feb. 16, 2023; No. 202211631708.8, filed on Dec. 19, 2022; No. 202211445250.7, filed on Nov. 18, 2022; and No. 202310810232.2, filed on Jul. 3, 2023; the entire contents of which are incorporated herein by reference.

TECHNICAL FIELD

The present invention relates to the technical field of active damping, in particular to a multi-degree-of-freedom active damping mechanism control method, system, and damping mechanism.

BACKGROUND

At present, active damping devices are commonly used in carrying devices on the market. Passive damping methods are mostly used for reducing the impact of high-frequency vibration on the people and goods carried. However, the passive damping methods do not have a good damping effect for the vibration with large amplitude in the low frequency band. In a case of poor road quality, it will cause great damage to the carried wounded and goods, especially in the present application scenarios like military rescue vehicles, road bumpiness and fluctuation are serious, and it is difficult to achieve effective damping effect only by passive damping, which may threaten the life safety of the wounded.

When moving vehicles, vessels and other moving carriers encounter road bumpiness or sea bumpiness during driving, the active damping mechanism mostly adopts acceleration compensation damping method, but this method ignores the influence produced when the attitude of damping mechanism changes, resulting in unsatisfactory damping effect.

In addition, the configuration of a typical damping mechanism does not ensure that the center of a tabletop does not move in a plane while reducing pitching and rolling, and its damping efficiency is always limited. In a case of high-frequency vibration, it is difficult for a reaction velocity of a driving device of an active damping mechanism to follow the road excitation in an environment of bumpiness, and there is a hysteresis in the posture balance, so it is difficult to achieve the desired damping effect.

Under dynamic control of the active damping mechanism, a dynamics model of a parallel robot is often needed, while an imprecise dynamics model often leads to poor control effect, and the precise dynamics model is complex, which is not suitable for embedded systems requiring real time.

In a working scene of mobile carrying device such as a vehicle and a vessel, it often occurs that the driving process is too bumpy to affect the smoothness of the mobile carrying device, such as road bumpiness during driving and resistance to wave bumpiness during shipping, resulting in carsickness or seasickness of people on the carrying device, damage to articles, etc. In order to solve this problem, a damping device is generally used for automatically compensating inertial rotation and inertial displacement caused by bump, acceleration and braking of the carrying device in real time to make the articles and personnel on the carrying device in a stable state and reduce the risks in the transportation process. Most of the existing damping devices are a passive damping type, such as hydraulic devices or spring devices, but these damping devices have a slow response speed, and the damping effect is not obvious under high-frequency vibration.

With the development of autonomous driving and assistant driving technology, the present application of visual sensors (multi-camera, depth camera, laser radar, millimeter wave radar, etc.) on vehicles is more and more popular, and the related visual perception algorithms are more and more mature. It has become a new trend to use visual sensors to detect the obstacle and fluctuation information of the road ahead of the vehicle in advance and dynamically adjust the vehicle suspension system, such as a predictive suspension system of Audi A8. However, at present, the vehicle suspension is basically passive and semi-active suspension, such as controllable electrorheological, controllable magnetorheological, adjustable air spring, hydro-pneumatic suspension, etc. and the active suspension technology is still immature, which cannot achieve perfect damping effect.

Therefore, how to improve the damping effect and stability of the active damping mechanism is of great significance.

SUMMARY

For the deficiencies of the prior art, the present invention provides a multi-degree-of-freedom active damping mechanism control method, system, and damping mechanism.

According to the present invention, a multi-degree-of-freedom active damping mechanism control method, system, and damping mechanism is provided by the present invention, and the solution is as follows:

in a first aspect, a multi-degree-of-freedom active damping mechanism control method is provided, which specifically comprises:
Step S1: acquiring information about a road segment in front of a carrier in real time via a visual sensor;
Step S2: processing the information about the road segment to obtain a time-domain signal curve of the road segment ahead;
Step S3: acquiring predicted vibration information about a carrier according to a predictive model and the time-domain signal curve; and
Step S4: sending the control instruction in advance to perform active damping according to the predicted vibration information.

Preferably, the step S1 specifically comprises: acquiring a maximum field-of-view distance and a minimum field-of-view distance of the visual sensor according to a mounting position of the visual sensor and an advancing direction of the carrier while the carrier is traveling;
obtaining a field-of-view width of the visual sensor according to the maximum field-of-view distance and the minimum field-of-view distance;
acquiring the information about the road segment within the field-of-view width in real time;
the step S2 specifically comprises:
processing the information about the road segment by a computer vision technology to identify obstacle information and fluctuation information about the road segment ahead;
acquiring a longest predictive time according to a velocity of the carrier and the maximum field-of-view distance, wherein the longest predictive time is greater than a delay time of a multi-dimensional active damping device; and acquiring the time-domain signal curve of the road segment ahead according to the velocity of the carrier, the longest predictive time, and the obstacle information and the fluctuation information about the road segment;

the step S3 specifically comprises:

obtaining, according to a carrier dynamics model, the predicted vibration information within the longest predictive time by combining the time-domain signal curve, wherein the predicted vibration information comprises vertical displacement, a pitch angle, a roll angle and a corresponding velocity and acceleration information of the carrier;

the step S4 specifically comprises:

acquiring a delay time of active damping of the multi-dimensional active damping device; and sending the control instruction in advance to perform active damping according to the delay time, wherein the delay time comprises a software delay and a mechanical delay.

Preferably, after sending the control instruction in advance to perform active damping according to the predicted vibration information, further comprising:

reading actual vibration information about the carrier in real time according to an inertial navigation unit mounted on the carrier; and comparing the actual vibration information with the predicted vibration information and adjusting the predictive model.

Preferably, acquiring a pitch angle and a roll angle of a vessel in real time during operation of the vessel comprises:

Step a1: acquiring actual vibration information about a vessel body deck;

Step a2: calculating the pitch angle and the roll angle by an attitude solution algorithm according to the actual vibration information;

wherein in Step a1, the actual vibration information comprises triaxial acceleration information and triaxial angular velocity information, the triaxial acceleration information is detected by a triaxial accelerometer, and the triaxial angular velocity information is detected by a triaxial gyroscope;

The Step a2 specifically comprises the following steps:

Step a2.1: eliminating deviation and noise in the vibration information by a filtering algorithm;

Step a2.2: performing attitude solution by a complementary filtering algorithm to obtain the pitch angle and the roll angle according to the vibration information obtained after eliminating the deviation and noise;

wherein the performing attitude solution by a complementary filtering algorithm specifically comprises the following steps:

Step b 1: calculating a gravity acceleration direction according to the filtered gyroscope data, wherein the calculation formula is:

$$vg_{est} = \begin{bmatrix} 2(q_1q_3 - q_0q_2) \\ 2(q_0q_1 + q_2q_3) \\ 1 - 2(q_1^2 + q_2^2) \end{bmatrix},$$

wherein $q=[q_0, q_1, q_2, q_3]$, q is a unit quaternion, and $q_0$, $q_1$, $q_2$, and $q_3$ are components of the unit quaternion q;

Step b2: calculating the gravity acceleration direction according to the filtered acceleration data $a_x$, $a_y$, and $a_z$, wherein the calculation formula is as follows:

$$vg = \frac{1}{\sqrt{a_x^2 + a_y^2 + a_z^2}} \begin{bmatrix} a_x \\ a_y \\ a_z \end{bmatrix},$$

wherein $a_x$, $a_y$, and $a_z$ are accelerations in three directions measured by an accelerometer, and $v_g$ is a value obtained from acceleration normalization;

Step b3: calculating an attitude direction error, wherein the calculation formula is:

error=$vg_{est}$×$vg$, wherein error is a value of the attitude direction error;

Step b4: calculating to obtain an attitude of the gyroscope, wherein the calculation formula is:

$vg_{new}=vg_{est}+k_p$error−best, wherein best is an integral form of error, and $k_p$ is an error proportion coefficient;

Step b5: updating a quaternion in step 1 according to the filtered gyroscope angular velocity data $\omega_x$, $\omega_y$, and $\omega_z$:

$$q_0 = q_0 + \dot{q}dt = q_0 + \frac{1}{2}(-\omega_x q_1 - \omega_y q_2 - \omega_z q_3)dt,$$

wherein $\omega_x$, $\omega_y$, $\omega_z$ are gyroscope measurements;

Step b6: calculating the roll angle and the pitch angle from the updated quaternions.

Preferably, applied to a multi-degree-of-freedom active damping mechanism, wherein an upper platform coordinate system of the multi-degree-of-freedom active damping mechanism relatively moves in three degrees-of-freedom in roll, pitch, and vertical directions with respect to an inertial coordinate system, comprising:

correcting the load moment of inertia of the multi-degree-of-freedom active damping mechanism in pitch and roll damping directions according to an adaptive control algorithm with a preset adaptation rate;

calculating an electric cylinder output force in a skyhook active damping control algorithm adopted by the multi-degree-of-freedom active damping mechanism in a vertical damping direction; and comprehensively controlling the multi-degree-of-freedom active damping mechanism to perform active damping according to the corrected load moment of inertia and the electric cylinder output force.

Preferably, the multi-degree-of-freedom active damping mechanism adopts a skyhook active damping control algorithm combined with a double-motor synchronous force control scheme in the vertical damping direction, and a spring damper, a first output electric cylinder and a second actuator are arranged between an upper platform and a lower platform of the multi-degree-of-freedom active damping mechanism.

The calculating an electric cylinder output force in a skyhook active damping control algorithm adopted by the multi-degree-of-freedom active damping mechanism in a vertical damping direction specifically comprises:

respectively calculating an electric cylinder output force of the first electric cylinder and an equivalent actuator output force of the second actuator in the skyhook active damping control algorithm;

wherein the calculating an electric cylinder output force in a skyhook active damping control algorithm adopted by the multi-degree-of-freedom active damping mechanism in a vertical damping direction comprises: 1) or 2);

1) the formula is as follows:

$$F_{di}=-k_s(x_s-x_t)-c_s(\dot{x}_s-\dot{x}_f)+F_a;$$

wherein $x_s$ is displacement of the upper platform of the multi-degree-of-freedom active damping mechanism, $x_t$ is displacement of a lower platform of the multi-degree-of-freedom active damping mechanism, $k_s$ is an elastic coefficient of the spring damper, $c_s$ is a damping coefficient of the spring damper, and the equivalent actuator output force is $F_a$;

2) the formula is as follows:

$$F_a=-c_{sky}\dot{x}_s;$$

wherein $c_{sky}$ is a skyhook damping coefficient.

Preferably, the correcting the load moment of inertia of the multi-degree-of-freedom active damping mechanism in pitch and roll damping directions according to an adaptive control algorithm with a preset adaptation rate specifically comprising:

presetting an adaptation rate of the adaptive control algorithm as follows:

$$u=[\hat{J}\ddot{\theta}_r+B\dot{\theta}_r+G(\theta)]-K_Ds;$$

wherein u is an external force applied at a rotational axis of a degree of freedom, $B\dot{\theta}_r$ is a Coriolis force, a centrifugal force, and a viscous friction; $G(\theta)$ is gravity moment and coulomb friction; J is a load moment of inertia at the rotational axis of the degree of freedom, $K_D$ is a velocity error feedback coefficient, and $\dot{\theta}_r$ and $\ddot{\theta}_r$ are a first reference variable and a second reference variable respectively, $s=\dot{\theta}-\dot{\theta}_r$.

the load moment of inertia of the multi-degree-of-freedom active damping mechanism in the pitch and roll damping directions is corrected;

the first reference variable is calculated as follows:

$$\dot{\theta}_r=\dot{\theta}_d-\lambda e_\theta;$$

the second reference variable is calculated as follows:

$$\ddot{\theta}_r=\ddot{\theta}_d-\lambda \dot{e}_\theta$$

presetting an adaptive law of the moment of inertia as follows:

$$\hat{J} = -\frac{\ddot{\theta}_r}{W};$$

wherein W is an adaptive coefficient.

Preferably, vibration inertia of the multi-degree-of-freedom active damping mechanism in three degrees-of-freedom in roll, pitch, and vertical directions is measured according to an inertial navigation unit respectively provided to the upper and lower platforms of the multi-degree-of-freedom active damping mechanism.

Preferably, the multi-degree-of-freedom active damping mechanism comprises: upper and lower platforms, wherein centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising:

acquiring pose information about the upper and lower platforms respectively, wherein the pose information comprises a pitch angular velocity, a roll angular velocity, and a vertical velocity;

respectively calculating a spinor equation of a central point of the upper platform, a first articulation point and a second articulation point, wherein the spinor equation comprises a velocity spinor equation and a force spinor equation, the first articulation point is a connection point of the active coupling mechanism and the upper platform, and the second articulation point is a connection point of the active coupling mechanism and the lower platform and a connection point of the passive coupling mechanism and the lower platform;

dynamically modeling the damping mechanism according to the spinor equation to obtain a dynamics model of the damping mechanism;

calculating a control force of the driving mechanism, i.e., an electric cylinder output force, from the pose information of the upper and lower platforms and the dynamics model; and controlling the active coupling mechanism according to the control force to adjust the pose information of the upper platform.

Preferably, calculating the electric cylinder output force from the pose information and the dynamics model comprises:

calculating a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;

calculating a vertical error value between the lower and upper platforms according to the vertical velocities of the upper and lower platforms, wherein the vertical error value comprises vertical displacement difference, a vertical velocity difference and a vertical acceleration difference;

substituting the pitch angle difference, the roll angle difference, the pitch angular velocity difference, the roll angular velocity difference, the pitch angle acceleration difference, the roll angle acceleration difference, and the vertical error value into the dynamics model to calculate to obtain the electric cylinder output force;

wherein the calculating a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms comprises:

calculating a pitch angle and a roll angle of the upper and lower platforms and a pitch angle acceleration and a roll angle acceleration of the lower platform according to the pitch angular velocity and the roll angular velocity of the upper and lower platforms;

calculating the pitch angle difference, the roll angle difference, the pitch angular velocity difference and the roll angular velocity difference between an upper platform and a lower platform according to the pitch angle, the roll angle, the pitch angular velocity and the roll angular velocity of the upper and lower platforms;

calculating the pitch angle acceleration difference between an upper platform and a lower platform using a proportional integral (PI) control algorithm according to the pitch angle acceleration, the pitch angle, and the pitch angle acceleration of the lower platform;

calculating the roll angle acceleration difference between an upper platform and a lower platform using the PI control algorithm according to the roll angle acceleration, the roll angle, and the roll angular velocity of the lower platform;

the calculating a vertical error value between the lower and upper platforms according to the vertical velocities of the upper and lower platforms comprises:

calculating vertical displacement of the upper and lower platforms and a vertical acceleration of the lower platform according to the vertical velocities of the upper and lower platforms;

calculating the vertical displacement difference and the vertical velocity difference between the lower and upper platforms according to the vertical velocities and the vertical displacement of the upper and lower platforms; and calculating the vertical acceleration difference between the lower and upper platforms using a skyhook damping control algorithm according to the vertical acceleration of the lower platform, the vertical velocity of the upper platform, the vertical displacement difference, and the vertical velocity difference.

Preferably, the dynamically modeling the damping mechanism according to the spinor equation to obtain a dynamics model of the damping mechanism comprises:

dynamically modeling the damping mechanism according to the following formula:

$$\dot{q}^T(F-F_f)\delta t + \left[\sum_{i=1}^{4}(T_{P_i}^T W_{P_i}) + \sum_{i=1}^{5}(T_{D_i}^T W_{D_i}) + T_P^T W_P\right]\delta t = 0;$$

wherein $\dot{q}$ is a driving linear velocity of the coupling mechanism, F is an electric cylinder output force vector, $F_f$ is an electric cylinder friction vector, $T_{P_i}$ is a velocity spinor of the first articulation point, $W_{P_i}$ is a force spinor of the first articulation point, $T_{D_i}$ is a velocity spinor of the second articulation point, $W_{D_i}$ is a force spinor of the second articulation point, $T_P$ is a velocity spinor of the central point of the upper platform, and $W_P$ is a force spinor of the upper platform central point;

obtaining the dynamics model of the damping mechanism by combining an inverse Jacobian matrix according to the formula.

Preferably, the spinor equations for the upper platform central point, the first articulation point and the second articulation point are calculated separately, comprising:

establishing a satellite coordinate system according to a central point of the lower platform;

calculating the velocity spinor equation of the central point of the upper platform according to the velocity and angular velocity of the central point of the upper platform;

calculating the force spinor equation of the central point of the upper platform according to a unit vector in a telescopic direction of the passive coupling mechanism and the acceleration, angular velocity and angular acceleration of the central point of the upper platform;

calculating an angular velocity and a driving linear velocity of the active coupling mechanism according to a unit vector in a telescopic direction of the active coupling mechanism, the velocity of the central point of the upper platform, the angular velocity of the central point of the upper platform, and coordinates of the first articulation point in the satellite coordinate system;

calculating an angular acceleration of the active coupling mechanism according to the angular velocity and the driving linear velocity of the active coupling mechanism and the acceleration of the central point of the upper platform;

calculating the velocity spinor equations of the first articulation point and the second articulation point according to a velocity of the first articulation point and the angular velocity of the active coupling mechanism; and calculating a force spinor equation of the first articulation point and the second articulation point from an acceleration of the first articulation point, the angular velocity of the active coupling mechanism, the angular acceleration of the active coupling mechanism, the unit vector in the telescopic direction of the active coupling mechanism, and a mass parameter of the damping mechanism.

Preferably, the controlling the active coupling mechanism according to the control force to adjust the pose information of the upper platform comprises:

acquiring current pose information about the upper platform in real time; and adjusting the electric cylinder output force according to the pose information of the lower platform and the current pose information.

Preferably, the method comprises the specific steps of:

S100: performing kinematic and dynamic analysis on a multi-dimensional damping device, establishing a linear dynamics equation near an equilibrium point, and establishing a predictive model according to the linear dynamics equation;

S200: estimating an output quantity of a predictive time domain by controlling the control quantity of the time-domain according to the predictive model, setting an optimization objective according to a control objective that the output quantity of the predictive time domain is close to an expected trajectory, setting constraints, and determining an optimization problem of the control quantity;

S300: determining the expected trajectory according to pose information about the carrying device at time t;

S400: solving the optimization problem to determine an optimal control quantity sequence, and taking the first value in the sequence as an actual control quantity at the current moment to control the multi-dimensional damping device;

S500: t=t+1, returning to S300.

Preferably, the linear dynamics equation near the equilibrium point in S100 is:

$$M_0\ddot{\varphi}+C_0\dot{\varphi}+K_0\varphi=J_0^T u$$

wherein $\varphi$ is a task space coordinate, $\dot{\varphi}$ is a task space velocity, $M_0$ is a task space mass matrix at the equilibrium point, $C_0$ is a task space damping matrix at the equilibrium point, $K_0$ is a task space stiffness matrix at the equilibrium point, $J_0$ is a Jacobian matrix at the equilibrium point, and u is a control force;

the predictive model established according to the linear dynamics equation is:

$$Y_p(t+1|t)=S_x\Delta x(t)+S_y y(t)+S_u\Delta U_m(t)$$

wherein $Y_p(t+1|t)$ is an output sequence vector for predicting N future moments at time t, $\Delta U_m(t)$ is an input sequence vector for predicting m future moments at time t, and $S_x$, $S_y$, and $S_u$ are parameter matrixes;

S200: the estimating an output quantity of a predictive time domain by controlling the control quantity of the time-domain according to the predictive model, setting an optimization objective according to a control objective that the output quantity of the predictive time domain is close to an expected trajectory comprises:

S201: determining the optimization objective as $$J(x(t),\Delta U_m(t))=\|\Gamma_y[Y_p(t+1|t)-R(t+1)]\|^2+\|\Gamma_u\Delta U_m(t)\|^2$$

wherein R(t+1) an expected trajectory point vector; $\Gamma_y$ is an output weight matrix; and $\Gamma_u$ is an input weight matrix;

S202: obtaining an equivalent objective value of the optimization objective according to the predictive model $$\bar{J}(x(t),\Delta U_m(t))=\Delta U_m(t)^T H\Delta U_m(t)+G(t+1|t)^T\Delta U_m(t)$$

wherein $$H=S_u^T\Gamma_y^T\Gamma_y S_u+\Gamma_u^T\Gamma_u$$

$$G(t+1|t)=2S_u^T\Gamma_y^T\Gamma_y[Y_p(t+1|t)-R(t+1)]$$

the constraints include, but are not limited to, travel limits, motion space limits, and execution mechanism power/output limits;

the optimization problem is determined as $$\min_{\Delta U_m(t)} \Delta U_m(t)^T H\Delta U_m(t) + G(t+1|t)^T\Delta U_m(t)$$

$$\text{s.t. } L\Delta U_m(t) \leq b$$

S300: the determining the expected trajectory according to pose information about the carrying device at time t comprises:

measuring the pose information of the carrying device at time t using the inertial navigation unit, taking the position and velocity in the corresponding dimension of the damping device task space as an input pose quantity $r_{In}$, and setting the expected trajectory as $r(t)=-r_{In}$;

After the measuring the pose information of the carrying device at time t using the inertial navigation unit, further comprising: filtering the obtained pose information by a multi-sensor perception fusion algorithm.

In a second aspect, a multi-degree-of-freedom active damping mechanism control system is provided, which comprises:

an information acquisition module configured to acquire information about a road segment in front of a carrier in real time via a visual sensor;

an information processing module configured to process the information about the road segment to obtain a time-domain signal curve of the road segment ahead;

a predictive module configured to acquire predicted vibration information about a carrier according to a predictive model and the time-domain signal curve;

an active damping module configured to send the control instruction in advance to perform active damping according to the predicted vibration information;

a correction module configured to acquire actual vibration information about the carrier and adjusting the predictive model;

Specifically, the information processing module specifically comprises:

a computer vision sub-module configured to identify the information about the road segment by a computer vision technology;

a road segment information processing sub-module configured to process the information about the road segment according to an identification result of the computer vision sub-module;

the active damping module specifically comprises:

a software delay sub-module configured to determine the time required for a software delay;

a mechanical delay sub-module configured to determine the time required for a mechanical delay; and a damping sub-module configured to actively damp vibration according to the time required by the software delay and the mechanical delay.

Preferably, it is characterized by comprising: applied to a multi-degree-of-freedom active damping mechanism, wherein an upper platform coordinate system of the multi-degree-of-freedom active damping mechanism relatively moves in three degrees-of-freedom in roll, pitch, and vertical directions with respect to an inertial coordinate system, comprising, comprising:

a correction module configured to correct the load moment of inertia of the multi-degree-of-freedom active damping mechanism in pitch and roll damping directions according to an adaptive control algorithm with a preset adaptation rate;

a calculation module configured to calculate an electric cylinder output force in a skyhook active damping control algorithm adopted by the multi-degree-of-freedom active damping mechanism in a vertical damping direction; and a control module configured to be respectively connected to the correction module and the calculation module, and comprehensively control the multi-degree-of-freedom active damping mechanism to perform active damping according to the corrected load moment of inertia and the electric cylinder output force.

Preferably, the multi-degree-of-freedom active damping mechanism comprises: upper and lower platforms, wherein centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising:

a first acquisition module configured to acquire pose information about the upper and lower platforms respectively, wherein the pose information comprises a pitch angular velocity, a roll angular velocity, and a vertical velocity;

a first calculation module configured to respectively calculate a spinor equation of a central point of the upper platform, a first articulation point and a second articulation point, wherein the spinor equation comprises a velocity spinor equation and a force spinor equation, the first articulation point is a connection point of the driving mechanism and the upper platform, and the second articulation point is a connection point of the driving mechanism and the lower platform and a connection point of the passive coupling mechanism and the lower platform;

a second acquisition module configured to dynamically model the damping mechanism according to the spinor equation to obtain a dynamics model of the damping mechanism;

a second calculation module configured to calculate the electric cylinder output force according to the pose information of the upper and lower platforms and the dynamics model; and an adjustment module configured to control the active coupling mechanism according to the control force to adjust the pose information of the upper platform;

the second calculation module comprises:

a first calculation sub-module configured to calculate a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;

a second calculation sub-module configured to calculate a vertical error value between the lower and upper platforms according to the vertical velocities of the upper and lower platforms, wherein the vertical error value comprises a vertical displacement difference, a vertical velocity difference and a vertical acceleration difference;

a third calculation sub-module configured to substitute the pitch angle difference, the roll angle difference, the pitch angular velocity difference, the roll angular velocity difference, the pitch angle acceleration difference, the roll angle acceleration difference, and the vertical error value into the dynamics model to calculate to obtain the electric cylinder output force;

the first calculation sub-module comprises:

a first calculation unit configured to calculate a pitch angle and a roll angle of the upper and lower platforms and a pitch angle acceleration and a roll angle acceleration of the lower platform according to the pitch angular velocity and the roll angular velocity of the upper and lower platforms;

a second calculation unit configured to calculate the pitch angle difference, the roll angle difference, the pitch angular velocity difference and the roll angular velocity difference between an upper platform and a lower platform according to the pitch angle, the roll angle, the pitch angular velocity and the roll angular velocity of the upper and lower platforms;

a third calculation unit configured to calculate the pitch angle acceleration difference between an upper platform and a lower platform using a proportional integral (PI) control algorithm according to the pitch angle acceleration, the pitch angle, and the pitch angle acceleration of the lower platform;

the third calculation unit is further configured to calculate the roll angle acceleration difference between an upper platform and a lower platform using the PI control algorithm according to the roll angle acceleration, the roll angle, and the roll angular velocity of the lower platform;

the second calculation sub-module comprises:

a fourth calculation unit configured to calculate vertical displacement of the upper and lower platforms and a vertical acceleration of the lower platform according to the vertical velocities of the upper and lower platforms;

a fifth calculation unit configured to calculate the vertical displacement difference and the vertical velocity difference between the lower and upper platforms according to the vertical velocities and the vertical displacement of the upper and lower platforms; and a sixth calculation unit configured to calculate the vertical acceleration difference between the lower and upper platforms using a skyhook damping control algorithm according to the vertical acceleration of the lower platform, the vertical velocity of the upper platform, the vertical displacement difference, and the vertical velocity difference.

Preferably, the system specifically comprises:

a model establishment module configured to perform kinematic and dynamic analysis on a multi-dimensional damping device, establish a linear dynamic equation near an equilibrium point, and establish a predictive model according to the linear dynamics equation;

an optimization module configured to estimate an output quantity of a predictive time domain by controlling the control quantity of the time-domain according to the predictive model, setting an optimization objective according to a control objective that the output quantity of the predictive time domain is close to an expected trajectory, setting constraints, and determining an optimization problem of the control quantity;

a measurement module configured to determine the expected trajectory according to pose information about the carrying device at time t; and a control module configured to solve the optimization problem to determine an optimal control quantity sequence, and take the first value in the sequence as an actual control quantity at the current moment to control the multi-dimensional damping device;

in a third aspect, a multi-degree-of-freedom active damping mechanism is provided, which has an upper platform coordinate system relatively movable in three degrees-of-freedom in roll, pitch, and vertical directions with respect to an inertial coordinate system, comprising a processor, a memory and a computer program stored in the memory and operable on the processor, where the processor is configured for executing the computer program stored on the memory to implement the operations performed by the multi-degree-of-freedom active damping mechanism control method.

Preferably, the multi-degree-of-freedom active damping mechanism comprises:

a lower platform fixed on a carrying device;

an inertial navigation unit mounted on the lower platform for measuring pose information about the carrying device;

a robot mechanism comprising a control unit, an execution unit, and an encoder, wherein the control unit is electrically connected to the inertial navigation unit, the control unit comprises a memory for storing a control program and a processor for loading and executing the control program to implement the multi-degree-of-freedom active damping mechanism control method;

the execution unit is electrically connected to the control unit and is used for executing an operation according to a control instruction of the control unit;

the encoder is electrically connected to the control unit and the execution unit for detecting an actual execution condition of the execution unit and feeding back the actual execution condition of the execution unit to the control unit;

an upper platform is connected to a base via the robot mechanism for carrying a person or an object.

Additional advantages of the present invention will be set forth in the detailed description which follows, and in part will be readily apparent to a person skilled in the art from that description or recognized by practicing the present invention as described herein.

BRIEF DESCRIPTION OF THE DRAWINGS

Other features, objects, and advantages of the present invention will become more apparent upon reading the detailed description of non-limiting embodiments with reference to the following drawings.

Figure 1:
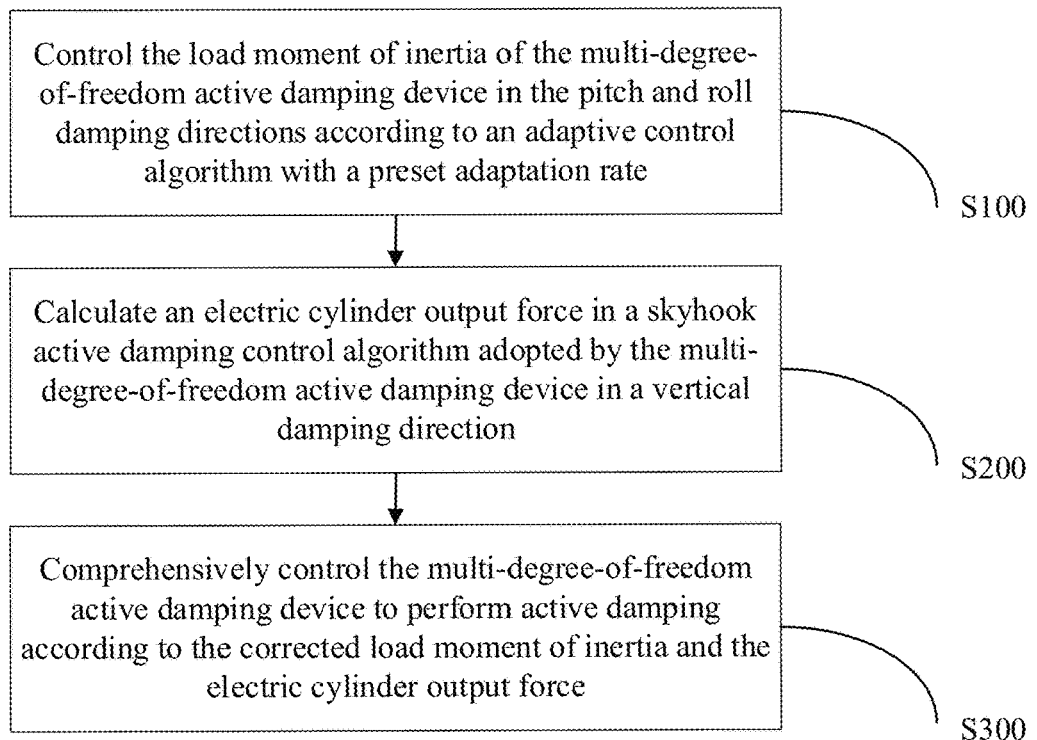
FIG. 1 is a flowchart of a first embodiment of the present invention.

Reference numerals in the figures: correction module—10, calculation module—20, control module—30, multi-degree-of-freedom active damping mechanism—100, processor—110, memory—120, computer program—121, first acquisition module 100, first calculation module 200, second acquisition module 300, second calculation module 400, adjustment module 500.

DETAILED DESCRIPTION OF THE EMBODIMENTS

Hereinafter, the present invention will be described in detail with reference to specific examples. The following examples will aid a person skilled in the art in further understanding of the present invention, but do not limit the present invention in any way. It should be noted that several variations and modifications can be made by a person skilled in the art without departing from the inventive concept. These are all within the scope of the present invention.

In the interest of clarity, only those portions of the drawings that are relevant to the present invention are shown schematically and do not represent the actual structure of the product. In addition, in order to provide a concise understanding of the drawings, elements having the same structure or function may be schematically illustrated in only one of the drawings or may be numbered in only one of the drawings. In this document, "a" or "an" means not only "only one" but also "more than one".

It should be further understood that the term "and/or" as used in the description and the appended claims refers to and includes any and all possible combinations of one or more of the associated listed items.

In addition, in the description of the present application, the terms "first", "second", and the like are used for distinguishing between description and not necessarily for indicating or implying relative importance.

The present invention provides a multi-degree-of-freedom active damping mechanism control method, system, and damping mechanism, and an embodiment of the present invention will be described with reference to the accompanying drawings.

Embodiment I

According to the implementation of the present invention, a multi-degree-of-freedom active damping mechanism control method is provided, wherein three coordinate systems, i.e., an inertia coordinate system, a vehicle chassis coordinate system and an upper platform coordinate system of the damping mechanism are established in advance in a vehicle dynamics model of the damping system, and the corresponding kinematic models are established for calculating a relative motion of the upper platform coordinate system of the damping mechanism relative to the inertia coordinate system in three degrees-of-freedom in roll, pitch, and vertical directions.

Relative displacement between the vehicle chassis and the inertial coordinate system occurs due to fluctuation of the road segment, wherein the roll angle is $\alpha_C$, the pitch angle is $\beta_C$, and the vertical displacement is $z_C$; the displacement of the upper table (upper platform) of the damping mechanism relative to the vehicle chassis is a roll angle $\alpha_b$, pitch angle $\beta_b$ and vertical displacement $z_b$, and the conversion matrix of the upper table (upper platform) coordinate system relative to the inertial coordinate system is calculated as follows:

$$T_{0C} = \begin{bmatrix} 1 & 0 & 0 & 0 \\ 0 & \cos\alpha_C & -\sin\alpha_C & 0 \\ 0 & \sin\alpha_C & \cos\alpha_C & 0 \\ 0 & 0 & 0 & 1 \end{bmatrix} \begin{bmatrix} \cos\beta_C & 0 & \sin\beta_C & 0 \\ 0 & 1 & 0 & 0 \\ -\sin\beta_C & 0 & \cos\beta_C & 0 \\ 0 & 0 & 0 & 1 \end{bmatrix} \begin{bmatrix} 1 & 0 & 0 & 0 \\ 0 & 1 & 0 & 0 \\ 0 & 0 & 1 & z_C \\ 0 & 0 & 0 & 1 \end{bmatrix}$$

$$= \begin{bmatrix} \cos\beta_C & 0 & \sin\beta_C & 0 \\ \sin\alpha_C \sin\beta_C & \cos\alpha_C & -\sin\alpha_C \cos\beta_C & 0 \\ -\cos\alpha_C \sin\beta_C & \sin\alpha_C & \cos\alpha_C \cos\beta_C & z_C \\ 0 & 0 & 0 & 1 \end{bmatrix}$$

$$T_{CB} = \begin{bmatrix} 1 & 0 & 0 & 0 \\ 0 & \cos\alpha_b & -\sin\alpha_b & 0 \\ 0 & \sin\alpha_b & \cos\alpha_b & 0 \\ 0 & 0 & 0 & 1 \end{bmatrix} \begin{bmatrix} \cos\beta_b & 0 & \sin\beta_b & 0 \\ 0 & 1 & 0 & 0 \\ -\sin\beta_b & 0 & \cos\beta_b & 0 \\ 0 & 0 & 0 & 1 \end{bmatrix} \begin{bmatrix} 1 & 0 & 0 & 0 \\ 0 & 1 & 0 & 0 \\ 0 & 0 & 1 & z_b \\ 0 & 0 & 0 & 1 \end{bmatrix}$$

$$= \begin{bmatrix} \cos\beta_b & 0 & \sin\beta_b & 0 \\ \sin\alpha_b \sin\beta_b & \cos\alpha_b & -\sin\alpha_b \cos\beta_b & 0 \\ -\cos\alpha_b \sin\beta_b & \sin\alpha_b & \cos\alpha_b \cos\beta_b & z_b \\ 0 & 0 & 0 & 1 \end{bmatrix}$$

The roll angle and the pitch angle of the vehicle chassis caused by road bumpiness are generally not more than 6°, and $\alpha_C$ and $\beta_C$ can be regarded as a small angle here, and at the same time, a balance range of the pitch angle and the roll angle provided by the damping mechanism is also generally below 6° due to the space limitation in the vehicle cabin, and therefore $\alpha_b$ and $\beta_b$ can be regarded as a small angle, i.e., the following assumption is made:

$$\sin\alpha_c \approx \alpha_c, \sin\beta_c \approx \beta_c,$$

$$\sin\alpha_b \approx \alpha_b, \sin\beta_b \approx \beta_b,$$

therefore, $$T_{0C} = \begin{bmatrix} 1 & 0 & \beta_C & 0 \\ 0 & 1 & -\alpha_C & 0 \\ -\beta_C & \alpha_C & 1 & z_C \\ 0 & 0 & 0 & 1 \end{bmatrix}$$

$$T_{CB} = \begin{bmatrix} 1 & 0 & \beta_b & 0 \\ 0 & 1 & -\alpha_b & 0 \\ -\beta_b & \alpha_b & 1 & z_b \\ 0 & 0 & 0 & 1 \end{bmatrix};$$

then the conversion matrix from the upper platform to the inertial coordinate system is:

$$T_{0B} = T_{0C}T_{CB} = \begin{bmatrix} 1 & 0 & \beta_C & 0 \\ 0 & 1 & -\alpha_C & 0 \\ -\beta_C & \alpha_C & 1 & z_C \\ 0 & 0 & 0 & 1 \end{bmatrix} \begin{bmatrix} 1 & 0 & \beta_b & 0 \\ 0 & 1 & -\alpha_b & 0 \\ -\beta_b & \alpha_b & 1 & z_b \\ 0 & 0 & 0 & 1 \end{bmatrix}$$

$$= \begin{bmatrix} 1 & 0 & \beta_C + \beta_b & \beta_C z_b \\ 0 & 1 & -\alpha_C - \alpha_b & -\alpha_C z_b \\ -\beta_C - \beta_b & \alpha_C + \alpha_b & 1 & z_C + z_b \\ 0 & 0 & 0 & 1 \end{bmatrix}$$

From the above equation, in order to balance the rolling, pitching, and vertical motions caused by the vehicle chassis on the upper platform (upper platform) of the damping mechanism, the following conditions need to be met:

$$\beta_b + \beta_C = 0,$$

$$\alpha_b + \alpha_C = 0,$$

$$\Delta z_b + \Delta z_C = 0.$$

Here $\alpha_c$ and $\beta_c$ are obtained from IMU measurements fixed on the bottom of the carrier and $\alpha_b + \alpha_C$ and $\beta_b + \beta_C$ are obtained from the IMU measurements fixed on the upper platform.

As shown in FIG. 1, the present invention provides a multi-degree-of-freedom active damping mechanism control method comprising the steps of:

S100: correcting the load moment of inertia of the multi-degree-of-freedom active damping device in the pitch and roll damping directions according to an adaptive control algorithm with a preset adaptation rate.

Specifically, the multi-degree-of-freedom active damping mechanism control method disclosed in this embodiment is applied to a multi-degree-of-freedom active damping device having an upper platform coordinate system relatively moving in three degrees-of-freedom in roll, pitch, and vertical directions with respect to an inertial coordinate system.

S200: calculating an electric cylinder output force in a skyhook active damping control algorithm adopted by the multi-degree-of-freedom active damping device in a vertical damping direction.

Specifically, before executing steps S100 and S200, the three degrees of damping freedom of roll, pitch and vertical motion are divided into two modules in the control algorithm in advance, module one includes two degree-of-freedom damping in pitch and roll directions, module two is vertical damping, and the two modules are dynamically modeled respectively.

Module one is two rotational degrees of freedom connected in series, placed orthogonally, and the axes are crossed; at the same time, since there is a small angle assumption, the roll and pitch degrees of freedom are decoupled at this moment, and the vibration on the roll and pitch degrees of freedom of the chassis can be balanced respectively, and the kinetic equation thereof can be written as follows:

$$u - B\dot{\theta} - G(\theta) = J\ddot{\theta}, \theta = \alpha \text{ or } \beta;$$

wherein, u is an external force applied at a rotational axis of a degree of freedom, i.e., a control force of a motor in the control system; $B\dot{\theta}$ is the Coriolis force, a centrifugal force, and a viscous friction, $G(\theta)$ is a gravity moment and a coulomb friction, and J is a load moment of inertia of this axis.

Module two is a vertical motion driven by an electric cylinder, and the kinetic equation thereof can be written in the following form:

$$u - B\dot{\tau} - G = m\ddot{\theta};$$

wherein, u is the external force applied to the degree of freedom, i.e., a control force of the electric cylinder in the control system; $B\dot{\tau}$ is viscous friction; G is gravity and coulomb friction; m is a vertical load mass of the degree of freedom, and the load moment of inertia and the electric cylinder output force are respectively calculated by steps S100 and S200 according to the above-mentioned modeling result.

S300: comprehensively controlling the multi-degree-of-freedom active damping device to perform active damping according to the corrected load moment of inertia and the electric cylinder output force.

According to the multi-degree-of-freedom active damping mechanism control method provided in the present invention, the roll and pitch degrees of freedom in the multi-degree-of-freedom active damping device are respectively actively damped by an adaptive control algorithm, and the vertical degree of freedom in the multi-degree-of-freedom active damping device is actively damped by a skyhook active damping control algorithm, so that an effective damping effect can be achieved in each degree of freedom for different vibration scenes, and the stability and accuracy of the damping effect can be improved.

Figure 2:
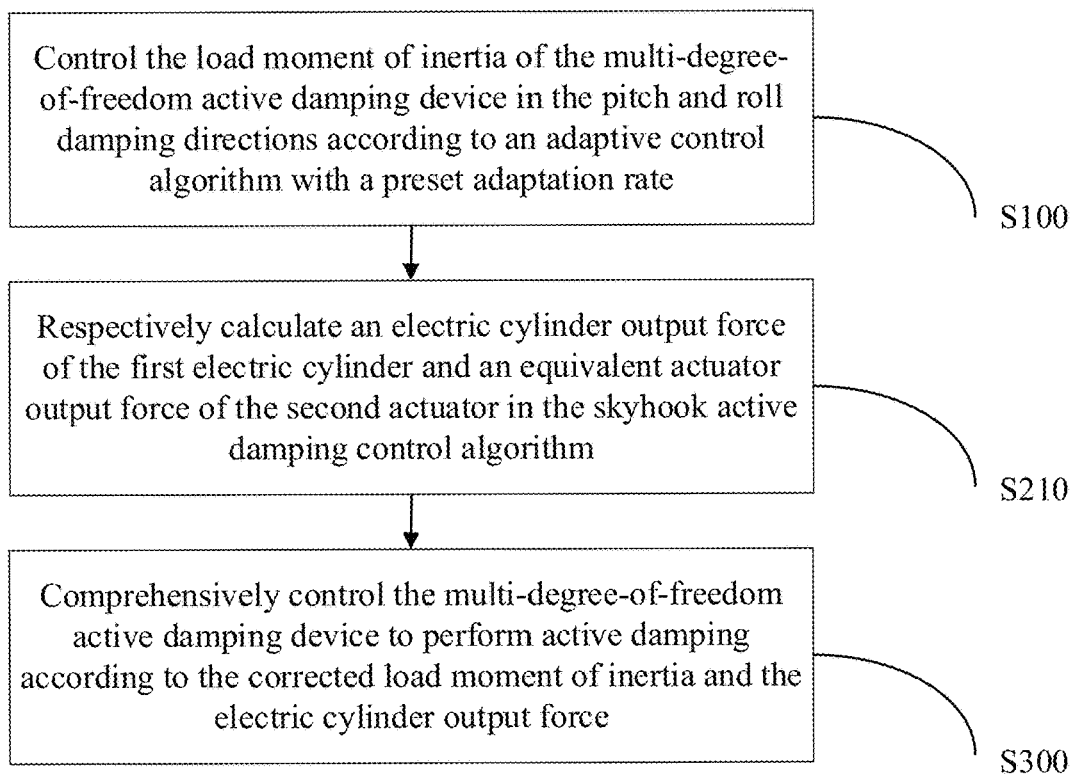
FIG. 2 is a flowchart for calculating the output force of the electric cylinder according to a first embodiment of the present invention.

As shown in FIG. 2, S200 of calculating an electric cylinder output force in a skyhook active damping control algorithm adopted by the multi-degree-of-freedom active damping device in a vertical damping direction specifically comprises:

S210: respectively calculating an electric cylinder output force of the first electric cylinder and an equivalent actuator output force of the second actuator in the skyhook active damping control algorithm.

Specifically, the multi-degree-of-freedom active damping device adopts a skyhook active damping control algorithm combined with a double-motor synchronous force control scheme in the vertical damping direction, and a spring damper, a first output electric cylinder and a second actuator are arranged between an upper platform and a lower platform of the multi-degree-of-freedom active damping device.

Figure 3:
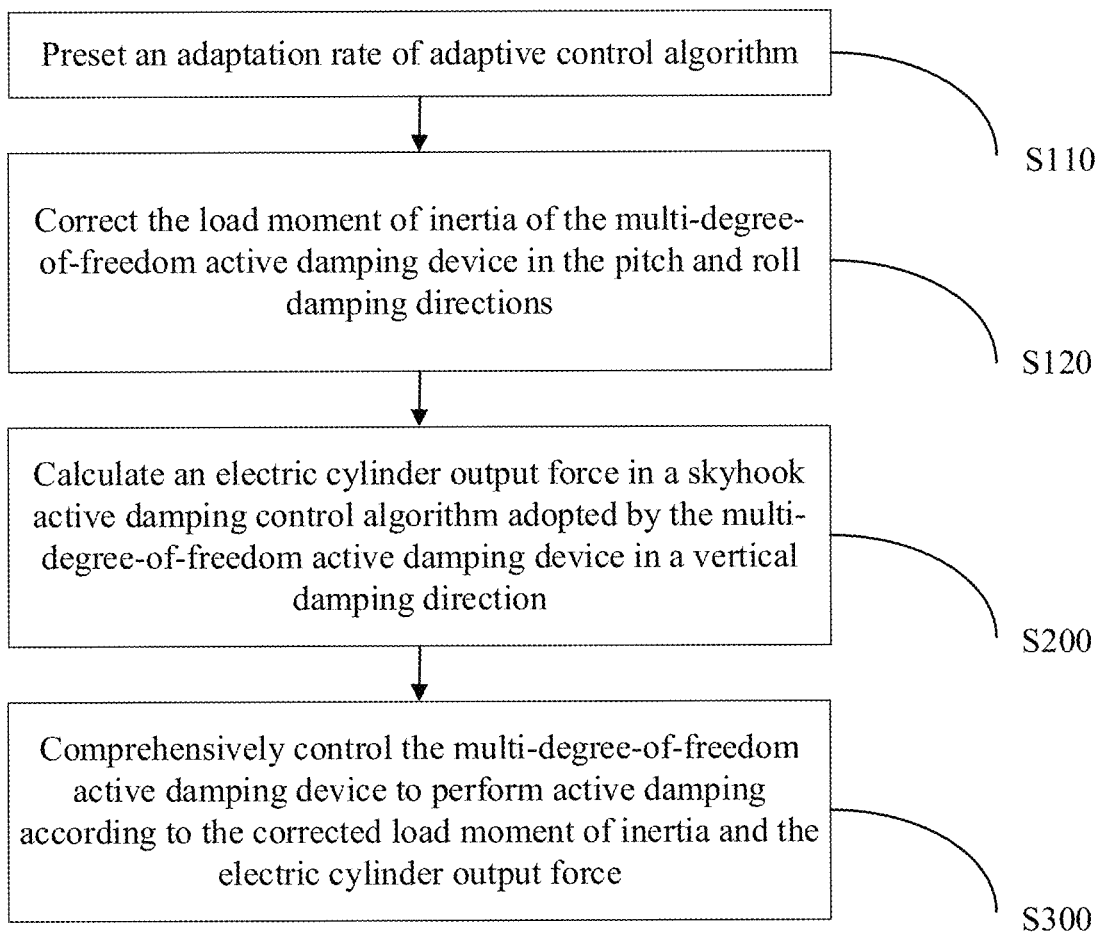
FIG. 3 is a flowchart for correcting the moment of inertia of a load according to a first embodiment of the present invention.

As shown in FIG. 3, step S100 of correcting the load moment of inertia of the multi-degree-of-freedom active damping device in the pitch and roll damping directions according to an adaptive control algorithm with a preset adaptation rate specifically comprises:

S110: presetting an adaptation rate of adaptive control algorithm is as follows:

$$u = [J\ddot{\theta}_r + B\dot{\theta}_r + G(\theta)] - K_{D_S};$$

wherein u is an external force applied at a rotational axis of a degree of freedom, $B\dot{\theta}_r$ is a Coriolis force, a centrifugal force, and a viscous friction; $G(\theta)$ is gravity moment and coulomb friction; J is a load moment of inertia at the rotational axis of the degree of freedom, $K_D$ is a velocity error feedback coefficient, and $\ddot{\theta}_r$ and $\dot{\theta}_r$ a first reference variable and a second reference variable respectively, $s = \dot{\theta} - \dot{\theta}_r$, the first reference variable is calculated as follows:

$$\dot{\theta}_r = \dot{\theta}_d - \lambda e_\theta;$$

the second reference variable is calculated as follows:

$$\ddot{\theta}_r = \ddot{\theta}_d - \lambda \dot{e}_\theta;$$

the adaptive law of preset moment of inertia is as follows:

$$J = -\frac{\ddot{\theta}_r}{W};$$

wherein W is an adaptive coefficient.

S120: correcting the load moment of inertia of the multi-degree-of-freedom active damping device in the pitch and roll damping directions.

According to the multi-degree-of-freedom active damping mechanism control method provided in this embodiment, an adaptive control algorithm is used for making the final estimated value approximate to the real moment of inertia by predicting and correcting the moment of inertia of the load. The algorithm can make the roll and pitch degrees of freedom adapt to the load effectively when different loads are loaded, and improve the stability and accuracy of the damping effect.

An electric cylinder output force in a skyhook active damping control algorithm adopted by the multi-degree-of-freedom active damping device in a vertical damping direction is calculated, wherein the formula is as follows:

$$F_{di} = -k_s(x_s - x_t) - c_s(\dot{x}_s - \dot{x}_f) + F_a;$$

wherein $x_s$ is displacement of an upper platform of the multi-degree-of-freedom active damping device, $x_t$ is displacement of a lower platform of the multi-degree-of-freedom active damping device, $k_s$ is an elastic coefficient of the spring damper, $c_s$ is a damping coefficient of the spring damper, and the equivalent actuator output force is a $F_a$.

According to the multi-degree-of-freedom active damping mechanism control method in this embodiment, the skyhook control damping with active and passive mixing in a vertical direction is used. By combining the active damping of the electric cylinder output with the passive damping of the spring damper, the high-efficiency damping for a large mass load can be achieved. By the skyhook control algorithm, the low-frequency large-amplitude vibration of the upper platform can be actively suppressed, and a better control effect can be achieved with a smaller motor output.

An electric cylinder output force in a skyhook active damping control algorithm adopted by the multi-degree-of-freedom active damping device in a vertical damping direction is calculated, wherein the formula is as follows:

$$F_a = -c_{sky}\dot{x}_s;$$

wherein $c_{sky}$ is a skyhook damping coefficient.

According to the inertial navigation unit respectively provided on the upper and lower platforms of the multi-degree-of-freedom active damping device, the vibration inertia of the multi-degree-of-freedom active damping device in three degrees-of-freedom in roll, pitch, and vertical directions is measured. According to the multi-degree-of-freedom active damping mechanism control method provided in this embodiment, the vibration in three degrees-of-freedom in roll, pitch, and vertical directions movement of the carriage and the balance effect of the upper platform in these three degrees of freedom are measured in real time by providing a double IMU combination on the upper platform and the bottom surface, which is taken as an input signal of a control scheme. After the calculation by the control algorithm, commands are output to a motor to control the motor rotation to achieve good active damping control effect.

Figure 4:
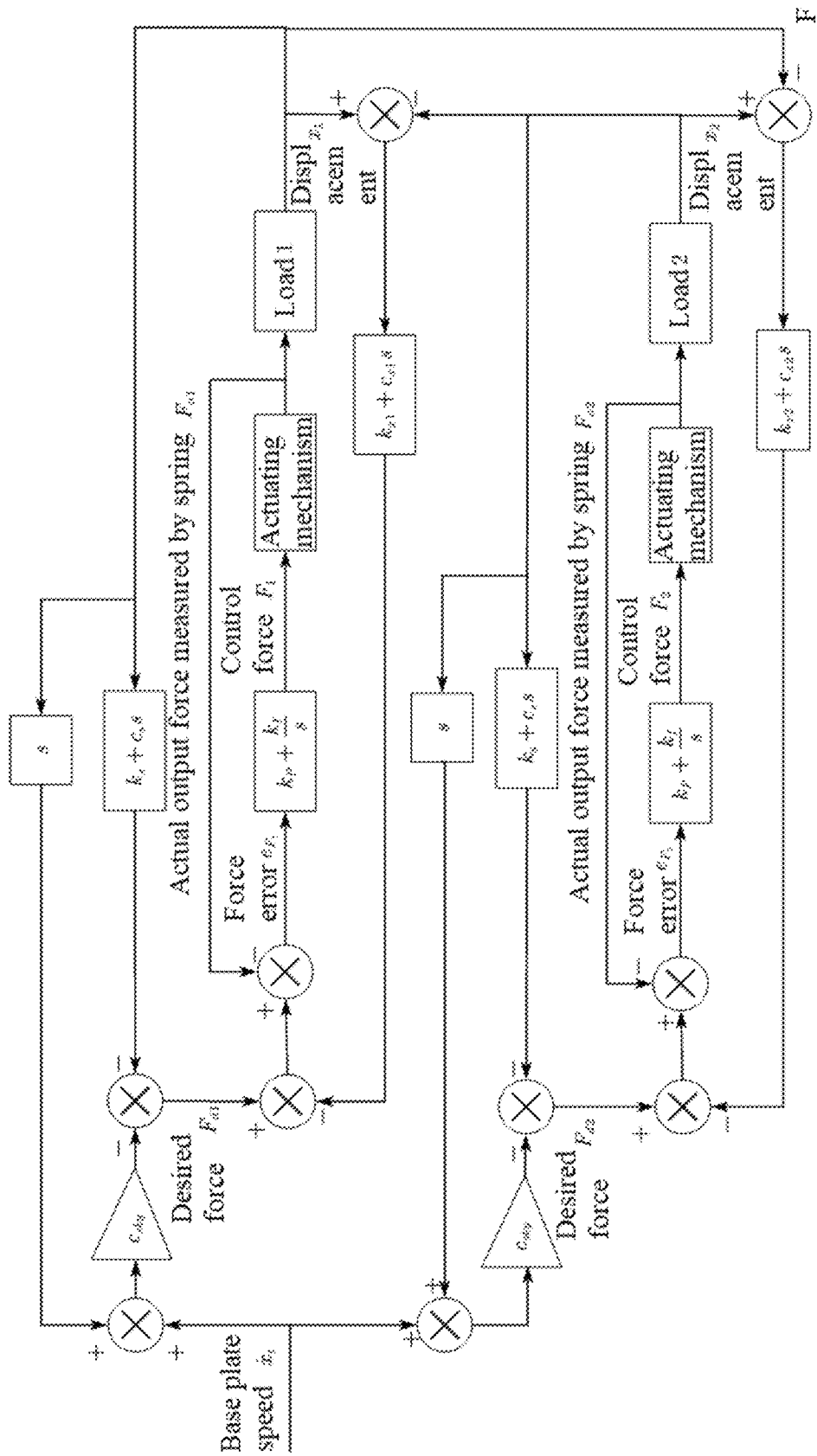
FIG. 4 is a control block diagram showing a multi-degree-of-freedom active damping mechanism control method and a dual-motor synchronous force control algorithm according to an embodiment of the present invention.

As shown in FIG. 4, FIG. 4 is a control block diagram showing a multi-degree-of-freedom active damping mechanism control method and a double-motor synchronous force control algorithm provided in the present application. A double-motor synchronous force control inner loop in two motor control strategies is included, and a skyhook damping algorithm is taken as an outer loop. By setting the output power of the skyhook damping algorithm as the target output power of the inner loop, the dynamic characteristics of the skyhook damping can be reflected to the outside while the two electric cylinders output synchronous displacement.

The system input is set to a sinusoidal signal with an amplitude of 4° and a frequency of 1 Hz, and the multi-degree-of-freedom active damping mechanism control method provided in this patent is applied to control the damping mechanism to track the trajectory, and the load moment of inertia is respectively set as J=106, J=79.5, J=53.0, and J=26.5 to perform multiple simulations to verify the adaptability of the control method to different mass loads.

Assuming that the initial estimated inertia values of the above four cases are 50, the simulation results of the adaptive target trajectory tracking of the above four rotational inertia show that the steady-state error of sinusoidal trajectory tracking is 3.2e−4, 2.0e−4, 1.2e−4 and 9.2e−5 respectively under four different rotational inertia. The tracking error is less than 0.001°, which indicates that the adaptive algorithm can achieve better tracking performance. At the same time, the estimated moment of inertia values corresponding to four simulations are 101.925, 76.279, 50.784 and 25.387, respectively, and the errors from the real moment of inertia values are not more than 5%. It can be seen that the multi-degree-of-freedom active damping mechanism control method provided in this patent has a higher estimation accuracy of position parameters in the adaptive process.

A sinusoidal signal with amplitude of 0.1 m and a frequency of 1 Hz is used as a vertical excitation of the chassis, and the simulation load is the maximum load of the present application mechanism of this patent of 600 kg. After simulation adjustment, the optimal control parameter combination is obtained as follows: $k_s$=3000, $c_s$=4500, and $c_{sky}$=25000.

The simulation results show that the vibration amplitude of the upper platform is less than 0.01 m in a steady state, and the amplitude of the disturbance is reduced by 90% compared with the base plate. At the same time, the output spinor amplitude of the electric cylinder is 1738 N, which does not exceed the rated output power of the electric cylinder, indicating that the control method is efficient in vertical damping.

Figure 5:
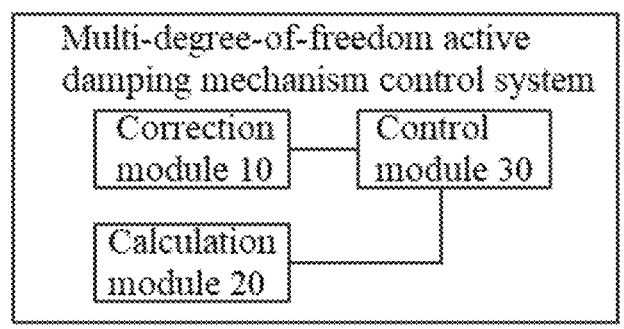
FIG. 5 is an exemplary diagram showing a multi-degree-of-freedom active damping mechanism control system according to an embodiment of the present invention.

As shown in FIG. 5, according to another aspect of the present invention, a multi-degree-of-freedom active damping mechanism control system including a correction module 10, a calculation module 20, and a control module 30 is further provided.

A correction module 10 is configured to correct the load moment of inertia of the multi-degree-of-freedom active damping device in the pitch and roll damping directions according to an adaptive control algorithm with a preset adaptation rate.

Specifically, the multi-degree-of-freedom active damping mechanism control system disclosed in this embodiment is applied to a multi-degree-of-freedom active damping device having an upper platform coordinate system relatively moving in three degrees-of-freedom in roll, pitch, and vertical directions with respect to an inertial coordinate system.

The calculation module 20 is configured to calculate an electric cylinder output force in a skyhook active damping control algorithm adopted by the multi-degree-of-freedom active damping device in a vertical damping direction.

Specifically, the three degrees of damping freedom of roll, pitch and vertical motion are divided into two modules in the control algorithm in advance, module one includes two degree-of-freedom damping in pitch and roll directions, module two is vertical damping, and the two modules are dynamically modeled respectively.

Module one is two rotational degrees of freedom connected in series, placed orthogonally, and the axes are crossed; at the same time, since there is a small angle assumption, the roll and pitch degrees of freedom are decoupled at this moment, and the vibration on the roll and pitch degrees of freedom of the chassis can be balanced respectively, and the kinetic equation thereof can be written as follows:

$$u\_B\dot{\theta}\_G(\theta)=J\ddot{\theta}, \theta=\alpha \text{ or } \beta;$$

wherein, u is an external force applied at a rotational axis of a degree of freedom, i.e., a control force of a motor in the control system; $B\dot{\theta}$ is the Coriolis force, a centrifugal force, and a viscous friction, $G(\theta)$ is a gravity moment and a coulomb friction, and J is a load moment of inertia of this axis.

Module two is a vertical motion driven by an electric cylinder, and the kinetic equation thereof can be written in the following form:

$$u\_B\dot{z}\_G=m\ddot{\theta};$$

wherein, u is the external force applied to the degree of freedom, i.e., a control force of the electric cylinder in the control system; $B\dot{z}$ is viscous friction; G is gravity and coulomb friction; m is a vertical load mass of the degree of freedom, and the load moment of inertia and the electric cylinder output force are respectively calculated by steps S100 and S200 according to the above-mentioned modeling result.

The control module 30 is respectively connected to the correction module 10 and the calculation module 20, and is configured to comprehensively control the multi-degree-of-freedom active damping device to perform active damping according to the corrected load moment of inertia and the output force of the electric cylinder.

According to the multi-degree-of-freedom active damping mechanism control method provided in this embodiment, the roll and pitch degrees of freedom in the multi-degree-of-freedom active damping device are respectively actively damped by an adaptive control algorithm, and the vertical degree of freedom in the multi-degree-of-freedom active damping device is actively damped by a skyhook active damping control algorithm, so that an effective damping effect can be achieved in each degree of freedom for different vibration scenes, and the stability and accuracy of the damping effect can be improved.

Figure 6:
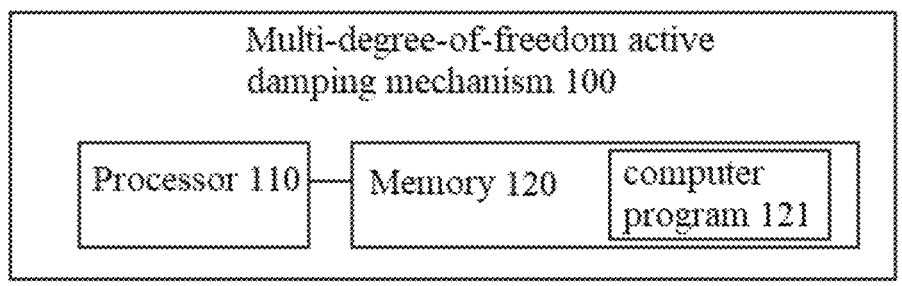
FIG. 6 is an exemplary diagram showing a multi-degree-of-freedom active damping mechanism according to an embodiment of the present invention.

As shown in FIG. 6, according to another aspect of the present invention, a multi-degree-of-freedom active damping mechanism 100 is further provided, which has an upper platform coordinate system moving relative to the inertial coordinate system in three degrees-of-freedom in roll, pitch, and vertical directions directions, comprising a processor 110 configured to execute the computer program stored in the memory 120 to perform the operations performed in the above-mentioned multi-degree-of-freedom active damping mechanism control method embodiment, and a memory 120 and a computer program 121 stored in the memory 120 and operable on the processor 110.

In this embodiment, the roll and pitch degrees of freedom in the multi-degree-of-freedom active damping device are respectively actively damped by an adaptive control algorithm, and the vertical degree of freedom in the multi-degree-of-freedom active damping device is actively damped by a skyhook active damping control algorithm, so that an effective damping effect can be achieved in each degree of freedom for different vibration scenes, and the stability and accuracy of the damping effect can be improved.

In the embodiment, an adaptive control algorithm is used for making the final estimated value approximate to the real moment of inertia by predicting and correcting the moment of inertia of the load. The algorithm can make the roll and pitch degrees of freedom adapt to the load effectively when different loads are loaded, and improve the stability and accuracy of the damping effect.

In the embodiment, a skyhook control damping with active and passive mixing in a vertical direction is used. By combining the active damping of the electric cylinder output with the passive damping of the spring damper, the high-efficiency damping for a large mass load can be achieved. By the skyhook control algorithm, the low-frequency large-amplitude vibration of the upper platform can be actively suppressed, and a better control effect can be achieved with a smaller motor output.

In this embodiment, the vibration in three degrees-of-freedom in roll, pitch, and vertical directions movement of the carriage and the balance effect of the upper platform in these three degrees of freedom are measured in real time by providing a double IMU combination on the upper platform and the bottom surface, which is taken as an input signal of a control scheme. After the calculation by the control algorithm, commands are output to a motor to control the motor rotation to achieve good active damping control effect.

Embodiment II

The damping mechanism provided in this embodiment is a closed loop mechanism driven in a parallel manner, which comprises upper and lower platforms connected via at least two independent kinematic chains, and having two or more degrees of freedom.

Figure 7:
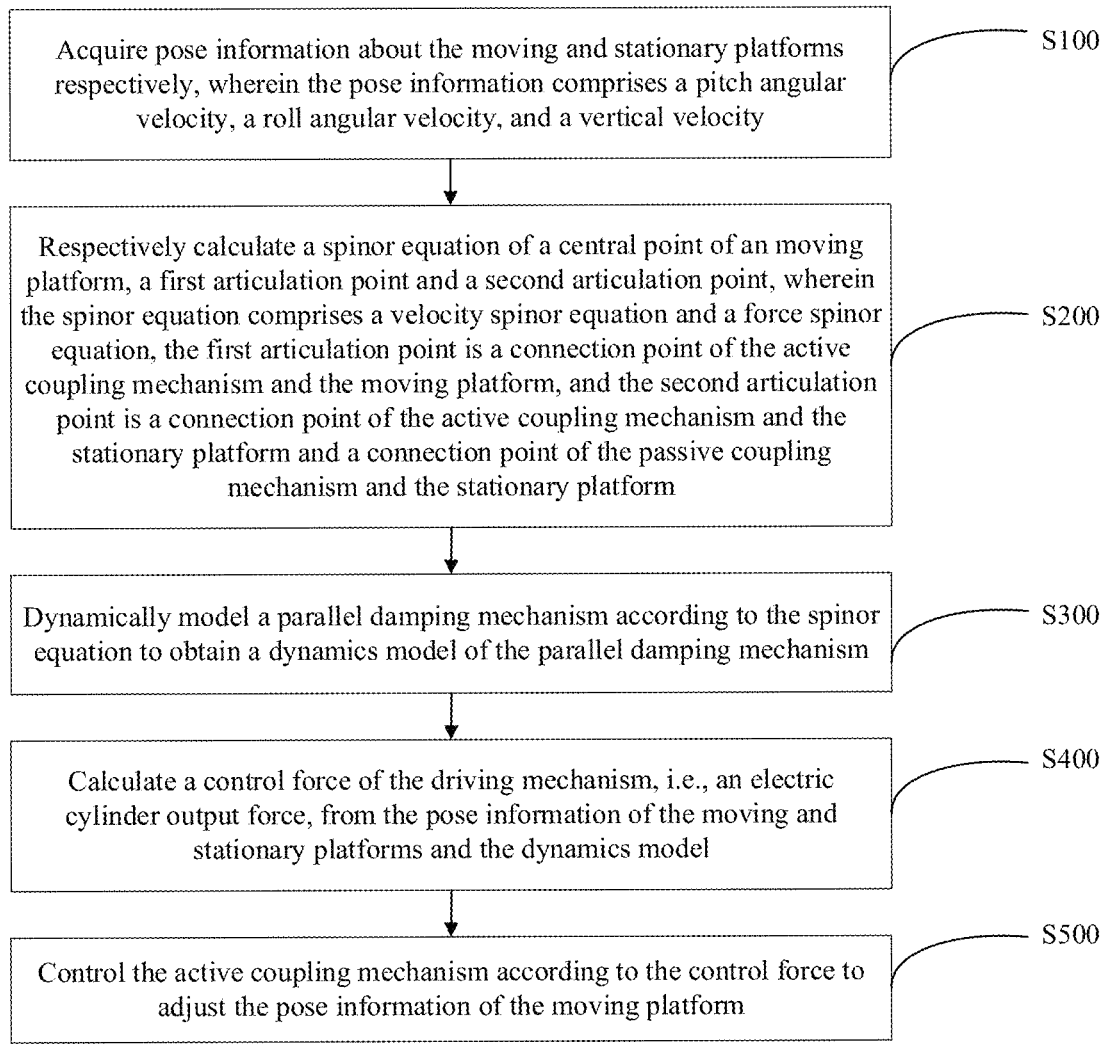
FIG. 7 is a flowchart of a second embodiment of the present invention.

In this embodiment of the present invention, as shown in FIG. 7, the parallel damping mechanism comprises upper and lower platforms, the centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising the steps of:

S100: acquiring pose information about the upper and lower platforms respectively, wherein the pose information comprises a pitch angular velocity, a roll angular velocity, and a vertical velocity;

specifically, the pose information of the upper and lower platforms is acquired by a sensor. Since there is a certain degree of error and drift in the data directly measured by the sensor, directly using these data will make the platform displacement rapidly diverge, and accurate pose information of the upper and lower platforms can be acquired by means of complementary filtering.

S200: respectively calculating a spinor equation of a central point of the upper platform, a first articulation point and a second articulation point, wherein the spinor equation comprises a velocity spinor equation and a force spinor equation, the first articulation point is a connection point of the active coupling mechanism and the upper platform, and the second articulation point is a connection point of the active coupling mechanism and the lower platform and a connection point of the passive coupling mechanism and the lower platform;

S300: dynamics modeling a parallel damping mechanism according to the spinor equation to obtain a dynamics model of the parallel damping mechanism;

specifically, the spinor equations of the central point of the upper platform, the first articulation point and the second articulation point are calculated respectively, wherein the spinor equations comprise a velocity spinor equation and a force spinor equation, and the dynamics model of the parallel damping mechanism is established according to the calculation results.

S400: calculating a control force of the driving mechanism, i.e., an electric cylinder output force, from the pose information of the upper and lower platforms and the dynamics model; and S500: controlling the active coupling mechanism according to the control force to adjust the pose information of the upper platform.

Specifically, the output of each driving mechanism can be calculated by dynamics modeling, and the active coupling mechanism can be controlled by the output of each driving mechanism to adjust the position and pose information of the upper platform to maintain the balance of the upper platform at different postures.

In this embodiment, a parallel damping mechanism is adopted, and an accurate dynamics model of the parallel damping mechanism is established. Based on the dynamics model, the multi-dimensional attitude control of the damping platform is carried out, so that the real-time embedded system can be applied, and the reaction velocity of the driving mechanism is improved, so that the driving mechanism can follow the road excitation in the bumpiness environment during high-frequency vibration, thus achieving a relatively ideal damping effect. Based on the control force of the driving mechanism, the position and pose information of the upper platform is adjusted to ensure the stability of the parallel damping mechanism in the horizontal direction and enhance the damping effect.

Figure 8:
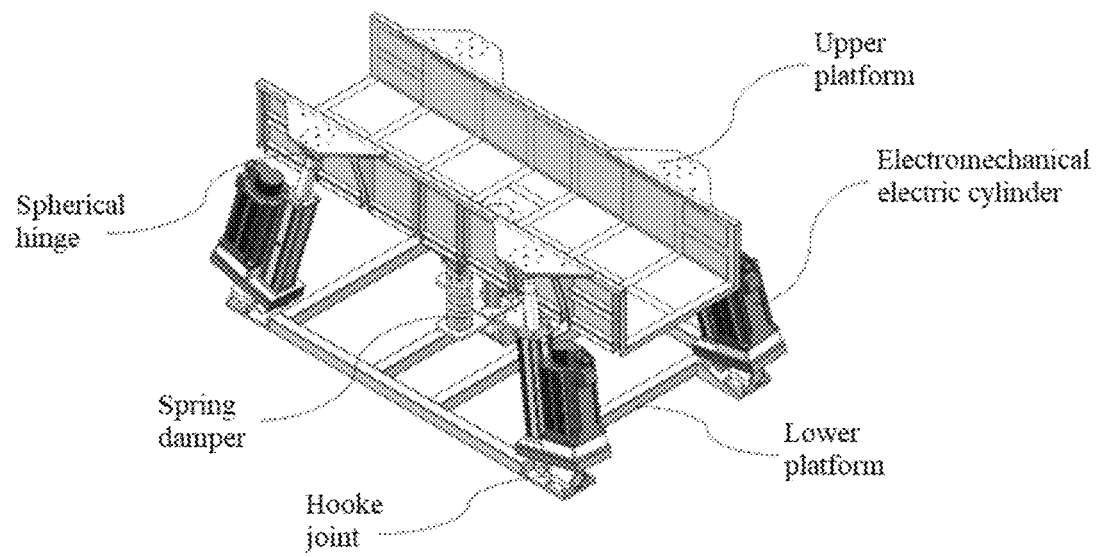
FIG. 8 is a structural schematic diagram showing a damping mechanism according to a second embodiment of the present invention.

Step S200 includes:

S210: establishing a satellite coordinate system according to the central points of the upper and lower platforms;

specifically, as shown in FIG. 8, the parallel damping mechanism has a configuration of 4UPS+UP; four axes between an upper platform and a lower platform are composed of a hooke joint, an electromechanical electric cylinder and a spherical hinge to form a UPS branch chain (U represents a hooke joint, P represents a prismatic pair, and S represents a spherical hinge); the upper part of the central spring damper is fixedly connected to the upper platform, and the lower part is connected to the lower platform by the hooke joint to form an UP branch chain (U represents a hooke joint, and P represents a prismatic pair).

The four UPS branches actively control the length of the branches via an electromechanical electric cylinder, and as a driving axis, the upper platform (a moving platform) can be controlled to move relative to the lower platform (a stationary platform) in three independent degrees of freedom; the central UP branch plays a passive damping effect through a spring damper, and changes passively according to the distance between the upper and lower platform centers as a passive branch.

Taking the central point $O_D$ of the lower platform of the base plate as an origin point and the central point $O_P$ of the upper platform as an origin point, the satellite coordinate systems $O_D X_D Y_D Z_D$ and $O_P X_P Y_P Z_P$ of the lower and upper platforms are respectively established, and the hinge points of the four UPS branches of the lower platform and the hinge points of the UP branch of the center of the lower platform are marked as $D_i$ (i=1, 2, 3, 4, 5), and the hinge points of the four UPS branches of the upper platform are marked as $P_i$ (i=1, 2, 3, 4).

S220: calculating the velocity spinor equation of the central point of the upper platform according to the velocity and angular velocity of the central point of the upper platform;

specifically, let the angular velocity of the central point $O_P$ of the upper platform at a system-dependent $O_D X_D Y_D Z_D$ be $\omega_P$, and the velocity be $v_P$, and a velocity spinor $T_P$ of the point $O_P$ is calculated using the spiral theory according to the following formula:

$$T_P = \begin{bmatrix} \omega_P \\ v_P \end{bmatrix} = H_P T_0 = H_P \begin{bmatrix} \omega_P \\ v_P \end{bmatrix}, H_P = E_6;$$

wherein, $H_P$ is a velocity spin transformation matrix of the upper platform central point $O_P$, the velocity spin of the upper platform central point P in the inertial coordinate system is transformed into a velocity spin in a satellite coordinate system $O_P X_P Y_P Z_P$.

S230: calculating the force spinor equation of the central point of the upper platform according to a unit vector in a telescopic direction of the passive coupling mechanism and the acceleration, angular velocity and angular acceleration of the central point of the upper platform;

specifically, the spinor equation $W_P$ for the upper platform central point $O_P$ is calculated using the spiral theory according to the following formula:

$$W_P = -\begin{bmatrix} 0_{3\times 1} & -s_0 \times (\dot{v}_P - g) & G_P \\ \dot{v}_P - g & -[\dot{\omega}_P \times s_0 + \omega_P \times (\omega_P \times s_0)] & 0_{3\times 5} \end{bmatrix} \begin{bmatrix} m_P \\ c_P \\ \hat{\bar{I}}_P \end{bmatrix} = -Q_P p_P;$$

wherein $s_0$ is a unit vector of a telescopic direction of a passive coupling mechanism, $\dot{v}_P$ is the acceleration at $O_P$, $\omega_P$ is the angular velocity at $O_P$, $\dot{\omega}_P$ is the angular acceleration at $O_P$, $m_P$ is the mass of the upper platform, $c_P$ is a distance from the center of mass to $O_P$, $\bar{I}_P$ is a linear parameter of an inertia tensor $\bar{I}_P$, and $G_P$ represents the coefficient matrix in front of the moment of inertia;

in the above formula, $$Q_P = \begin{bmatrix} 0_{3\times 1} & -s_0 \times (\dot{v}_P - g) & G_P \\ \dot{v}_P - g & -[\dot{\omega}_P \times s_0 + \omega_P \times (\omega_P \times s_0)] & 0_{3\times 5} \end{bmatrix}, p_P = \begin{bmatrix} m_P \\ c_P \\ \hat{\bar{I}}_P \end{bmatrix};$$

$G_P$ can be obtained by reverse deduction of formula $\bar{I}_P \dot{\omega}_P^P + \omega_P^P \times \bar{I}_P \omega_P^P = G_P \hat{\bar{I}}_P$, in which $\omega_P^P$ is a three-dimensional angular velocity vector of the upper platform in the satellite coordinate system $O_P X_P Y_P Z_P$; $\dot{\omega}_P^P$ is the three-dimensional angular acceleration vector of the upper platform under the coordinate system $O_P X_P Y_P Z_P$.

S240: calculating an angular velocity and a driving linear velocity of the active coupling mechanism according to a unit vector in a telescopic direction of the active coupling mechanism, the velocity of the central point of the upper platform, the angular velocity of the central point of the upper platform, and coordinates of the first articulation point in a lower platform satellite coordinate system;

specifically, let the angular velocity vector of the upper platform at a lower point $O_P$ of the following system $O_D X_D Y_D Z_D$ be $\omega_P$ and the angular acceleration vector be $\dot{\omega}_P$, then the velocity of the first articulation point $P_i$ can be expressed as:

$$v_{P_i} = v_P + \omega_P \times b_i = \omega_i \times l_i + \dot{l}_i s_i;$$

wherein $v_P$ is the velocity of the central point of the upper platform, $b_i$ is the coordinate of the first articulation point $P_i$ in the satellite coordinate system $O_D X_D Y_D Z_D$, $\omega_i$ is the angular velocity of the active coupling mechanism, $l_i$ is the length of the active coupling mechanism, $\dot{l}_i$ is the driving linear velocity of each active coupling mechanism, and $s_i = l_i / l_i$ is the unit vector of the telescopic direction of each active coupling mechanism;

the driving linear velocity $\dot{l}_i$ and angular velocity $\omega_i$ of the active coupling mechanism can be obtained by dot-multiplying and cross-multiplying $s_i$ respectively on either side of the above formula:

$$\dot{l}_i = s_i^T \cdot v_P + (b_i \times s_i)^T \cdot \omega_P$$

$$\omega_i = \frac{s_i \times (v_P + \omega_P \times b_i)}{l_i};$$

for calculating a spinor equation of the first articulation point and the second articulation point.

S250: calculating an angular acceleration of the active coupling mechanism according to the angular velocity and the driving linear velocity of the active coupling mechanism and the acceleration of the central point of the upper platform;

specifically, acceleration of a point $P_i$ can be obtained by differentiating the velocity of the first articulation point $P_i$:

$$a_{P_i} = \dot{v}_D + \dot{\omega}_D \times r_{P_i} + \omega_D \times (\omega_D \times r_{P_i}) = \dot{\omega}_i \times l_i + \omega_i \times (\omega_i \times l_i) + 2\dot{l}_i (\omega_i \times s_i) + \ddot{l}_i s_i;$$

wherein $\dot{v}_D$ is the acceleration of a central point $O_D$ of the lower platform, $\dot{\omega}_D$ is the angular acceleration of the point $O_D$, $\omega_D$ is the angular velocity of the point $O_D$, $r_{P_i}$ is the displacement vector from a point $P_i$ to the origin $O_D$ of the lower platform satellite coordinate system under the dynamic satellite coordinate system $O_P X_P Y_P Z_P$, $\dot{\omega}_i$ is the angular acceleration of the active coupling mechanism, $\ddot{l}_i$ is the driving linear acceleration of the active coupling mechanism, $l_i$ is the length of the active coupling mechanism, $\dot{l}_i$ is the driving linear velocity of the active coupling mechanism, and $\omega_i$ is the angular velocity of the active coupling mechanism;

the angular acceleration $\dot{\omega}_i$ of the active connection mechanism can be obtained by dot-multiplying and cross-multiplying $s_i$ respectively on either side of the above formula:

$$\dot{\omega}_i = \frac{(s_i \times a_{P_i}) - 2\dot{l}_i \omega_i}{l_i}.$$

S260: calculating the velocity spinor equations of the first articulation point and the second articulation point according to a velocity of the first articulation point and the angular velocity of the active coupling mechanism; and specifically, using a spiral theory, a velocity spinor $T_{P_i}$ of the first articulation point $P_i$ and the velocity spinor $T_{D_i}$ of the second articulation point $D_i$ are calculated according to the above-mentioned calculated velocity $v_{P_i}$ of the point $P_i$ and the angular velocity $\omega_i$ of the active coupling mechanism by the following formula:

$$T_{P_i} = \begin{bmatrix} \omega_i \\ v_{P_i} \end{bmatrix} = H_{P_i} T_O, H_{P_i} = \begin{bmatrix} H_i & \frac{S\langle s_i \rangle}{l_i} \\ -S\langle r_{P_i}\rangle & E_3 \end{bmatrix} (i = 1, 2, 3, 4);$$

$$T_{D_i} = \begin{bmatrix} \omega_i \\ 0_{3\times 1} \end{bmatrix} = H_{D_i} T_O, H_{D_i} = \begin{bmatrix} H_i & \frac{S\langle s_i \rangle}{l_i} \\ 0_{3\times 3} & 0_{3\times 3} \end{bmatrix} (i = 1, 2, 3, 4, 5);$$

wherein $H_i = \frac{(s_i^T b_i) E_3 - (b_i) s_i^T}{l_i}$, $T_o = \begin{bmatrix} \omega_P \\ v_P \end{bmatrix}$, the symbol $S\langle x \rangle$ is an antisymmetric matrix.

S270: calculating a force spinor equation of the first articulation point and the second articulation point from an acceleration of the first articulation point, the angular velocity of the active coupling mechanism, the angular acceleration of the active coupling mechanism, the unit vector in the telescopic direction of the active coupling mechanism, and a mass parameter of the parallel damping mechanism.

Specifically, the mass parameters of the parallel damping mechanism include: an inertia tensor $I_{ui}$ of the upper half of the UPS branch around a point $P_i$ under the following system, a linear parameter $\bar{I}_{ui}$ of the inertia tensor $I_{ui}$, the mass $m_{ui}$ of each upper half of the branch, a distance $c_{ui}$ of the hinge point on each branch from the center of mass of the upper half, the mass $m_{di}$ of each lower half of the branch, a distance $c_{di}$, of the hinge point on each branch from the center of mass of the lower half, the inertia tensor $I_{di}$ of the lower half of the UPS branch around the point $D_i$ under the following system, the linear parameter $\bar{I}_{di}$ of the inertia tensor $I_{di}$, and these mass parameters are obtained in real time in the calculation process.

According to the acceleration $a_{P_i}$ of the point $P_i$, the angular velocity $\omega_i$ of the active coupling mechanism, the angular acceleration $\dot{\omega}_i$ of the active coupling mechanism and the orientation vector $s_i$ of the telescopic direction of the active coupling mechanism obtained by the above-mentioned calculation using the spiral theory, and the force spinor equation $W_{P_i}$ of the first articulation point and the force spinor equation $W_{D_i}$ of the second articulation point are calculated by the following formula:

$$W_{P_i} = -\begin{bmatrix} 0_{3\times 1} & -s_i \times (a_{P_i} - g) & G_i \\ a_{P_i} - g & -[\dot{\omega}_i \times s_i + \omega_i \times (\omega_i \times s_i)] & 0_{3\times 2} \end{bmatrix} \begin{bmatrix} m_{ui} \\ m_{ui} c_{ui} \\ \tilde{I}_{ui} \end{bmatrix} =$$

$$-\left( Q_{P_i} p_{ui} + \begin{bmatrix} G_i \\ 0_{3\times 2} \end{bmatrix} \tilde{I}_{ui} \right);$$

wherein g is acceleration of gravity, $m_{ui}$ is the mass of the upper half of the UPS branch, $c_{ui}$ represents a distance from the center of mass to $P_i$, $I_{ui}$ is the inertia tensor of the upper half of the UPS branch around a point $P_i$ under the system, and $\bar{I}_{ui}$ the linear parameter of the inertia tensor $I_{ui}$;

In the above formula, $$Q_{P_i} = \begin{bmatrix} 0_{3\times 1} & -s_i \times (a_{P_i} - g) \\ a_{P_i} - g & -[\dot{\omega}_i \times s_i + \omega_i \times (\omega_i \times s_i)] \end{bmatrix}, P_u = \begin{bmatrix} m_{ui} \\ m_{ui} c_{ui} \end{bmatrix},$$

and $G_i = \begin{bmatrix} \dot{\omega}_{ix}^i & 0 \\ 0 & \dot{\omega}_{ix}^i \\ -\omega_{ix}^i \omega_{iy}^i & \omega_{ix}^i \omega_{iy}^i \end{bmatrix}$, wherein, $\dot{\omega}_{ix}^i$ is a three-dimensional angular acceleration vector in which the rotation axis of the center of mass of each electric cylinder branch is an x-axis under the joint space of each electric cylinder branch, $\omega_{ix}^i$ is a three-dimensional angular velocity vector in which the rotation axis of the center of mass of each electric cylinder branch is the x-axis under the joint space of each electric cylinder branch, and $\omega_{iy}^i$ is a three-dimensional angular velocity vector in which the rotation axis of the center of mass of each electric cylinder branch is a y-axis under the joint space of each electric cylinder branch;

$$W_{D_i} =$$

$$-\begin{bmatrix} 0_{3\times 1} & -s_i \times g & G_i \\ -g & [\dot{\omega}_i \times s_i + \omega_i \times (\omega_i \times s_i)] & 0_{3\times 3} \end{bmatrix} \begin{bmatrix} m_{di} \\ m_{di} c_{di} \\ \tilde{I}_{di} \end{bmatrix} = -\left( Q_{Di} p_{di} + \begin{bmatrix} G_i \\ 0_{3\times 2} \end{bmatrix} \hat{\bar{I}}_{di} \right);$$

wherein g is the acceleration of gravity, $m_{di}$ is the mass of the lower half of the UPS branch, $c_{di}$ represents a distance from the center of mass to $D_i$, $I_{di}$ is the inertia tensor of the lower half of the UPS branch around a point $D_i$ under the system, and $\bar{I}_{di}$ is the linear parameter of the inertia tensor $I_{di}$, $$Q_{D_i} = \begin{bmatrix} 0_{3\times 1} & -s_i \times g \\ -g & [\dot{\omega}_i \times s_i + \omega_i \times (\omega_i \times s_i)] \end{bmatrix} \text{ and } P_{di} = \begin{bmatrix} m_{di} \\ m_{di} c_{di} \end{bmatrix}.$$

In this embodiment, by using a spiral theory, each part of the parallel damping mechanism is decomposed, and the velocity spinor equation and the force spinor equation of each part of the parallel damping mechanism in the joint space are obtained.

On the basis of the embodiment described above, the parallel damping mechanism is dynamically modeled according to a virtual power principle by the following formula:

$$\dot{q}^T(F - F_f)\delta t + \left[\sum_{i=1}^{4}(T_{P_i}^T W_{P_i})\sum_{i=1}^{5}(T_{D_i}^T W_{D_i}) + T_P^T W_P\right]\delta t = 0;$$

wherein F is an electric cylinder output force vector, $F_f$ is an electric cylinder friction vector, $T_{P_i}$ is a velocity spinor equation of the first articulation point, $W_{P_i}$ is a force spinor equation of the first articulation point, $T_{D_i}$ is a velocity spinor equation of the second articulation point, $W_{D_i}$ is a force spinor equation of the second articulation point, $T_P$ is a velocity spinor equation of a central point of the moving platform (upper platform), and $W_P$ is a force spinor equation of a central point of the moving platform (upper platform);

since the UPS branches have no freedom of spin, $\omega_i \cdot s_i = 0$, the following can be obtained:

$$\dot{q} = \begin{bmatrix} \dot{l}_1 \\ \dot{l}_2 \\ \dot{l}_3 \\ \dot{l}_4 \end{bmatrix} = J_{inv}\begin{bmatrix} \omega_P \\ v_P \end{bmatrix};$$

according to the formula, the dynamics model of the parallel damping mechanism is obtained by combining an inverse Jacobian matrix $$J_{inv}^T(F - F_f) = \Phi p_m;$$

$$\Phi = \left[\sum_{i=1}^{4} H_{D_i}^T Q_{D_i} \quad \sum_{i=1}^{4} H_{P_i}^T Q_{P_i} \quad \sum_{i=1}^{4}\left[H_i \quad \frac{S\langle s_i \rangle}{l_i}\right]^T G_i \quad H_P^T Q_P\right];$$

$$p_m = \begin{bmatrix} p_d \\ p_u \\ \bar{\bar{I}}_d + \bar{\bar{I}}_u \\ p_p \end{bmatrix};$$

wherein $J_{inv}$ is an inverse Jacobian matrix; $P_{di}$ is the mass parameter of the lower half of each branch, these parameters are generally uniform in size, i.e. $P_d = P_{di}$ Is defaulted, and likewise the mass parameters of the upper half of each branch are default to be equal in size, i.e. $P_u = P_{ui}$ and so on, $\bar{I}_d = \bar{I}_{di}$ and $\bar{\bar{I}}_u = \bar{\bar{I}}_{ui}$.

Figure 9:
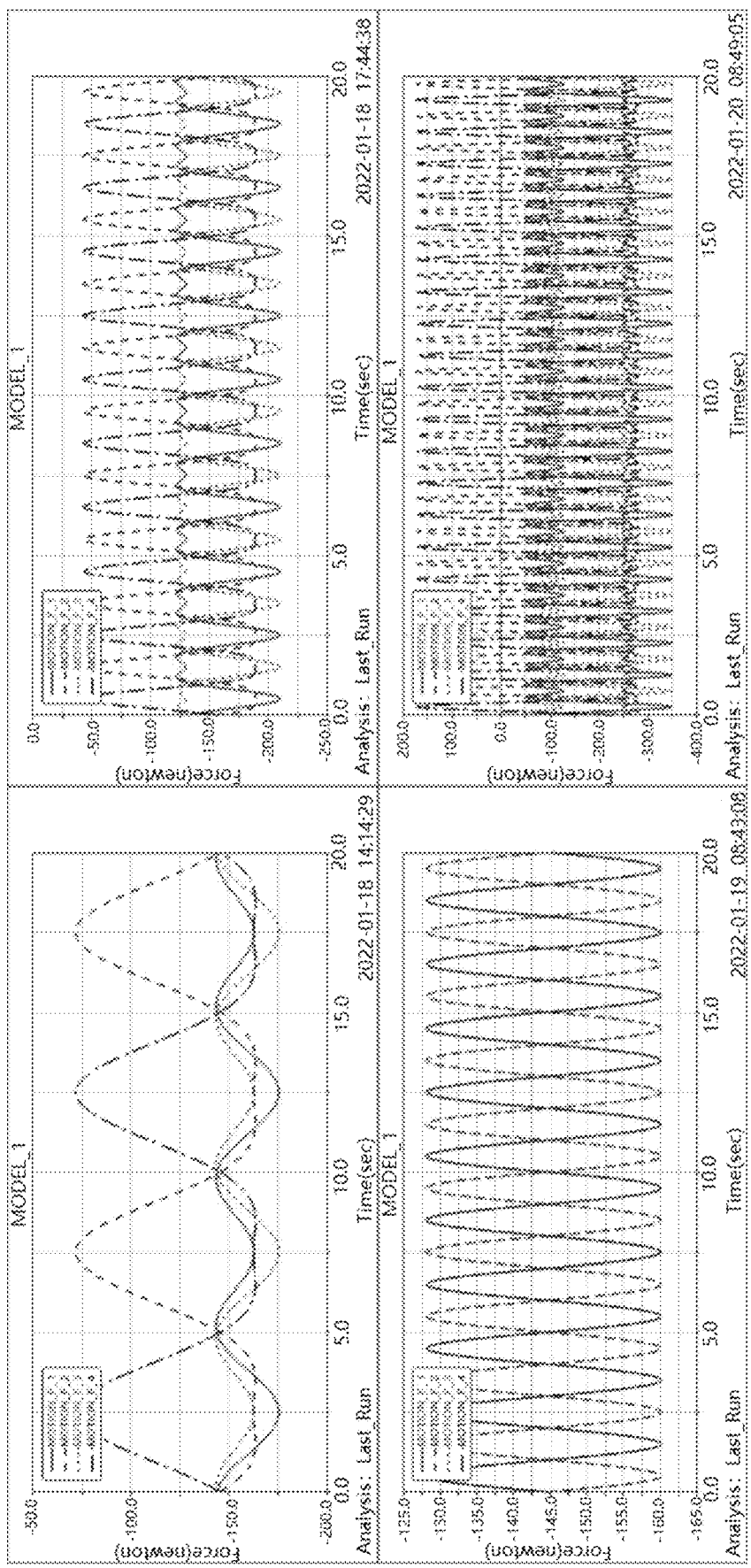
FIG. 9 is a time-domain curve of output force of each electric cylinder under four excitation combinations according to a second embodiment of the present invention.

As shown in FIG. 9, a graph of an upper left corner shows the simulation results of the output force of four electric cylinder branches when a pitch angle of a lower platform is a sine curve with an amplitude of ±6° and a frequency of 0.1 Hz, a roll angle of ±4° and a frequency of 0.1 Hz; an icon in the upper right corner represents the simulation results of an output force of the four electric cylinder branches when the pitch angle of the lower platform is a sine curve with an amplitude of ±3° and a frequency of 0.5 Hz, and a roll angle of ±5° and a frequency of 0.5 Hz; the graph of the lower left corner shows the simulation results of the output of the four electric cylinders when the pitch angle of the lower platform is ±3° and the frequency is 0.5 Hz; the graph in the lower right corner shows the simulation results of the output of four electric cylinder branches when the pitch angle of the lower platform is a sine curve with amplitude of ±4° and a frequency of 1 Hz, and a roll angle of ±6° and a frequency of 1 Hz.

Figure 10:
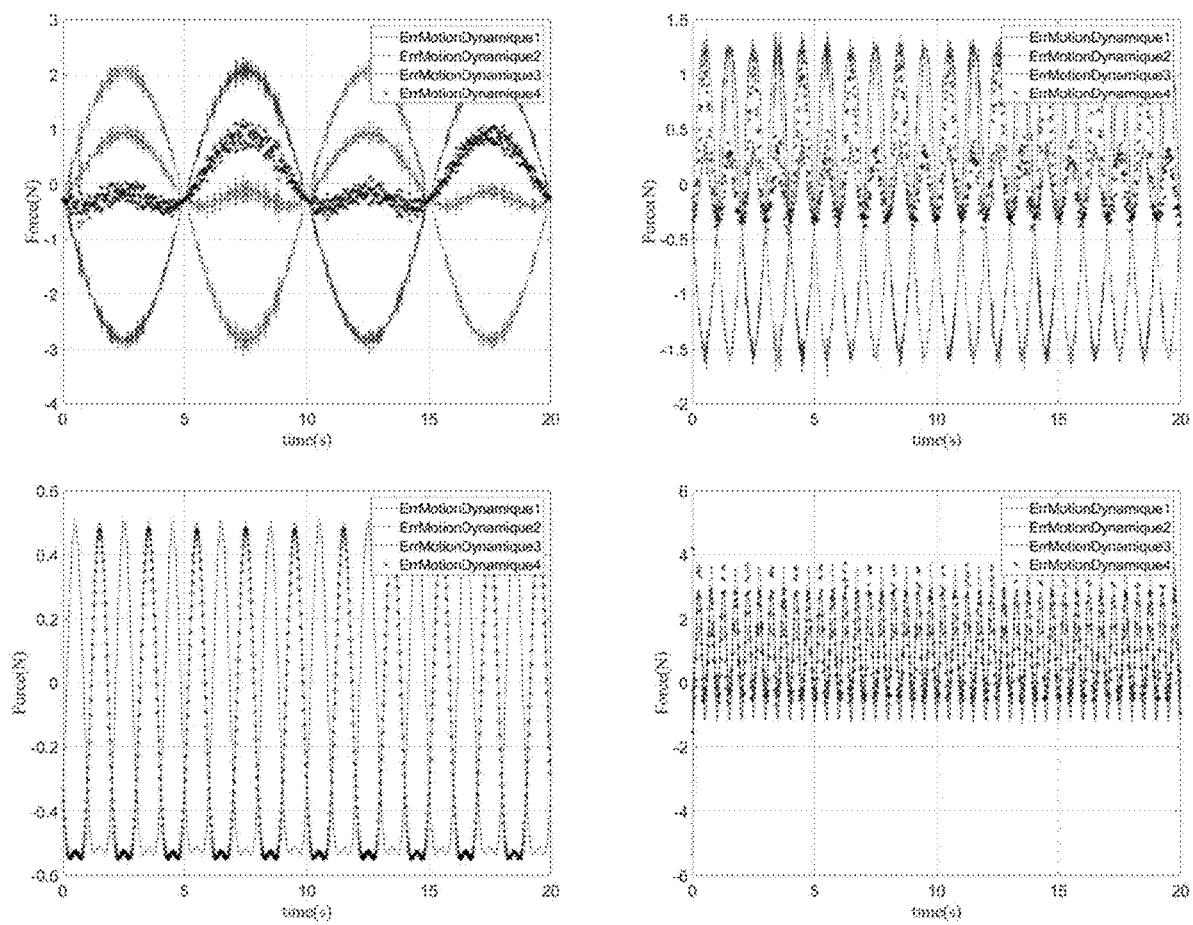
FIG. 10 is a time-domain curve of an output error of an electric cylinder according to a second embodiment of the present invention.

In Matlab, an equation is constructed according to the above-mentioned dynamics model, and the mass parameters of each part of the parallel mechanism are obtained from Adams, and are substituted into the dynamics model, and the real-time output forces of the four electric cylinders are calculated by using time-domain excitation in four different pitching and rolling sinusoidal curves, and the output forces are subtracted from the simulation results of Adams in FIG. 9, and the obtained error values are as shown in FIG. 10; the graph of the upper left corner shows that when the pitching angle of the lower platform is a sinusoidal curve with an amplitude of ±6° and a frequency of 0.1 Hz, a roll angle of ±4° and a frequency of 0.1 Hz, there is error between the output simulation of the four electric cylinders and the result of dynamics model calculation; the graph in the upper right corner indicates an error between the simulation results of output force of the four electric cylinders branches and the calculation results of the dynamics model when the pitch angle of the lower platform is a sine curve with an amplitude of ±3° and a frequency of 0.5 Hz, a roll angle of ±5° and a frequency of 0.5 Hz; the graph in the lower left corner shows an error between the simulation results of the output force of four electric cylinders branches and the calculation results of the dynamics model when the pitch angle of the lower platform is ±3° and the frequency is 0.5 Hz, the graph in the lower right corner indicates an error between the simulation results of the output force of four electric cylinder branches and the calculation results of the dynamics model when the pitch angle of the lower platform is a sine curve with an amplitude of ±4° and a frequency of 1 Hz, a roll angle of ±6° and a frequency of 1 Hz.

It can be seen from FIG. 10 that the output of each electric cylinder can be up to 350 N, with an error of up to 5 N, and the results obtained by verification are relatively accurate. In this embodiment, a virtual power theorem is used for solving the sum of the product of the velocity spinor and the force spinor of each part of the parallel damping mechanism, and the Jacobian matrix is substituted to complete the dynamics modeling of the parallel mechanism. Compared with a traditional Lagrangian method and other dynamic calculation methods, the formula of the model is simple and applicable to embedded systems with high real-time requirements.

Step S400 includes:

S401: calculating a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;

S402: calculating a vertical error value between the lower and upper platforms according to the vertical velocities of the upper and lower platforms, wherein the vertical error value comprises vertical displacement difference, a vertical velocity difference and a vertical acceleration difference; and S403: substituting the pitch angle difference, the roll angle difference, the pitch angular velocity difference, the roll angular velocity difference, the pitch angle acceleration difference, the roll angle acceleration difference, and the vertical error value into the dynamics model to calculate to obtain the control force of the driving mechanism.

In this embodiment, the pitch angular velocity, roll angular velocity and vertical velocity of the upper and lower platforms are calculated to obtain the posture error values of the lower and upper platforms in three degrees of freedom in pitch, roll and vertical directions, and these posture error values are substituted into the dynamics model of the parallel damping mechanism to calculate the control force of the driving mechanism, so that the active coupling mechanism maintains the balance of the upper platform according to the control force.

Step S400 includes:

S410: calculating a pitch angle and a roll angle of the upper and lower platforms and a pitch angle acceleration and a roll angle acceleration of the lower platform according to the pitch angular velocity and the roll angular velocity of the upper and lower platforms;

Specifically, a pitch angular velocity $\dot{\alpha}_P$ of the upper platform, a roll angular velocity $\dot{\beta}_P$ of the upper platform, a pitch angular velocity $\dot{\alpha}_D$ of the platform and a roll angular velocity $\dot{\beta}_D$ of the lower platform are obtained by a sensor; a pitch angle $\alpha_P$ of the upper platform, a roll angle $\beta_P$ of the upper platform, a pitch angle $\alpha_D$ of the lower platform and a roll angle $\beta_D$ of the lower platform are obtained by integrating over time; and pitch angle acceleration $\ddot{\alpha}_D$ of the lower platform and roll angle acceleration $\ddot{\beta}_D$ of the lower platform are obtained by differentiating over time.

S411: calculating the pitch angle difference, the roll angle difference, the pitch angular velocity difference and the roll angular velocity difference between an upper platform and a lower platform according to the pitch angle, the roll angle, the pitch angular velocity and the roll angular velocity of the upper and lower platforms;

S412: calculating the pitch angle acceleration difference between an upper platform and a lower platform using a proportional integral (PI) control algorithm according to the pitch angle acceleration, the pitch angle, and the pitch angle acceleration of the lower platform;

S413: calculating the roll angle acceleration difference between an upper platform and a lower platform using the PI control algorithm according to the roll angle acceleration, the roll angle, and the roll angular velocity of the lower platform;

Specifically, in order to maintain the balance of the upper platform, the mechanism is required to compensate for the angle $\alpha_D$, $\beta_D$ in the direction of the pitch and roll angles of the lower platform at this time, and it is necessary to control the angular velocity of $-\dot{\alpha}_P$, $-\dot{\beta}_P$ and the angle of $-\alpha_P$, $-\beta_P$ to approach zero through the mechanism rotation to ensure the balance of the upper platform;

By PI control, we set:

$$\Delta\alpha = -\alpha_D - \alpha_P; \Delta\dot{\alpha} = -\dot{\alpha}_D - \dot{\alpha}_P; \Delta\ddot{\alpha} = -\ddot{\alpha}_D - k_\alpha \alpha_P - c_\alpha \dot{\alpha}_P;$$

$$\Delta\beta = -\beta_D - \beta_P; \Delta\dot{\beta} = -\dot{\beta}_D - \dot{\beta}_P; \Delta\ddot{\beta} = -\ddot{\beta}_D - k_\beta \beta_P - c_\beta \dot{\beta}_P;$$

wherein $k_\alpha$, $k_\beta$, $c_\alpha$, and $c_\beta$ are PI control parameters.

S414: calculating vertical displacement of the upper and lower platforms and a vertical acceleration of the lower platform according to the vertical velocities of the upper and lower platforms;

specifically, a vertical velocity $\dot{z}_P$ of the upper platform and a vertical velocity $\dot{z}_D$ of the lower platform are obtained by a sensor, the vertical displacement $z_P$ and $z_D$ of the upper and lower platforms are respectively obtained by integrating the time, and vertical acceleration $\ddot{z}_D$ of the lower platform is obtained by deriving the time.

S415: calculating the vertical displacement difference and the vertical velocity difference between the lower and upper platforms according to the vertical velocities and the vertical displacement of the upper and lower platforms; and S416: calculating the vertical acceleration difference between the lower and upper platforms using a skyhook damping control algorithm according to the vertical acceleration of the lower platform, the vertical velocity of the upper platform, the vertical displacement difference, and the vertical velocity difference;

specifically, a vertical error value is calculated by a skyhook damping algorithm:

$$\Delta z = -z_P - z_D; \Delta \dot{z} = -\dot{z}_P - \dot{z}_D;$$

$$\Delta \ddot{z} = -\ddot{z}_D - k_z \Delta z - c_z \Delta \dot{z} - s_z \dot{z}_P$$

wherein $k_z$, $c_z$, $s_z$ are skyhook damping control parameters.

S417: substituting the pitch angle difference, the roll angle difference, the pitch angular velocity difference, the roll angular velocity difference, the pitch angle acceleration difference, the roll angle acceleration difference, and the vertical error value into the dynamics model to calculate to obtain a control force (electric cylinder output force) of the driving mechanism.

Specifically, the calculated $\Delta\alpha$, $\Delta\beta$, $\Delta z$, $\Delta\dot{\alpha}$, $\Delta\dot{\beta}$, $\Delta\dot{z}$, $\Delta\ddot{\alpha}$, $\Delta\ddot{\beta}$, and $\Delta\ddot{z}$ are substituted into the dynamics model $\Phi$ of the parallel damping mechanism, the control force (electric cylinder output force) of the driving mechanism is calculated according to a formula $J_{inv}^T(F-F_f) = \Phi p_m$, so that the driving mechanism controls the active coupling mechanism according to the control force, and drives the active coupling mechanism to adjust the balance of the upper platform.

Figure 11:
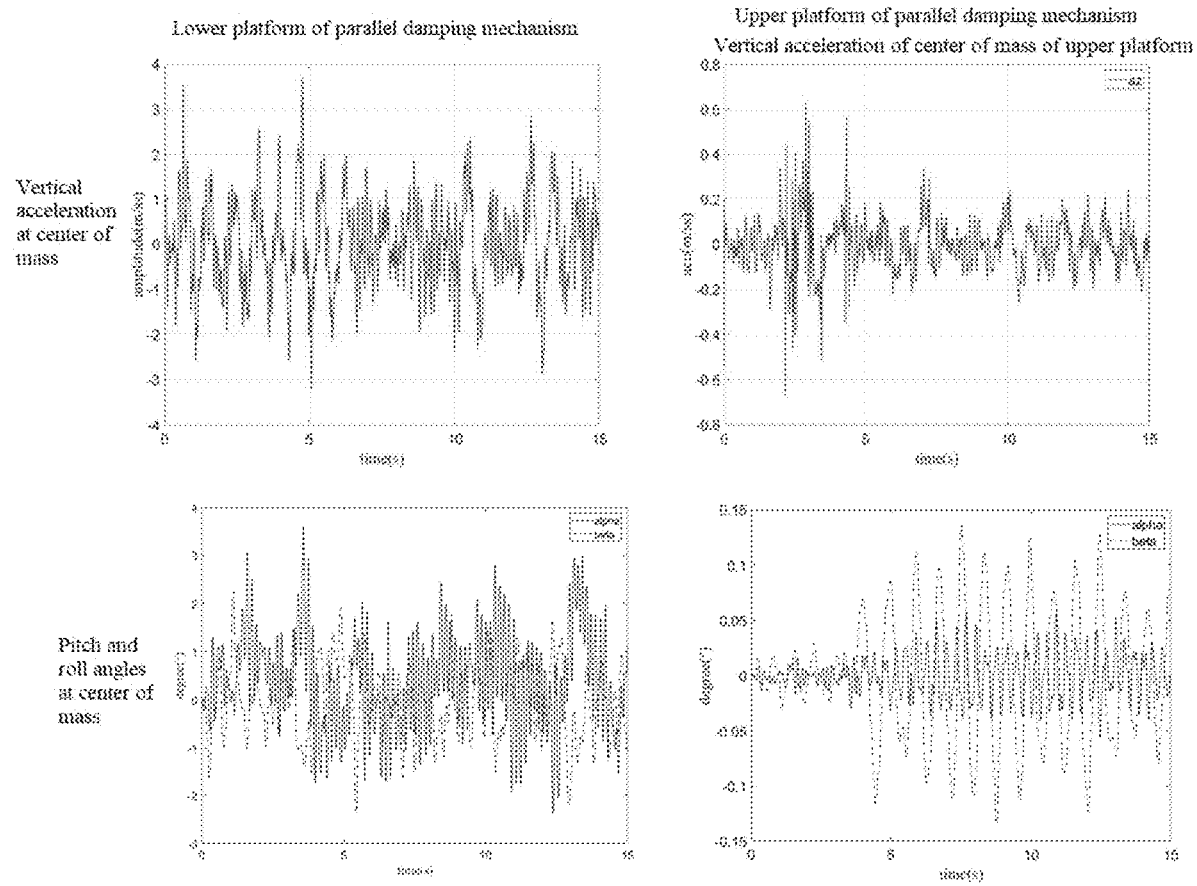
FIG. 11 is a co-simulation result of Adams and Simulink according to a second embodiment of the present invention.

In co-simulation of Adams and Simulink, the pitch, roll and vertical excitations generated by a white noise method on the lower platform are combined at the center of the vehicle chassis when the vehicle velocity is 30 km/h on grade D road segment. The parallel damping mechanism is controlled by the above method. The simulation results are as shown in FIG. 11, the vertical acceleration decreases by about 80% from the peak value of 3.5 m/s² on the lower platform to the peak value of 0.6 m/s² on the upper platform. At the same time, the pitch angle and roll angle are reduced from 2° and 3° of the lower platform to 0.05° and 0.1° of the moving platform, so this solution is considered to greatly improve the efficiency of damping.

Figure 12:
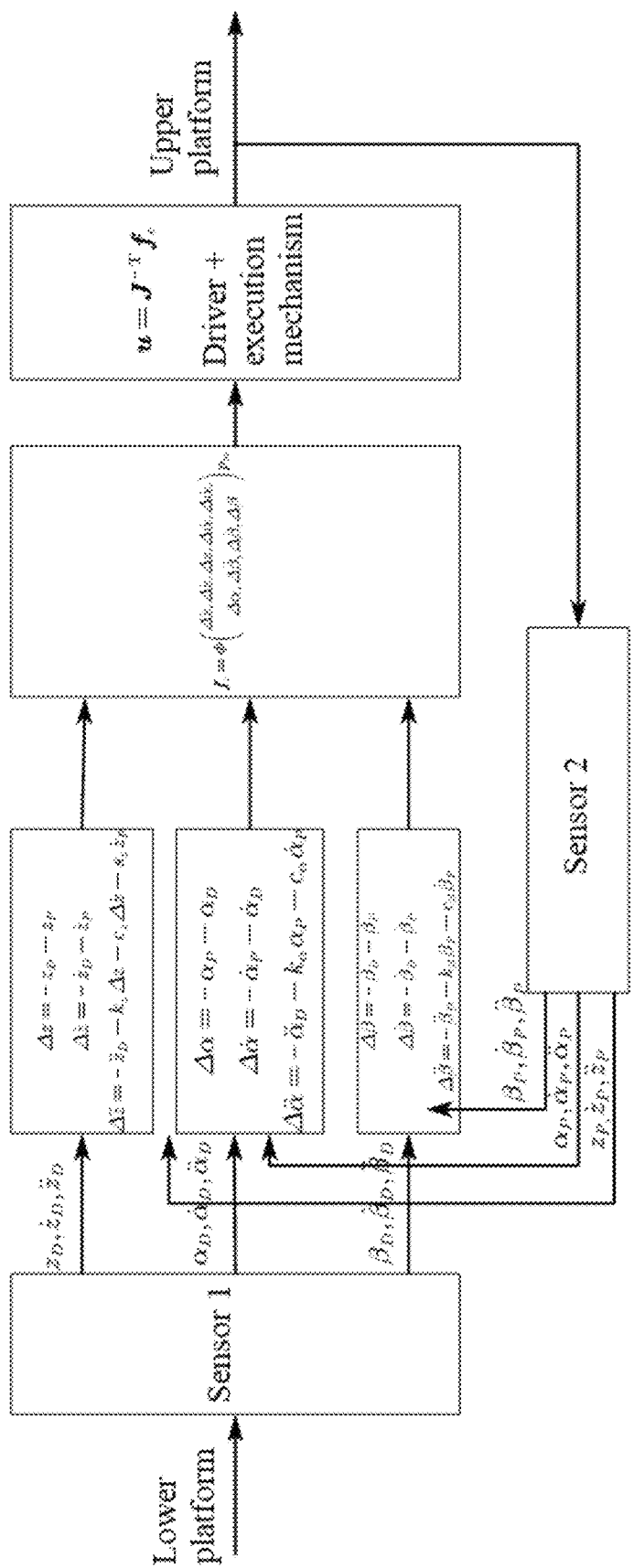
FIG. 12 is a block diagram showing a control algorithm according to a second embodiment of the present invention.

As shown in FIG. 12, the control algorithm block diagram in this embodiment ensures the anti-roll performance of the mechanism by performing PI control on the pose of the pitch angle and roll angle; by skyhook damping control of vertical acceleration, the acceleration generated by bottom excitation is greatly reduced, and the damping efficiency is greatly improved.

On the basis of the above-mentioned embodiment, step S500 then comprises:

S600: acquiring current pose information about the upper platform in real time; and S700: adjusting the electric cylinder output force (electric cylinder output force) according to the pose information of the lower platform and the current pose information.

In this embodiment, the output force of the electric cylinder can be calculated based on the current pose information of the upper platform, and the posture of the upper platform can be controlled in real time based on the control force.

Figure 13:
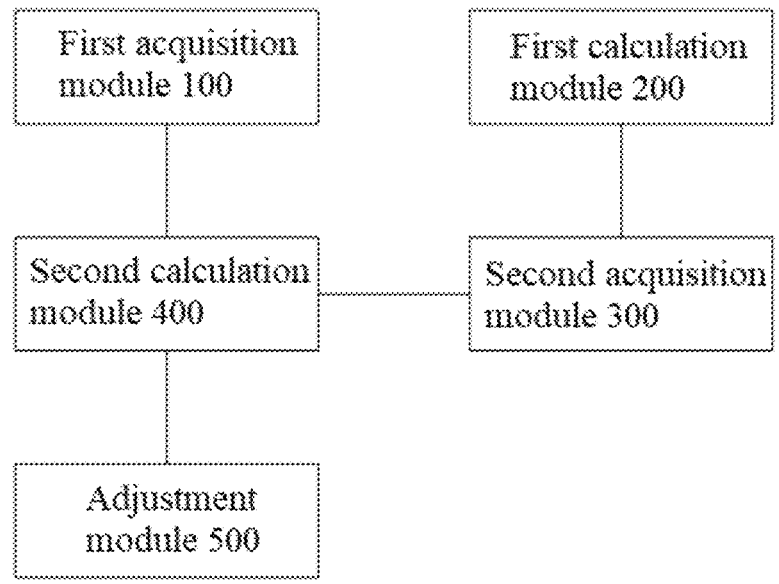
FIG. 13 is a block diagram showing an embodiment of a damping mechanism control system according to the present invention.

In an embodiment of the present invention, as shown in FIG. 13, an active damping mechanism control system is provided and applied to a parallel damping mechanism, wherein the parallel damping mechanism comprises upper and lower platforms, wherein centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising a first acquisition module 100, a first calculation module 200, a second acquisition module 300, a second calculation module 400 and an adjustment module 500, wherein:

- a first acquisition module 100 is configured to acquire pose information about the upper and lower platforms respectively, wherein the pose information comprises a pitch angular velocity, a roll angular velocity, and a vertical velocity;
- a first calculation module 200 is configured to respectively calculate a spinor equation of a central point of the upper platform, a first articulation point and a second articulation point, wherein the spinor equation comprises a velocity spinor equation and a force spinor equation, the first articulation point is a connection point of the driving mechanism and the upper platform, and the second articulation point is a connection point of the driving mechanism and the lower platform and a connection point of the passive coupling mechanism and the lower platform;
- a second acquisition module 300 is configured to dynamically model the damping mechanism according to the spinor equation to obtain a dynamics model of the damping mechanism;
- a second calculation module 400 is configured to calculate a control force (electric cylinder output force) of the driving mechanism from the pose information of the upper and lower platforms and the dynamics model; and
- an adjustment module 500 is configured to control the active coupling mechanism according to the control force to adjust the pose information of the upper platform.

The second calculation module comprises a first calculation sub-module, a second calculation sub-module and a third calculation sub-module, wherein:

- a first calculation sub-module configured to calculate a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;
- a second calculation sub-module configured to calculate a vertical error value between the lower and upper platforms according to the vertical velocities of the upper and lower platforms, wherein the vertical error value comprises a vertical displacement difference, a vertical velocity difference and a vertical acceleration difference;
- a third calculation sub-module is configured to substitute the pitch angle difference, the roll angle difference, the pitch angular velocity difference, the roll angular velocity difference, the pitch angle acceleration difference, the roll angle acceleration difference, and the vertical error value into the dynamics model to calculate to obtain the control force (electric cylinder output force) of the driving mechanism.

The first calculation sub-module comprises a first calculation unit, a second calculation unit and a third calculation unit, wherein:

- a first calculation unit configured to calculate a pitch angle and a roll angle of the upper and lower platforms and a pitch angle acceleration and a roll angle acceleration of the lower platform according to the pitch angular velocity and the roll angular velocity of the upper and lower platforms;
- a second calculation unit configured to calculate the pitch angle difference, the roll angle difference, the pitch angular velocity difference and the roll angular velocity difference between an upper platform and a lower platform according to the pitch angle, the roll angle, the pitch angular velocity and the roll angular velocity of the upper and lower platforms;
- a third calculation unit configured to calculate the pitch angle acceleration difference between an upper platform and a lower platform using a proportional integral (PI) control algorithm according to the pitch angle acceleration, the pitch angle, and the pitch angle acceleration of the lower platform;
- wherein the third calculation unit is further configured to calculate the roll angle acceleration difference between an upper platform and a lower platform using the PI control algorithm according to the roll angle acceleration, the roll angle, and the roll angular velocity of the lower platform.

The second calculation sub-module comprises a fourth calculation unit, a fifth calculation unit and a sixth calculation unit, wherein:

- a fourth calculation unit configured to calculate vertical displacement of the upper and lower platforms and a vertical acceleration of the lower platform according to the vertical velocities of the upper and lower platforms;
- a fifth calculation unit configured to calculate the vertical displacement difference and the vertical velocity difference between the lower and upper platforms according to the vertical velocities and the vertical displacement of the upper and lower platforms; and
- a sixth calculation unit configured to calculate the vertical acceleration difference between the lower and upper platforms using a skyhook damping control algorithm according to the vertical acceleration of the lower platform, the vertical velocity of the upper platform, the vertical displacement difference, and the vertical velocity difference.

This embodiment is based on spinor control of the driving mechanism, so that the moving platform (upper platform) of the parallel damping mechanism of an active-passive axis hybrid is in a static state in a plane in addition to the movement in a vertical direction, and the effect of the load moment of inertia on the instability of the platform can be effectively reduced, and the power loss can be reduced.

In this embodiment, the dynamics model of a parallel robot is solved by a spiral theory. Compared with the traditional Lagrangian method and other dynamic calculation methods, the formula of the model is simple and applicable to embedded systems with high real-time requirements.

In this embodiment, the pitch angle and roll angle are PI controlled to ensure the anti-rolling performance of the mechanism, and at the same time, since the mechanism itself is in the form of a series-parallel connection of active and passive axes, the passive axis ensures that the upper platform does not produce horizontal displacement and basically ensures the stability of the damping platform in the horizontal direction, and by controlling the vertical acceleration, the acceleration generated by the bottom excitation is greatly reduced, so that the damping efficiency is greatly improved;

this embodiment is a control algorithm based on active damping, and its damping effect and stability are superior to those of passive damping.

Figure 14:
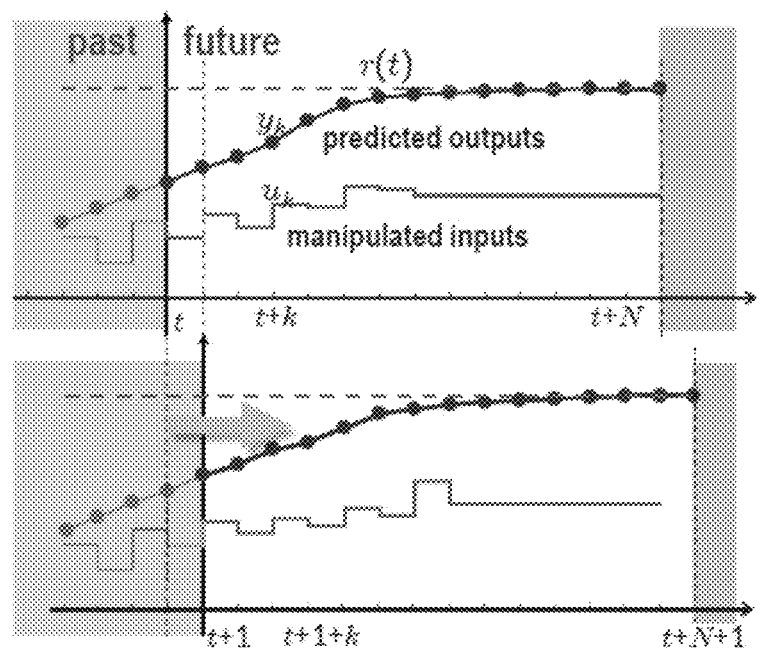
FIG. 14 is a structural schematic diagram showing a three-model predictive control according to an embodiment of the present invention.

Embodiment III with reference to FIG. 14 in the description, a core idea of the model predictive control provided in the this embodiment is to carry out predictive control, at time t, a predictive model is established according to a discrete state equation, the output quantity y(t+k|t), k=1, 2, . . . , N at N future times is estimated, by optimizing the control quantity u(t+k|t), k=0, 2, . . . , m−1 at m future times, making the output quantity sequence y(t+k|t), k=1, 2, . . . , N as close to an expected trajectory r(t) as possible, and making the control quantity smooth, and at the same time considering various limiting conditions existing in the input quantity and the output quantity, finally calculating an optimal control quantity sequence u(t+k|t), k=0, 2, . . . , m−1 at time t, taking the first value in the sequence as the actual control quantity at the current time, and repeating the above process at each subsequent time.

Model predictive control can achieve better control effect than traditional control theory by predicting the future, and it can deal with various constraints actively, which is very suitable for practical complex engineering environment. As a multi-dimensional active damping device is a standard multi-input multi-output system, and there are various constraints such as stroke limit, motion space limit, execution mechanism power/output limit and so on, it is difficult to design an ideal control algorithm by using a traditional control theory. Therefore, the present invention proposes to design a multi-dimensional active damping device with model predictive control, which can realize optimal control under multi-constraints including predictive information.

Figure 15:
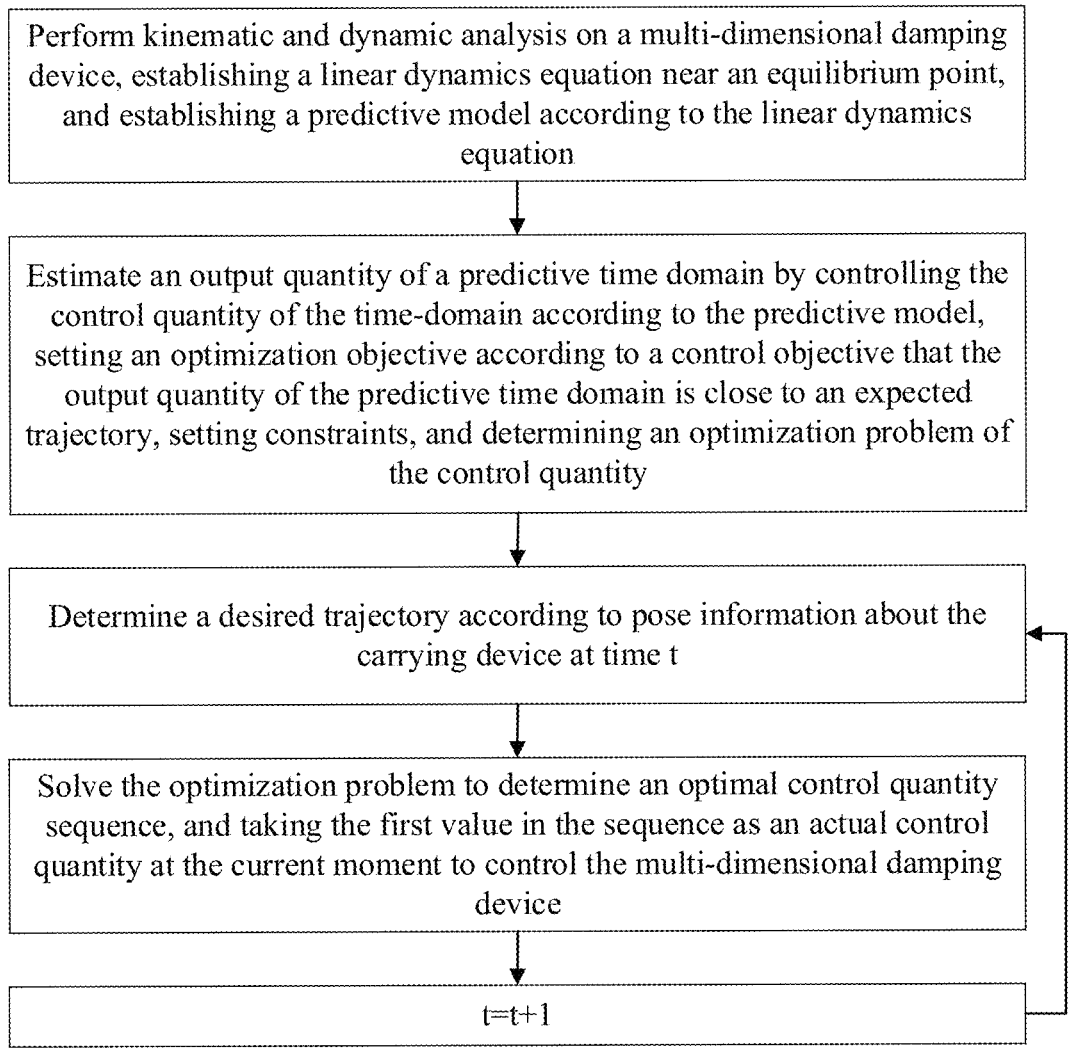
FIG. 15 is a flowchart according to a third embodiment of the present invention.

With reference to FIG. 15, the present invention provides a multi-dimensional damping control method based on model predictive control, applied to a multi-dimensional damping device, the method comprising the following steps:

Step 1: performing kinematic and dynamic analysis on a multi-dimensional damping device, establishing a linear dynamics equation near an equilibrium point, and establishing a predictive model according to the linear dynamics equation.

The kinetic equations of the robot are established in the robot's task space (also referred to as the operating space, here the inertial space of the platform on the multi-dimensional active damping device) as shown below.

$$M(\varphi)\ddot{\varphi}+\zeta(\varphi,\dot{\varphi})=J^T(\varphi)u \quad (1)$$

wherein $\varphi$ is a task space coordinate; $M(\varphi)$ is a mass matrix of the robot in the task space; $\zeta(\varphi, \dot{\varphi})$ is a centrifugal force, a Coriolis force, a friction, a gravity force, a rigidity force and a damping force of the robot in the task space; u is the control force exerted by each execution mechanism in the joint space of the robot; and $J(\varphi)$ is the velocity/force mapping Jacobian matrix of the robot, i.e. satisfying $$\dot{q}=J(\varphi)\dot{\varphi} \quad (2)$$

in the above formula, $\dot{q}$ is the joint space velocity of the robot; and $\dot{\varphi}$ is the robot task space velocity.

Since the multi-dimensional active damping device generally works near the equilibrium point, linearization can be performed near the equilibrium point, and a linear kinetic equation with a small offset is established, i.e., $$M_0\ddot{\varphi}+C_0\dot{\varphi}+K_0\varphi=J_0^T u \quad (3)$$

wherein $M_0$ is the task space quality matrix at the equilibrium point; $C_0$ is the task space damping matrix at the equilibrium point; $K_0$ is the task space stiffness matrix at the equilibrium point; and $J_0$ is the Jacobian matrix at the equilibrium point, and each of the above matrices is a constant value matrix.

According to equation (3), a discrete state equation and an output equation at time t are established as $$\begin{cases} x(t+1) = Ax(t) + Bu(t) \\ y(t) = Cx(t) \end{cases} \quad (4)$$

wherein $$x = \begin{bmatrix} \varphi \\ \dot{\varphi} \end{bmatrix}, A = I + T_s \begin{bmatrix} 0 & I \\ -M_0^{-1}K_0 & -M_0^{-1}C_0 \end{bmatrix}, B = T_s \begin{bmatrix} 0 \\ M_0^{-1}J_0^T \end{bmatrix} \quad (5)$$

in the above equation, $T_s$ is a sampling period. The output equation is determined from the sensor measurements, for example, when the state quantity X is fully measurable, at this time, C=I.

The incremental form of formula (4) is $$\begin{cases} \Delta x(t+1) = A\Delta x(t) + B\Delta u(t) \\ y(t) = y(t-1) + C\Delta x(t) \end{cases} \quad (6)$$

According to the above equation, the predictive model of the future N steps is obtained as $$Y_p(t+1|t)=S_x\Delta x(t)+S_y y(t)+S_u \Delta U_m(t) \quad (7)$$

wherein $Y_p(t+1|t)$ is an output sequence vector for predicting N future moments at time t, and $\Delta U_m(t)$ is an input sequence vector for predicting m future time instants at time t;

$$Y_p(t+1|t) = \begin{bmatrix} y(t+1|t) \\ y(t+2|t) \\ \vdots \\ y(t+N|t) \end{bmatrix}, \Delta U_m(t) = \begin{bmatrix} \Delta u(t|t) \\ \Delta u(t+1|t) \\ \vdots \\ \Delta u(t+m-1|t) \end{bmatrix} \quad (8)$$

parameter matrix $S_x$, $S_y$, and $S_u$ are respectively $$S_x = \begin{bmatrix} CA \\ \sum_{i=1}^{2} CA^i \\ \vdots \\ \sum_{i=1}^{N} CA^i \end{bmatrix}, \quad (9)$$

-continued $$S_y = \begin{bmatrix} I \\ I \\ \vdots \\ I \end{bmatrix},$$

$$S_u = \begin{bmatrix} CB & 0 & 0 & \cdots & 0 \\ \sum_{i=1}^{2} CA^{i-1}B & CB & 0 & \cdots & 0 \\ \vdots & \vdots & \vdots & \cdots & \vdots \\ \sum_{i=1}^{m} CA^{i-1}B & \sum_{i=1}^{m-1} CA^{i-1}B & \square & \cdots & CB \\ \vdots & \vdots & \vdots & \ddots & \vdots \\ \sum_{i=1}^{N} CA^{i-1}B & \sum_{i=1}^{N-1} CA^{i-1}B & \cdots & \cdots & \sum_{i=1}^{N-m+1} CA^{i-1}B \end{bmatrix}$$

Step 2: estimating an output quantity of a predictive time domain by controlling the control quantity of the time-domain according to the predictive model, setting an optimization objective according to a control objective that the output quantity of the predictive time domain is close to an expected trajectory, setting constraints, and determining an optimization problem of the control quantity.

At each time t, a control quantity $u(t+k|t)$, $k=0, 2, \ldots, m-1$ (m is a control time-domain) at m future times is input into the predictive model as an input quantity, and an output quantity $y(t+k|t)$, $k=1, 2, \ldots, N$ (N is a predictive time domain) at N future times of the multi-dimensional damping device can be estimated to achieve an effect of pre-determination in advance.

A control objective of the multi-dimensional damping device is to optimize the control variables $u(t+k|t)$, $k=0, 2, \ldots, m-1$ at the next m moments, to make the output sequence $y(t+k|t)$, $k=1, 2, \ldots, N$ as close to the desired trajectory $r(t)$ as possible, and to make the control variables smooth.

An optimization objective value is set according to the above-mentioned control objective as $$J(x(t), \Delta U_m(t)) = \|\Gamma_y [Y_p(t+1|t) - R(t+1)]\|^2 + \|\Gamma_u \Delta U_m(t)\|^2 \quad (10)$$

wherein $R(t+1)$ is an expected trajectory point vector; $\Gamma_y$ is an output weight matrix; and $\Gamma_u$ is an input weight matrix $$R(t+1) = \begin{bmatrix} r(t+1) \\ r(t+2) \\ \vdots \\ r(t+N) \end{bmatrix}, \quad (11)$$

$$\Gamma_y = \begin{bmatrix} \Gamma_{y,1} & & & \\ & \Gamma_{y,2} & & \\ & & \ddots & \\ & & & \Gamma_{y,N} \end{bmatrix},$$

$$\Gamma_u = \begin{bmatrix} \Gamma_{u,1} & & & \\ & \Gamma_{u,2} & & \\ & & \ddots & \\ & & & \Gamma_{u,m} \end{bmatrix}$$

According to the predictive model of formula (7), an equivalent objective value of the formula optimization objective is obtained.

$$\tilde{J}(x(t), \Delta U_m(t)) = \Delta U_m(t)^T H \Delta U_m(t) + G(t+1|t)^T \Delta U_m(t) \quad (12)$$

wherein $$H = S_u^T \Gamma_y^T \Gamma_y S_u + \Gamma_u^T \Gamma_u$$

$$G(t+1|t) = 2 S_u^T \Gamma_y^T \Gamma_y [Y_p(t+1|t) - R(t+1)] \quad (13)$$

Constraints such as stroke constraints, task space constraints and execution mechanism power/output constraints of the multi-dimensional damping device can all be converted into input and output constraints, i.e.

$$u_{min}(t+k) \leq u(t+k|t) \leq u_{max}(t+k), k=0,1,\ldots,m-1$$

$$\Delta u_{min}(t+k) \leq \Delta u(t+k|t) \leq \Delta u_{max}(t+k), k=0,1,\ldots,m-1$$

$$y_{min}(t+k) \leq y(t+k|t) \leq y_{max}(t+k), k=1,2,\ldots,N \quad (14)$$

The above constraints can be transformed to a unified constraint form $L\Delta U_m(t) \leq b$.

Thus, the optimization problem can be summarized as $$\min_{\Delta U_m(t)} \Delta U_m(t)^T H \Delta U_m(t) + G(t+1|t)^T \Delta U_m(t) \text{ s.t. } L\Delta U_m(t) \leq b \quad (15)$$

Step 3: determining the expected trajectory according to pose information about the carrying device at time t.

In the multi-dimensional active damping device, an inertial navigation unit is used for measuring the real-time pose information of a carrying device (vehicle or vessel), the position and velocity of the corresponding dimension in the task space of the damping device are taken as the input pose $r_{In}$, and an expected trajectory of the task space of the robot is set $r(t) = -r_{In}$, i.e., under ideal conditions, the multi-dimensional active damping device can completely compensate vibration disturbance of the vehicle or vessel.

In the actual measurement process, the inertial navigation unit has measurement noise and deviation. According to the characteristics of each sensor (an accelerometer, a gyroscope, a magnetometer, GPS, etc.) in the inertial navigation unit, a multi-sensor sensing fusion algorithm can be designed to obtain high-precision input pose information.

Since the information of the desired trajectory $r(t)$ after N moments needs to be obtained in advance in the model predictive control, methods for obtaining the information in advance include, but are not limited to, the following methods:

(1) mounting another inertial navigation unit at a front position of a vehicle or a vessel;
(2) mounting a vehicle height sensor on a suspension of a vehicle, and performing early estimation in combination with a vehicle dynamics model;
(3) a visual sensor (a vision camera, a laser radar, a millimeter wave radar, etc.) is mounted in front of the vehicle to sense the fluctuation information of the road segment in advance, and the vehicle dynamics model is used for pre-determination.

Step 4: solving the optimization problem to determine an optimal control quantity sequence, and taking the first value in the sequence as an actual control quantity at the current moment to control the multi-dimensional damping device.

Since the optimization problem of equation (15) belongs to the standard convex optimization problem, it can be solved by using active set methods, interior-point methods, gradient projection methods, alternating direction method of multipliers, etc., and a global optimal solution can be determined.

The multi-dimensional damping device is controlled by solving $\Delta U_m(t)$, i.e., an optimal control quantity sequence u(t+k|t), k=0, 2, . . . , m−1 at time t, and taking the first value u(t|t) in the sequence as the actual control quantity at the current time.

The above steps are repeated subsequently.

The multi-dimensional damping control method based on model predictive control of the present invention can achieve the effects of early detection, predicting the future, early control, reducing the effect of system delay, optimal control in a complex constraint environment, and multi-dimensional and high-precision damping. The present invention can also adjust the control effect by predicting the time-domain N, controlling the time-domain m, and setting the objective weight parameter.

Figure 16:
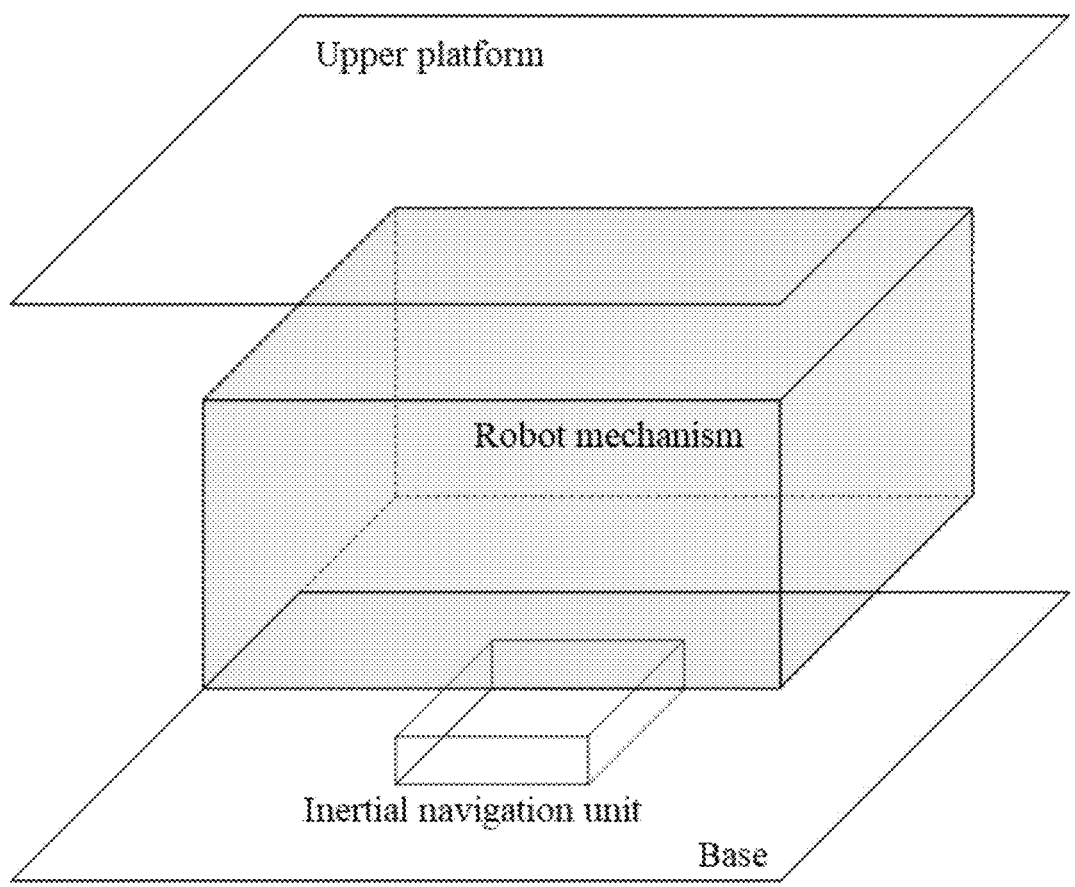
FIG. 16 is a structural schematic diagram according to a third embodiment of the present invention.

The invention is applied to a multi-dimensional damping device, the system comprising: a model establishment module configured to perform kinematic and dynamic analysis on a multi-dimensional damping device, establish a linear dynamic equation near an equilibrium point, and establish a predictive model according to the linear dynamics equation;

an optimization module configured to estimate an output quantity of a predictive time domain by controlling the control quantity of the time-domain according to the predictive model, setting an optimization objective according to a control objective that the output quantity of the predictive time domain is close to an expected trajectory, setting constraints, and determining an optimization problem of the control quantity;

a measurement module configured to determine the expected trajectory according to pose information about the carrying device at time t; and a control module configured to solve the optimization problem to determine an optimal control quantity sequence, and take the first value in the sequence as an actual control quantity at the current moment to control the multi-dimensional damping device;

With reference to FIG. 16, the present invention provides a multi-dimensional damping device based on model prediction, the device comprising a base, an inertial navigation unit, a robot mechanism and an upper platform.

The base is fixed to a carrier which is a vehicle or a vessel.

The inertial navigation unit is mounted on the base for measuring pose information about the carrying device, wherein the inertial navigation unit comprises an accelerometer, a gyroscope, a magnetometer, a GPS, etc. and can sense 6-dimensional pose information about a vehicle or a vessel, comprising information such as displacement, velocity and acceleration in three directions of movement and three directions of rotation.

The upper platform is a terminal manned or loaded platform connected to the base by a robot mechanism.

The robot mechanism has the ability of multi-dimensional active damping, which can stabilize the upper platform with high precision, and greatly reduce or even avoid the impact of vibration for the personnel or device.

Figure 17:
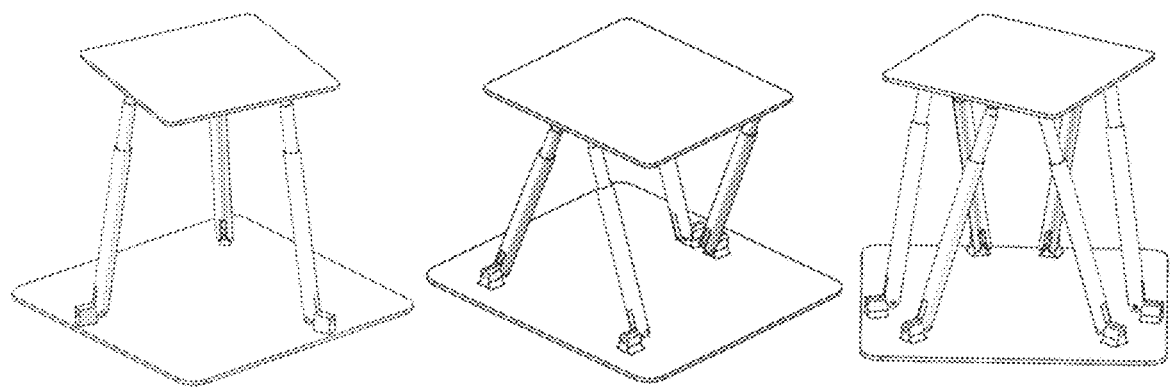
FIG. 17 is a structural schematic diagram showing an alternative robot configuration according to a third embodiment of the present invention.

The robot mechanism used can be a parallel robot, a serial robot or a series-parallel robot, and comprises a control unit, a multi-axis servo execution unit (a servo electric cylinder, a servo hydraulic electric cylinder, a reducer connecting rod, etc.), an encoder and other components therein to achieve high-precision, multi-dimensional position and force control. A control unit electrically connected to the inertial navigation unit and including a memory for storing a control program, and a processor for loading and executing the control program to implement the multi-dimensional damping control method based on model predictive control as described above; an execution unit electrically connected to the control unit for executing an operation according to a control instruction of the control unit; and an encoder electrically connected to the control unit and the execution unit for detecting an actual execution condition of the execution unit and feeding back the actual execution condition of the execution unit to the control unit. Referring to FIG. 17 of the description for some alternative robot configurations, this is by way of example only and does not represent that the control method of the present invention is applicable to only those robot configurations.

Figure 18:
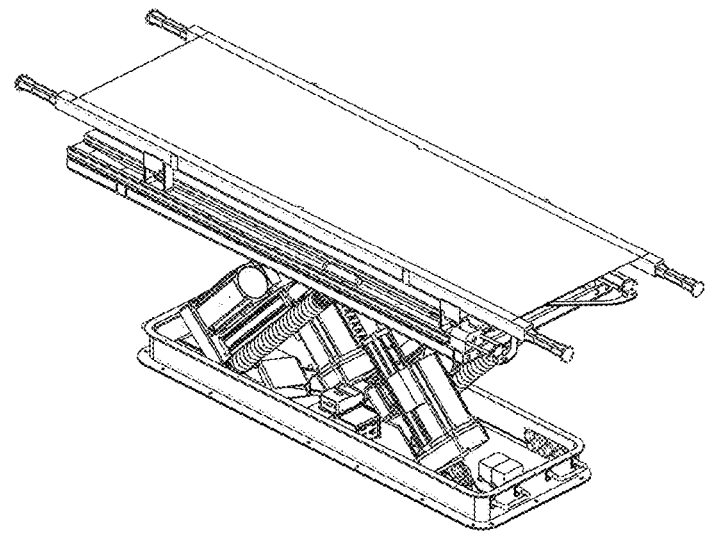
FIG. 18 is a diagram showing a mechanical configuration of a damping device according to a third embodiment of the present invention.
Figure 19:
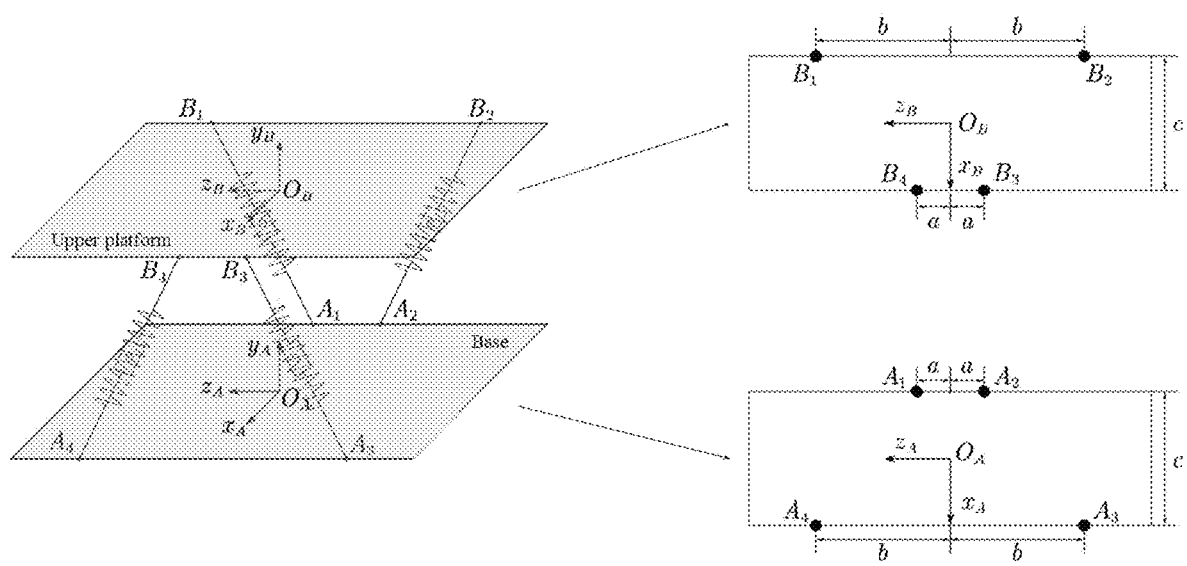
FIG. 19 is a structural schematic diagram showing a damping device according to a third embodiment of the present invention.
Figure 20:
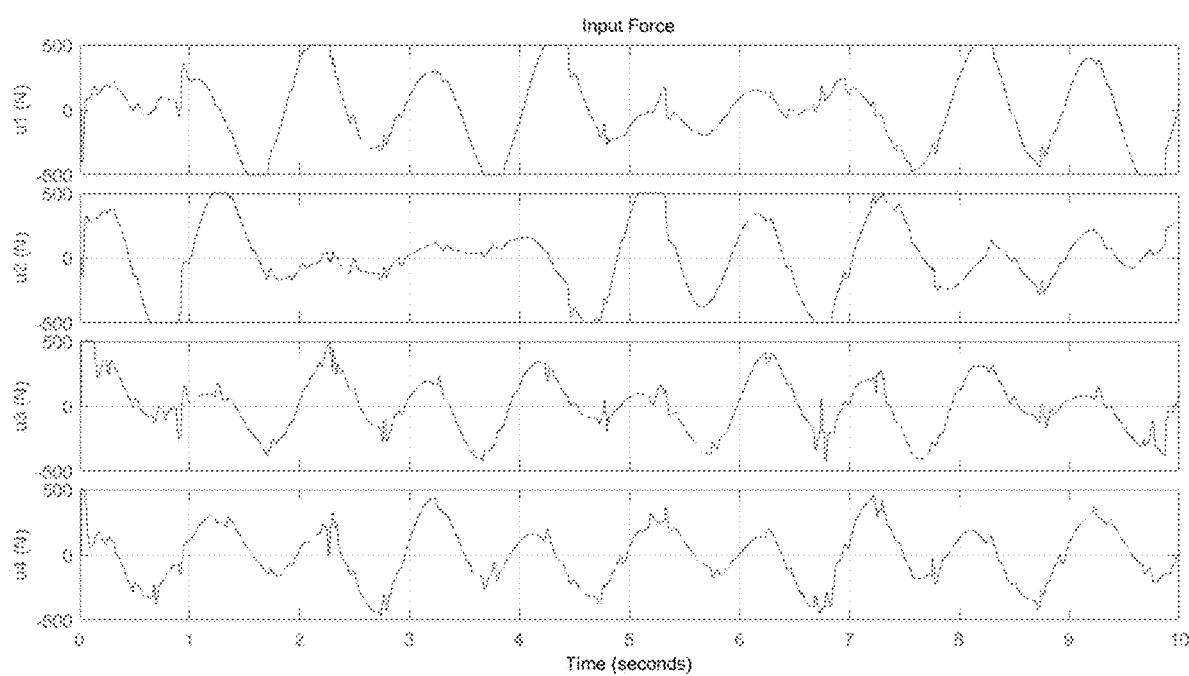
FIG. 20 is an electric cylinder control force for each branch according to a third embodiment of the present invention.

With reference to FIGS. 18 and 19 of the description, a certain type of multi-dimensional active damping device has four degrees of freedom, i.e. up and down (moving along a y-axis), left and right (moving along a z-axis), pitch (rotating about the z-axis) and roll (rotating about the y-axis). The device is a parallel robot, and the upper platform and the base are connected via four branches, wherein the first branch and the second branch are RPS branches, and the third branch and the fourth branch are UPS branches. The driving pair of each branch is a middle sliding pair (P-pair) and is driven by an electromechanical electric cylinder. The lower hinge points $A_1$ and $A_2$ are rotation pairs (R pairs); the lower hinge points $A_3$ and $A_4$ are universal joints (U pairs); the upper hinge points $B_1$, $B_2$, $B_3$, and $B_4$ are spherical hinges (S pairs). At the same time, one spring damper is connected in parallel on each branch chain, which can play the role of load bearing and high frequency damping. Thus, the device is classified as an active-passive hybrid damping device from a damping principle. As shown in FIG. 20 and Table 1 of the description, the dimension information of the platform and each hinge point defines a satellite coordinate system $O_A x_A y_A z_A$ at the central position of the base and a satellite coordinate system $O_B x_B y_B z_B$ at the central position of the upper platform.

TABLE 2

Parameters of multi-dimensional active damping device of this model

| Parameter | Symbol | Numerical value |
|---|---|---|
| Geometric parameter | a | 50 mm |
|  | b | 450 mm |
|  | c | 240 mm |
| Spring stiffness coefficient | $k_S$ | 8 kN/m |
| Damper damping coefficient | $c_S$ | 600 N · s/m |

Displacement of the upper platform satellite coordinate system $O_B x_B y_B z_B$ relative to the base satellite coordinate system $O_A x_A y_A z_A$ (task space coordinate) as $$\varphi = [y\ z\ \alpha \gamma]^T \quad (16)$$

wherein y is the upper and lower relative displacement; z is left-right relative displacement; α is an relative roll angle; and γ is an relative pitch angle. An equilibrium point of the device under rated load is defined as $$\varphi_0 = [y_0\ 0\ 0\ 0]^T, y_0 = 400\text{ mm} \quad (17)$$

At this equilibrium point, an equilibrium height of the device is 400 mm, with no relative displacement in the left and right, roll and pitch directions. In this case, the length of each branch is the same and is the equilibrium length, i.e.

$$l_0 = \sqrt{y_0^2 + (b-a)^2} = 565.69 \text{ mm} \quad (18)$$

During operation, the multi-dimensional active damping device moves near the equilibrium point, and the range of motion in all directions of the task space is $$-50 \text{ mm} \le y - y_0 \le 50 \text{ mm}, -20 \text{ mm} \le z \le 20 \text{ mm}, -5° \le \alpha \le 5°, -8° \le \gamma \le 8° \quad (19)$$

Therefore, the nonlinear kinetic equation can be linearized at the equilibrium point, and the linearized kinetic equation is obtained as $$M_0 \begin{bmatrix} \ddot{y} \\ \ddot{z} \\ \ddot{\alpha} \\ \ddot{\gamma} \end{bmatrix} + c_S J_0^T J_0 \begin{bmatrix} \dot{y} \\ \dot{z} \\ \dot{\alpha} \\ \dot{\gamma} \end{bmatrix} + k_S J_0^T J_0 \begin{bmatrix} y - y_0 \\ z \\ \alpha \\ \gamma \end{bmatrix} = J_0^T \begin{bmatrix} u_1 \\ u_2 \\ u_3 \\ u_4 \end{bmatrix} \quad (20)$$

wherein $u_1$, $u_2$, $u_3$, $u_4$ is a control force respectively applied by a electric cylinder on each branch; and $J_0$ is a Jacobian matrix at the equilibrium point $$J_0 = \frac{1}{l_0} \begin{bmatrix} y_0 & b-a & -by_0 & -cy_0/2 \\ y_0 & a-b & by_0 & -cy_0/2 \\ y_0 & b-a & ay_0 & cy_0/2 \\ y_0 & a-b & -ay_0 & cy_0/2 \end{bmatrix} \quad (21)$$

$M_0$ is a mass matrix at the equilibrium point $$M_0 = \begin{bmatrix} m & & & \\ & m & & \\ & & J_{x0} & \\ & & & J_{z0} \end{bmatrix} \quad (22)$$

In the above formula, m=100 kg is a system equivalent mass at the equilibrium point; $J_{x0}$=2 kg·m² is an equivalent moment of inertia of the system around the x-axis at the equilibrium point; and $J_{z0}$=5 kg·m² is an equivalent moment of inertia of the system about the z-axis at the equilibrium point.

When the inertial navigation unit of the multi-dimensional active damping device base measures the pose information about the vehicle or the vessel, i.e., the input pose amount is $$r_{In} = [y_r, z_r, \alpha_r, \gamma_r]^T \quad (23)$$

An objective of the multi-dimensional active damping device is to reduce vibrations in all directions as much as possible, and therefore the device should actively compensate for positional and attitude disturbances of the vehicle or vessel, i.e. the control objective is to make the system state quantity X track the dynamic trajectory $r = -r_{In}$. An objective of the optimization is to minimize a system tracking error, while the amount of control should be smooth and need to meet the device's range of motion limit (equation (19)) and the electric cylinder's output limit $$-500 \text{ N} \le u_1, u_2, u_3, u_4 \le 500 \text{ N} \quad (24)$$

According to the multi-dimensional damping control method of the present invention, model predictive control is used for solving the above-mentioned optimal control problem with various constraints.

The sampling period is set as 0.01 s, the predictive time domain as 10, the control time-domain as 2, the output weights as 20, the input weights as 0, and the input increment weights as 0.1, the constraints are set according to equations (19) and (24), and all the input and output variables are normalized.

Assuming that the vehicle pose information measured according to the inertial navigation unit is as follows $$y_r = -0.05 \sin(2\pi t), z_r = -0.03 \sin(4\pi t)$$

$$\alpha_r = -0.08 \sin(2.4\pi t), \gamma_r = -0.12 \sin(1.6\pi t) \quad (25)$$

Figure 21:
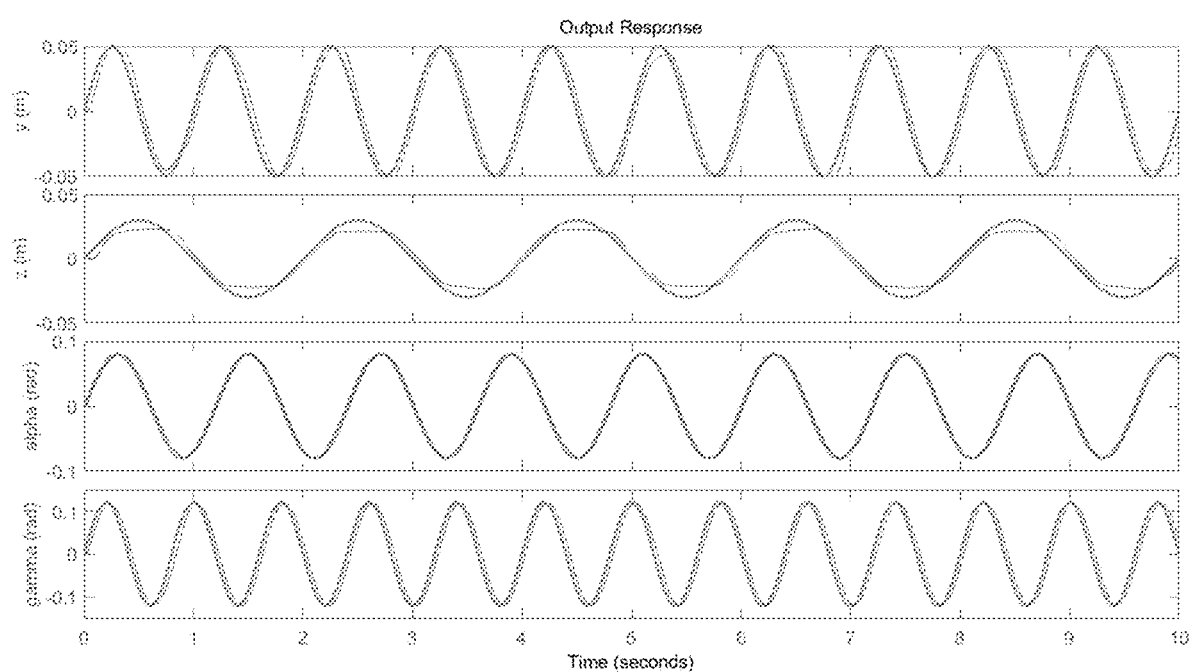
FIG. 21 shows a state quantity of a damping device according to a third embodiment of the present invention.

The final results are as shown in FIGS. 20 and 21 of the description. It can be seen from FIG. 20 that the electric cylinder output of each branch is within a range of 500 N, meeting the requirements of input constraints. It can be seen from FIG. 21 that the output quantity of the multi-dimensional active damping device can track a desired dynamic track very well, and therefore a very good damping effect can be achieved in up and down, left and right, pitch and roll directions. At the same time, it can be seen from FIG. 21 that all the output quantities are within the range of motion of the device, satisfying the output constraints, especially in the second figure, the amplitude of the left and right input stimuli reaches 0.03 m, while the output response amplitude is 0.02 m, not exceeding the range of motion limit (the amount of vibration beyond the range of motion cannot be damped). It can be seen that the multi-dimensional damping control method based on the model predictive control proposed in the present invention can well handle the problem of efficient damping under practical constraints.

1. Prediction of the future state of the system: this embodiment uses model predictive control to predict the state of the system at each moment in the future N moments in advance, and compares it with the expected future trajectory to perform advanced control, so that it has a good perspective.
2. Optimal control under complex constraints: this embodiment fully considers various constraints of the damping device in practical engineering, including but not limited to stroke constraints, motion space constraints, execution mechanism power/output constraints, etc. and can achieve optimal control without violating the above-mentioned constraints, thus having good engineering applicability.
3. Establishment of a predictive model according to a task space linearization equation near an equilibrium point, and the calculation efficiency is high: this embodiment analyzes the working characteristics of the active damping device, determines that it moves near the equilibrium point, establishes the linear kinetic equation of the task space at the equilibrium point, and establishes the predictive model based on this, the model obtained is simple and clear, efficient in calculation, and ensures the real-time performance of the model predictive control.
4. Reduction of the impact of system delays: the model predictive control of this embodiment makes full use of the future information and makes a preliminary determination of the future state of the system in advance to realize the advanced control, thereby effectively reducing the influence of the system delay and further improving the damping effect of the damping device.

Figure 22:
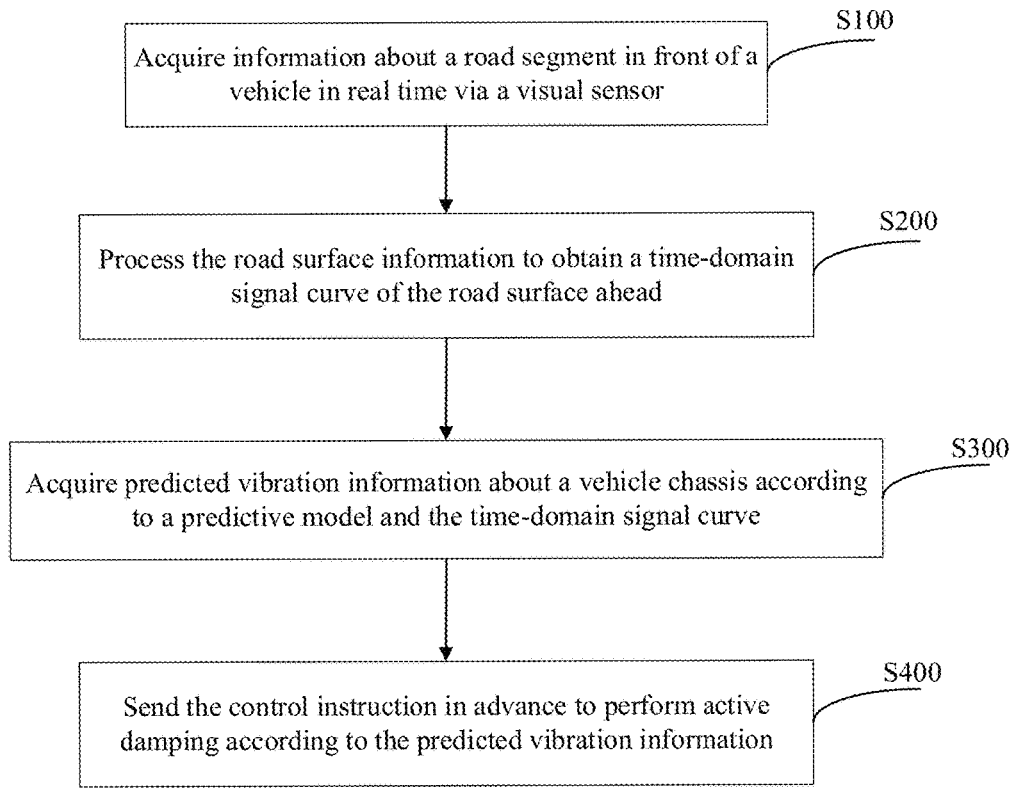
FIG. 22 is a schematic flow chart according to a fourth embodiment of the present invention.

Embodiment IV the multi-degree-of-freedom active damping mechanism control method proposed in this embodiment, with reference to FIG. 22, comprises the steps of:

S100: acquiring information about a road segment in front of a carrier in real time via a visual sensor;

specifically, the visual sensor here includes, but is not limited to, a multi-camera, a depth camera, a laser radar, a millimeter wave radar, etc. and performs vision pre-determination by photographing information about the road segment ahead of a vehicle that is traveling by the visual sensor, such as obstacle information about the road segment ahead and road segment fluctuation information.

S200: processing the information about the road segment to obtain a time-domain signal curve of the road segment ahead;

specifically, the range of the detection road segment, i.e. the field-of-view width, is determined according to a screen transmitted by the visual sensor, and the time-domain signal curve of the road segment ahead is further determined according to the vehicle speed.

S300: acquiring predicted vibration information about a carrier according to a predictive model and the time-domain signal curve; and Specifically, the predicted vibration information of the vehicle chassis at a future time, such as vertical displacement, a pitch angle, a roll angle, and the corresponding velocity and acceleration of the vehicle, is obtained by combining the time-domain signal curve of the above-mentioned road segment according to the predictive model and the vehicle dynamics model while the vehicle is running.

S400: sending the control instruction in advance to perform active damping according to the predicted vibration information.

Specifically, when a vehicle is travelling, a control instruction is sent to actively damp vibrations according to the obtained predicted vibration information in combination with the mechanical delay and the software delay of the multi-dimensional active damping device. The advantages of this design are as follows: a visual sensor is mounted in front of a vehicle, obstacle and fluctuation information of the road segment ahead are detected and identified based on a computer vision technology, the obstacle and shape of the road segment ahead are identified using the computer vision technology to obtain a time-domain curve of the road segment for prediction, so that the vibration of the vertical, pitch and roll directions of the vehicle can be reduced, and the multi-dimensional active damping without delay can be realized through visual pre-determination.

Step S100 specifically comprises:

acquiring a maximum field-of-view distance and a minimum field-of-view distance of the visual sensor according to a mounting position of the visual sensor and an advancing direction of the carrier while the carrier is traveling;

obtaining a field-of-view width of the visual sensor according to the maximum field-of-view distance and the minimum field-of-view distance;

acquiring information about a road segment within the field-of-view width in real time.

Figure 23:
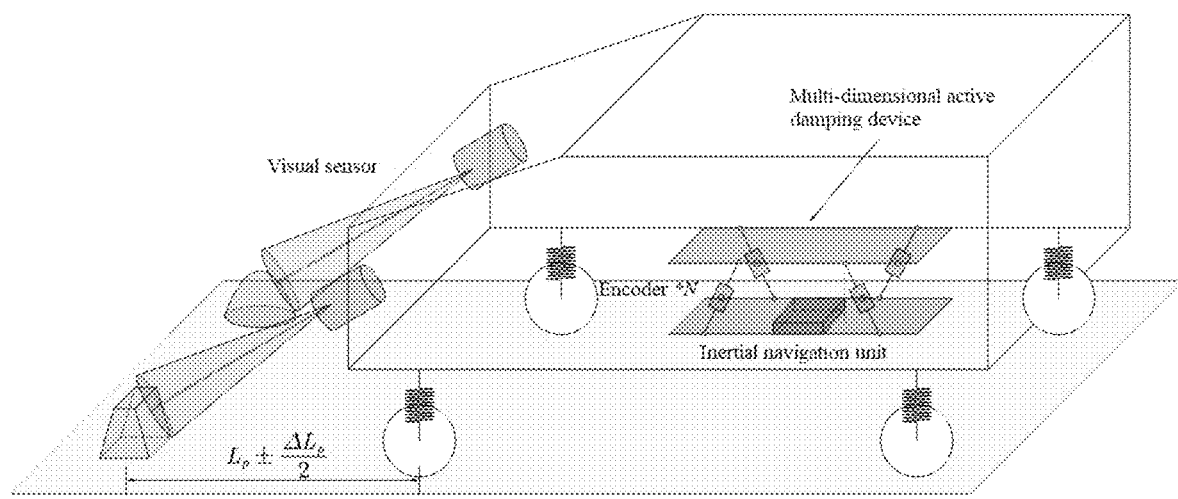
FIG. 23 is a carrier model reference diagram according to a fourth embodiment of the present invention.

Specifically, the visual sensor and the multi-dimensional active damping device are mounted at a vehicle model position. Referring to FIG. 23, the multi-dimensional active damping device body in this embodiment comprises an inertial navigation unit, an encoder, a multi-axis servo actuator, a control unit and other components. The multi-dimensional damping device main body is mounted inside a vehicle compartment, and a visual sensor is mounted in front of the vehicle for performing vision prediction. The visual sensor detects the obstacle and fluctuation information of the road segment ahead, and according to the mounting position and movement direction of the sensor on the vehicle body, determines that the range of the road segment ahead that can be detected is $L_{min}$ to $L_{max}$, wherein $L_{max}-L_{min}$ is a field-of-view width.

In the above embodiment, step S200 specifically includes:

processing the information about the road segment by a computer vision technology to identify obstacle information and fluctuation information about the road segment ahead;

acquiring a longest predictive time according to a velocity of the vehicle and the maximum field-of-view distance, wherein the longest predictive time is greater than a delay time of a multi-dimensional active damping device; and the time-domain signal curve of the road segment ahead is obtained based on the vehicle speed, the longest predictive time, and the obstacle information and fluctuation information of the road segment.

Specifically, when the visual sensor continuously detects, it is possible to obtain information about a road segment 0 to $T_{est}$ at a future time, wherein $T_{est}=L_{max}/v_{car}$ is the longest predictive time, wherein $v_{car}$ is a vehicle speed. The time-domain curve of the road segment is obtained by using computer vision technology to identify the obstacles and shape of the road segment ahead.

On the basis of this embodiment, step S300 specifically comprises:

obtaining, according to a carrier dynamics model, the predicted vibration information within the longest predictive time by combining the time-domain signal curve, wherein the predicted vibration information comprises vertical displacement, a pitch angle, a roll angle and a corresponding velocity and acceleration information of the carrier.

Figure 24:
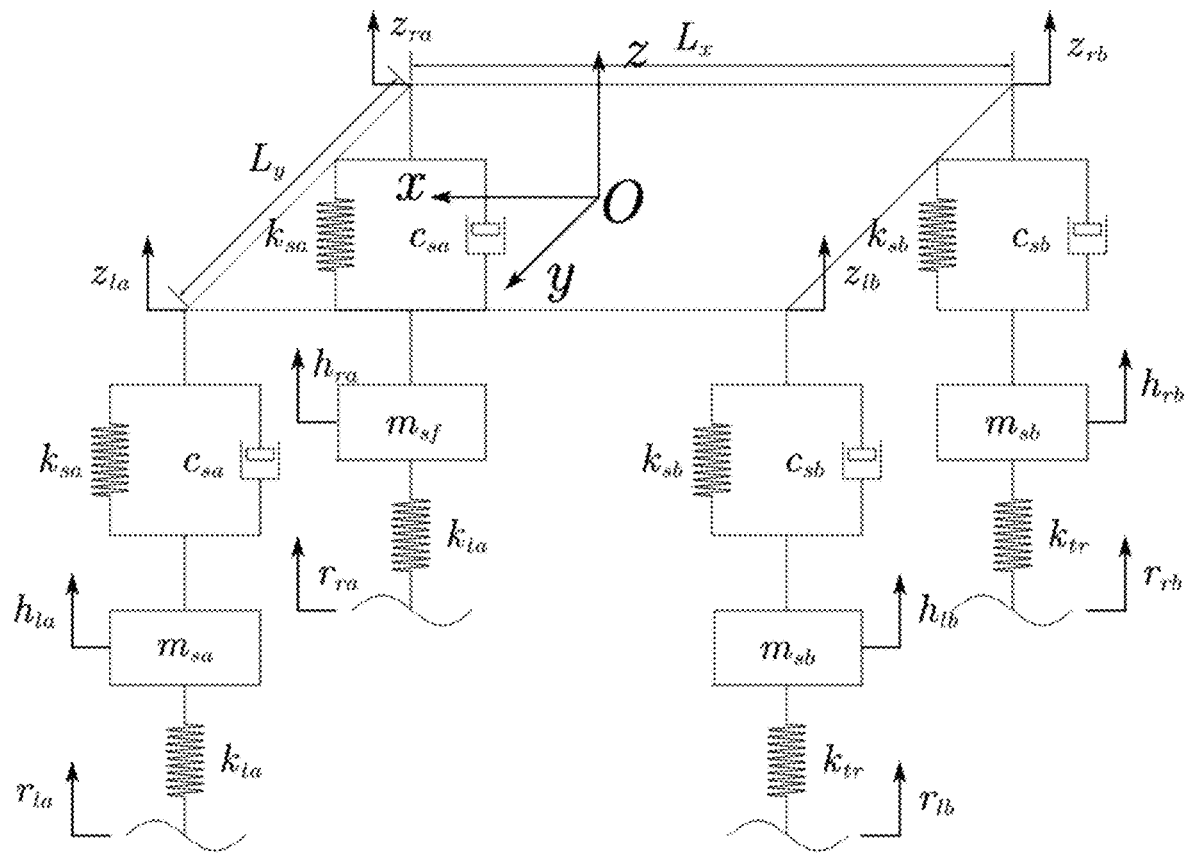
FIG. 24 is a 7-degree-of-freedom dynamics model of a carrier according to a fourth embodiment of the present invention.

Specifically, different models can be selected for the vehicle dynamics model, and a 7-degree-of-freedom dynamics model is selected here. Referring to FIG. 24, it is assumed that the vehicle is left-right symmetric, that is, the vehicle distance, suspension parameters, tire parameters, etc. on the left and right sides are the same. The parameters of the vehicle are as shown in Table 2,

TABLE 2

Vehicle parameters

| Vehicle parameter | Symbol |
|---|---|
| Total body mass | $m_c$ |
| Front wheel mass (one-sided) | $m_{sa}$ |
| Rear wheel mass (one-sided) | $m_{sb}$ |
| Vehicle body roll moment of inertia about central axis | $I_{ox}$ |
| Vehicle body pitching moment of inertia about central axis | $I_{oy}$ |
| Fore-aft wheel base | $L_x$ |
| Left-right wheel track | $L_y$ |
| Front suspension spring stiffness coefficient | $k_{sa}$ |
| Rear suspension spring stiffness coefficient | $k_{sb}$ |
| Front wheel radial stiffness coefficient | $k_{ta}$ |
| Rear wheel radial stiffness coefficient | $k_{tb}$ |
| Damping coefficient of front suspension damper | $c_{sa}$ |
| Damping coefficient of rear suspension damper | $c_{sb}$ |

The remaining kinematic parameters are described below:
(1) $r_{la}$, $r_{ra}$, $r_{lb}$, and $r_{rb}$ are road segment excitations of the left front, right front, left rear and right rear tire contact points, respectively;
(2) $h_{la}$, $h_{ra}$, $h_{lb}$, and $h_{rb}$ are absolute displacements of the left front, right front, left rear and right rear wheel centers, respectively;
(3) $z_{la}$, $z_{ra}$, $z_{lb}$, and $z_{rb}$ are absolute displacements of the left front, right front, left rear and right rear suspension connection points, respectively;
(4) vertical absolute displacement of the central point of the vehicle floor is $z_A$, an angle of rotation about an x-axis is $\alpha_A$, and an angle of rotation about a y-axis is $\beta_A$.

On this basis, the kinetic equation of the vehicle is:

$$m_c \ddot{z}_A + c_{sa}(\dot{z}_{la} - \dot{h}_{la}) + c_{sa}(\dot{z}_{ra} - \dot{h}_{ra}) + c_{sb}(\dot{z}_{lb} - \dot{h}_{lb}) + c_{sb}(\dot{z}_{rb} - \dot{h}_{rb}) + k_{sa}(z_{la} - h_{la}) + k_{sa}(z_{ra} - h_{ra}) + k_{sb}(z_{lb} - h_{lb}) + k_{sb}(z_{rb} - h_{rb}) = 0 \quad [1]$$

$$2I_{ox}\ddot{\alpha}_A/L_y + c_{sa}(\dot{z}_{la} - \dot{h}_{la}) - c_{sa}(\dot{z}_{ra} - \dot{h}_{ra}) + c_{sb}(\dot{z}_{lb} - \dot{h}_{lb}) - c_{sb}(\dot{z}_{rb} - \dot{h}_{rb}) + k_{sa}(z_{la} - h_{la}) - k_{sa}(z_{ra} - h_{ra}) + k_{sb}(z_{lb} - h_{lb}) - k_{sb}(z_{rb} - h_{rb}) = 0 \quad [2]$$

$$2I_{oy}\ddot{\beta}_A/L_x - c_{sa}(\dot{z}_{la} - \dot{h}_{la}) - c_{sa}(\dot{z}_{ra} - \dot{h}_{ra}) + c_{sb}(\dot{z}_{lb} - \dot{h}_{lb}) + c_{sb}(\dot{z}_{rb} - \dot{h}_{rb}) - k_{sa}(z_{la} - h_{la}) - k_{sa}(z_{ra} - h_{ra}) + k_{sb}(z_{lb} - h_{lb}) + k_{sb}(z_{rb} - h_{rb}) = 0 \quad [3]$$

$$m_{sa}\ddot{h}_{la} - c_{sa}(\dot{z}_{la} - \dot{h}_{la}) - k_{sa}(z_{la} - h_{la}) + k_{ta}(h_{la} - r_{la}) = 0 \quad [4]$$

$$m_{sa}\ddot{h}_{ra} - c_{sa}(\dot{z}_{ra} - \dot{h}_{ra}) - k_{sa}(z_{ra} - h_{ra}) + k_{ta}(h_{ra} - r_{ra}) = 0 \quad [5]$$

$$m_{sb}\ddot{h}_{lb} - c_{sb}(\dot{z}_{lb} - \dot{h}_{lb}) - k_{sb}(z_{lb} - h_{lb}) + k_{tb}(h_{lb} - r_{lb}) = 0 \quad [6]$$

$$m_{sb}\ddot{h}_{rb} - c_{sb}(\dot{z}_{rb} - \dot{h}_{rb}) - k_{sb}(z_{rb} - h_{rb}) + k_{tb}(h_{rb} - r_{rb}) = 0, \quad [7]$$

the input to the above kinetic equation is the road segment excitation $r_{la}$, $r_{ra}$, $r_{lb}$, and $r_{rb}$ for four tire contact points, which can be extracted by scanning the information about the road segment with the aforementioned visual recognition system. Therefore, according to the vehicle dynamics model, it is possible to predict the vibration information of the vehicle chassis in the future 0 to $T_{est}$ time, including vertical displacement, a pitch angle, a roll angle and the corresponding velocity and acceleration information of the vehicle.

On the basis of this embodiment, step S400 specifically comprises:
acquiring a delay time of active damping of the multi-dimensional active damping device; and
sending the control instruction in advance to perform active damping according to the delay time, wherein the delay time comprises a software delay and a mechanical delay.

Figure 25:
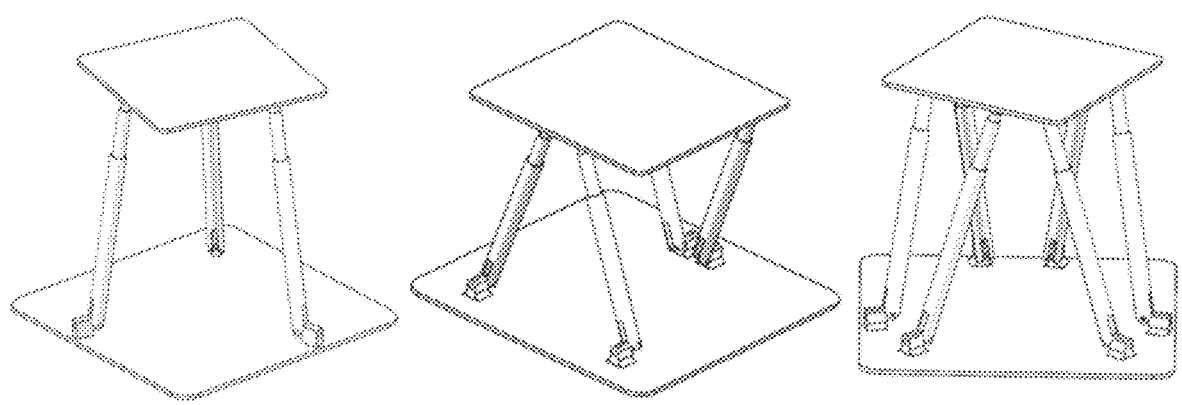
FIG. 25 is an alternative robot configuration according to a fourth embodiment of the present invention.

Specifically, the active damping device body of this solution can be configured as a parallel robot, a series robot or a series-parallel robot. With reference to FIG. 25, however, the active damping device body of this solution should have at least three degrees of freedom: in vertical, pitch and roll directions. The above robot represents only the robot configuration employed in this embodiment, but is not limited to only such a robot configuration.

The control rate is designed in the robot task space (operation space) to ensure the versatility of control methods under different robot configurations.

The vehicle chassis vibration input vector predicted based on the visual recognition system and vehicle dynamics equation is taken as $$X_A = [\alpha_A \beta_A z_A]^T,$$

the coordinates of the multi-dimensional active damping device task space are $$\Delta X = [\Delta\alpha \Delta\beta \Delta z]^T,$$

wherein $\Delta\alpha$, $\Delta\beta$, $\Delta z$ is a relative roll angle, a relative pitch angle and relative vertical displacement of the upper platform relative to the base, respectively;
a vibration output vector of the upper platform is, which are a roll angle, a pitch angle and vertical displacement of the upper platform respectively. A design objective of the task space control rate is to make the vibration output as small as possible, which can be designed by using PID, ADRC, optimal control, robust control, adaptive control and other control theories. A preferred scheme is proposed here, and the control rate of the task space is set as:

$$\Delta\ddot{z} = -k_z \Delta z - c_z \Delta\dot{z} - s_z \dot{z}_B \quad [1]$$

$$\Delta\ddot{\alpha} = -k_\alpha(\alpha_A + \Delta\alpha) - c_\alpha(\dot{\alpha}_A + \Delta\dot{\alpha}) \quad [2]$$

$$\Delta\ddot{\beta} = -k_\beta(\beta_A + \Delta\beta) - c_\beta(\dot{\beta}_A + \Delta\dot{\beta}), \quad [3]$$

in a vertical direction, spring damping+skyhook damping control is adopted, wherein a stiffness coefficient is $k_z$, a damping coefficient is $c_z$, and a skyhook damping coefficient is $s_z$. PID control is used in pitch and roll directions with $k_\alpha$, $k_\beta$ as a proportional parameter and $c_\alpha$, $c_\beta$ as a derivative parameter.

According to the kinematic relationship of the robot, a control instruction of the task space is solved to the joint space, and issued to the servo drive of each axis, so that an execution mechanism can execute according to the desired position, velocity and spinor, and the actual execution is fed back to the control system through an encoder to realize the closed-loop control.

The effects of using the present invention will be described as follows:
the dynamic parameters of a certain type of vehicle are as shown in Table 3.

TABLE 3

Vehicle dynamics parameters

| Vehicle parameter | Symbol | Numerical value |
|---|---|---|
| Total body mass | $m_c$ | 1380 kg |
| Front wheel mass (one-sided) | $m_{sa}$ | 40.5 kg |
| Rear wheel mass (one-sided) | $m_{sb}$ | 45.4 kg |
| Vehicle body roll moment of inertia about central axis | $I_{ox}$ | 235 kg · m^2 |
| Vehicle body pitching moment of inertia about central axis | $I_{oy}$ | 1222 kg · m^2 |
| Fore-aft wheel base | $L_x$ | 2 m |
| Left-right wheel track | $L_y$ | 1.3 m |
| Front suspension spring stiffness coefficient | $k_{sa}$ | 17 kN/m |
| Rear suspension spring stiffness coefficient | $k_{sb}$ | 22 kN/m |
| Front wheel radial stiffness coefficient | $k_{ta}$ | 192 kN/m |
| Rear wheel radial stiffness coefficient | $k_{tb}$ | 192 kN/m |
| Damping coefficient of front suspension damper | $c_{sa}$ | 1500 N · s/m |
| Damping coefficient of rear suspension damper | $c_{sb}$ | 1500 N · s/m |

Figure 26:
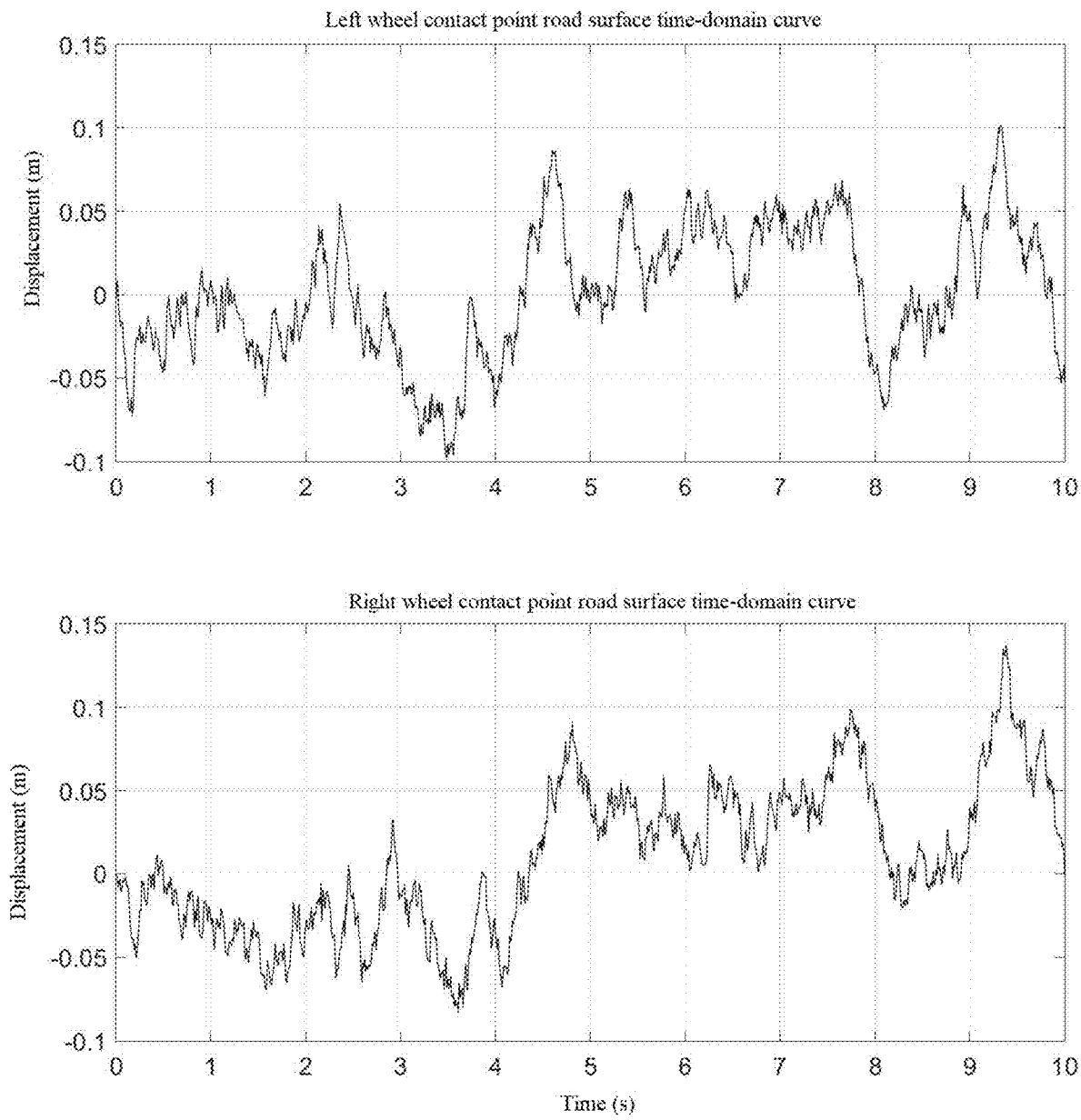
FIG. 26 is a time-domain plot of a road segment according to a fourth embodiment of the present invention.

As a visual sensor, a laser radar is mounted at the front of the vehicle, and the maximum detection distance thereof is 150 m; the vehicle runs at a constant velocity of 50 km/h on road segment of grade D; at this time, the longest predictive time of visual perception system is $T_{est}=L_{max}/v_{car}=10.8$ s, and a time-domain curve of a segment detected by visual perception system is as shown in FIG. 26.

In this example, the multi-dimensional active damping device has vertical, pitch and roll degrees of freedom. The mean mechanical delay time of the device is $T_{delay}=0.08$ s. As $T_{delay}<T_{est}$, the visual perception system thus provides sufficient predictive time for the device to control in advance.

Figure 27:
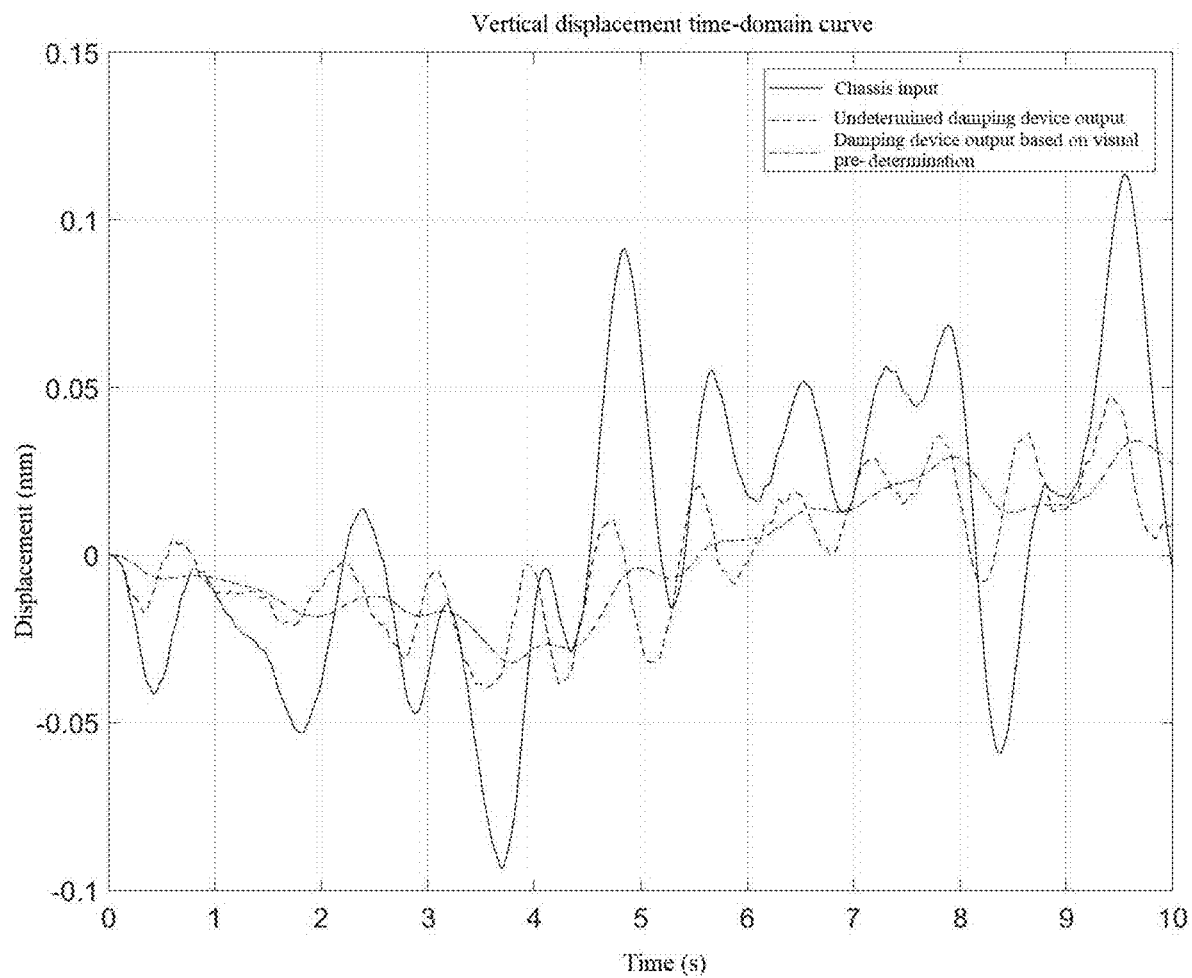
FIG. 27 is vertical displacement time-domain curve according to a fourth embodiment of the present invention.
Figure 28:
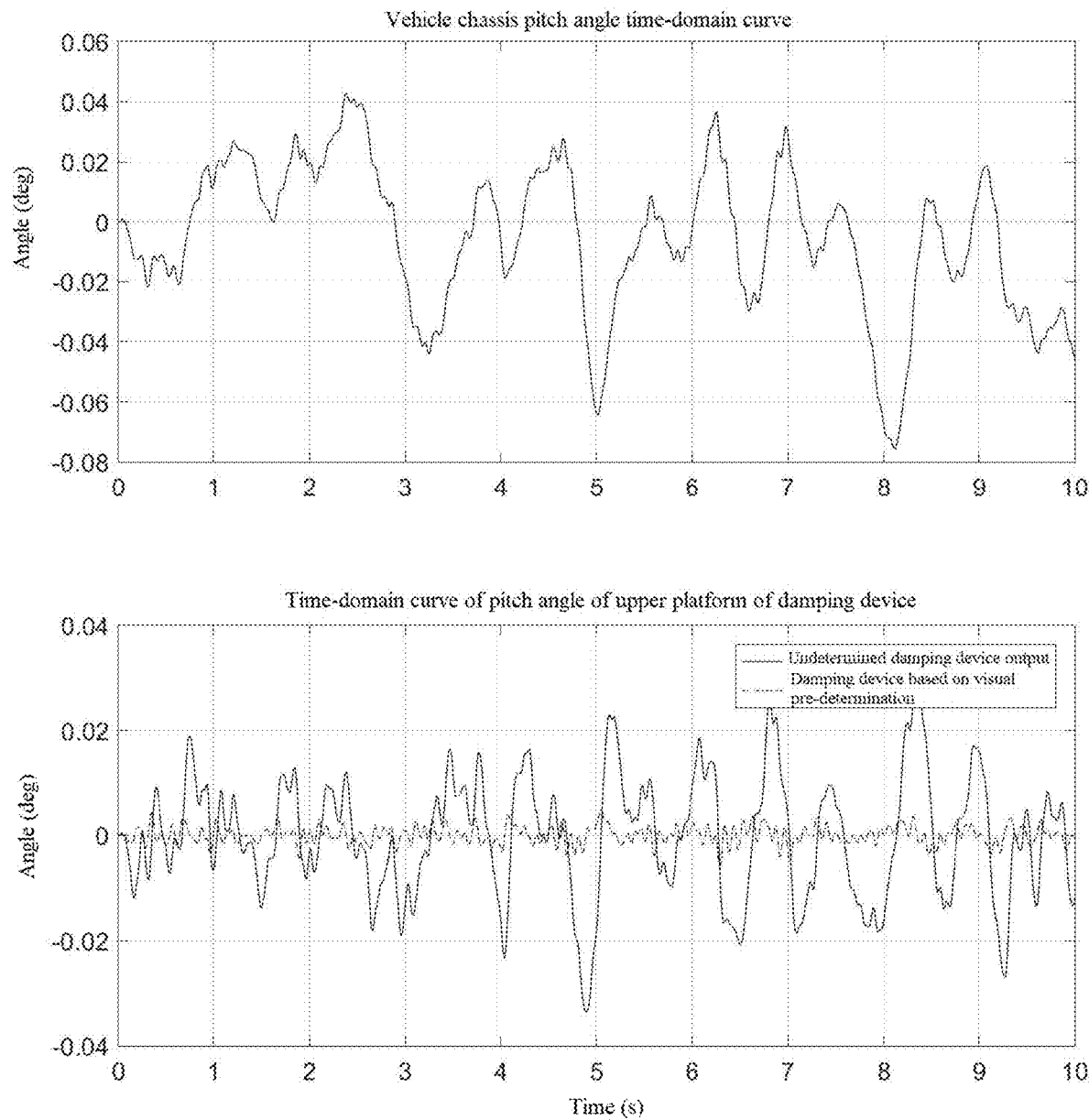
FIG. 28 is a time-domain plot of a pitch angle according to a fourth embodiment of the present invention.
Figure 29:
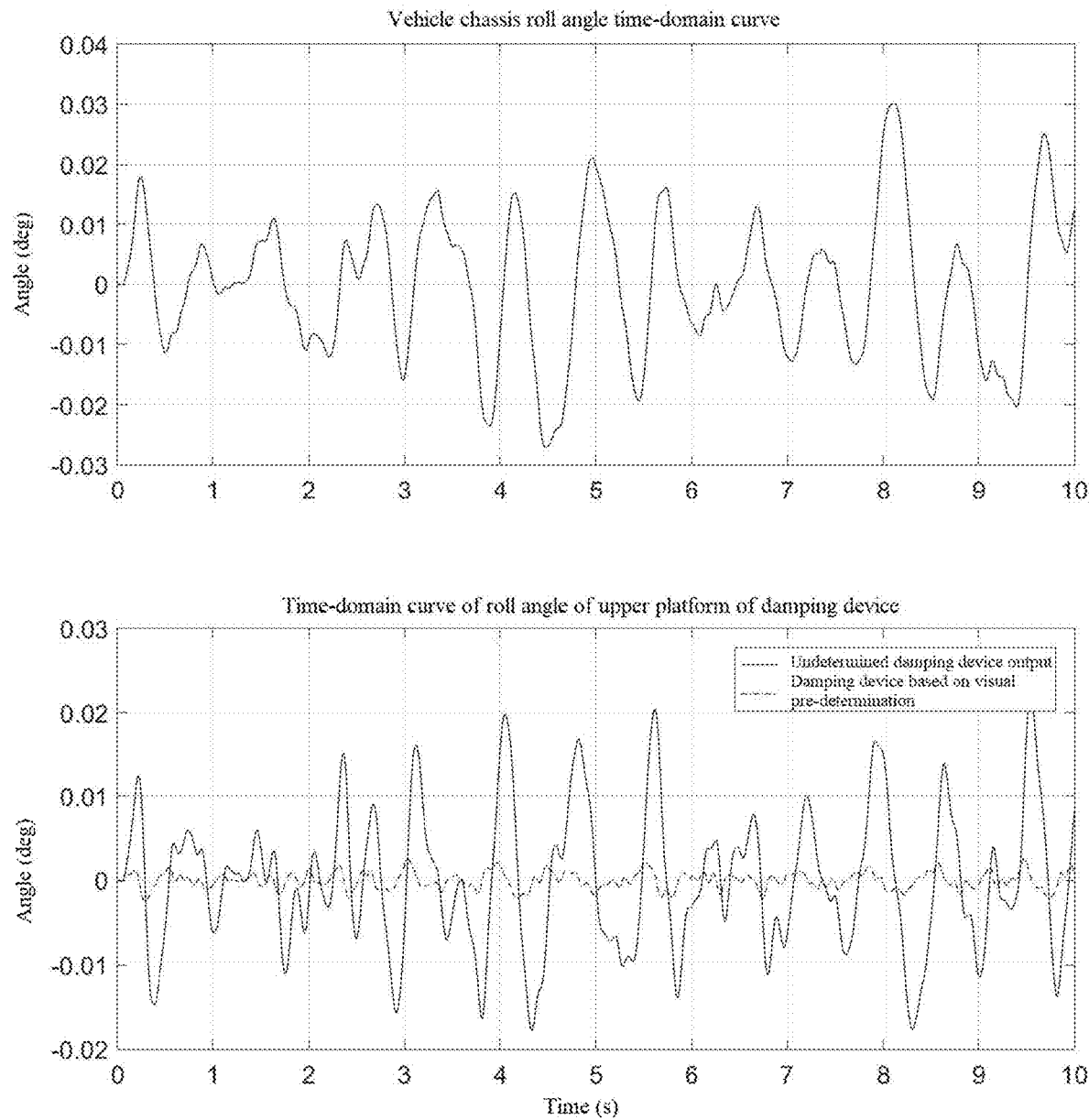
FIG. 29 is a time-domain plot of a roll angle according to a fourth embodiment of the present invention.

The simulation results are shown in FIGS. 27-29. In FIG. 27, the solid line is the vertical displacement curve measured by the vehicle chassis, the broken line is the displacement curve output by the damping device without visual pre-determination, and the dotted line is the displacement curve of the damping device output based on visual pre-determination proposed in this scheme. It can be seen from the figure that the damping device without visual pre-determination has a mechanical delay of 80 ms, resulting in a great reduction in the damping effect, while the damping device based on visual pre-determination compensates for the delay of the system early perception and early control, thereby achieving a better damping effect, and the output displacement curve is very smooth, and the corresponding vertical acceleration is also very small.

The upper half graphs of FIGS. 28 and 29 are a pitch angle curve and a roll angle curve measured by the vehicle chassis, respectively; the solid line in the lower half graph is a pitch angle curve and a roll angle curve output by the damping device without visual pre-determination; and the dotted line is a pitch angle curve and a roll angle curve of the damping device output based on visual pre-determination proposed in the present solution. It can be seen from the figure that the damping effect in pitch and roll directions has been significantly improved after visual pre-determination.

On the basis of this embodiment, after step S400, step S500 is further included, comprising:
  reading actual vibration information of a vehicle chassis in real time according to an inertial navigation unit mounted on the vehicle chassis; and
  comparing the actual vibration information with the predicted vibration information and adjusting the predictive model.

Specifically, the robot mechanism comprises n execution units, wherein n is the degree of freedom of the robot, and the execution units can select a servo electric cylinder, a servo hydraulic electric cylinder, a reducer connecting rod, etc. In addition, the multi-dimensional active damping device further includes:
  an inertial navigation unit mounted on the base, comprising a 3-axis accelerometer, a 3-axis gyroscope, a 3-axis magnetometer and GPS, etc. which can sense vibration information about the vehicle chassis, and can obtain vertical displacement, a pitch angle and a roll angle of the chassis as well as velocity and acceleration information about corresponding dimensions after being processed by a sensing fusion algorithm; the acquired vibration information is compared with the predicted vibration information, and then the predictive model is continuously optimized.
  a control unit, a driver, and an encoder: the control unit executes a control algorithm, forms drive instructions, and issues via a driver to each execution unit for execution, and feeds back the actual execution to the control unit via the encoder.

Secondly, this embodiment also provides that the real-time pitch angle and roll angle during the carrying of a vessel comprise:
  Step a1: acquiring vibration information about a vessel body deck;
  Step a2: calculating the pitch angle and the roll angle by an attitude solution algorithm according to the vibration information;
  wherein in Step a1, the actual vibration information comprises triaxial acceleration information and triaxial angular velocity information, the triaxial acceleration information is detected by a triaxial accelerometer, and the triaxial angular velocity information is detected by a triaxial gyroscope;
  Step a2 specifically comprises the following steps:
  Step a2.1: eliminating deviation and noise in the vibration information by a filtering algorithm;
  Step a2.2: performing attitude solution by a complementary filtering algorithm to obtain the pitch angle and the roll angle according to the vibration information obtained after eliminating the deviation and noise;
  wherein the performing attitude solution by a complementary filtering algorithm specifically comprises the following steps:
  Step b1: calculating a gravity acceleration direction according to the filtered gyroscope data, wherein the calculation formula is:

$$vg_{est} = \begin{bmatrix} 2(q_1 q_3 - q_0 q_2) \\ 2(q_0 q_1 + q_2 q_3) \\ 1 - 2(q_3^2 + q_2^2) \end{bmatrix},$$

wherein $q=[q_0, q_1, q_2, q_3]$, q is a unit quaternion, and $q_0$, $q_1$, $q_2$, and $q_3$ are components of the unit quaternion q;
  Step b2: calculating the gravity acceleration direction according to the filtered acceleration data $a_x$, $a_y$, and $a_z$, wherein the calculation formula is as follows:

$$vg = \frac{1}{\sqrt{a_x^2 + q_y^2 + a_z^2}} \begin{bmatrix} a_x \\ a_y \\ a_z \end{bmatrix},$$

wherein ax, ay, and az are accelerations in three directions measured by an accelerometer, and $v_g$ is a value obtained from acceleration normalization;
  Step b3: calculating an attitude direction error, wherein the calculation formula is:

$$error = vg_{est} \times vg,$$

wherein error is a value of the attitude direction error;
  Step b4: calculating to obtain an attitude of the gyroscope, wherein the calculation formula is:

$$vg_{new} = vg_{est} + k_p error - best,$$

wherein best is an integral form of error, and $k_p$ is an error proportion coefficient;
  Step b5: updating a quaternion according to the filtered gyroscope angular velocity data $\omega_x$, $\omega_y$, and $\omega_z$:

$$q_0 = q_0 + \dot{q} dt = q_0 + \frac{1}{2}(-\omega_x q_1 - \omega_y q_2 - \omega_z q_3)dt,$$

wherein $\omega_x$, $\omega_y$, and $\omega_z$ are gyroscope measurements;

Step b6: calculating the roll angle and the pitch angle from the updated quaternions.

Figure 30:
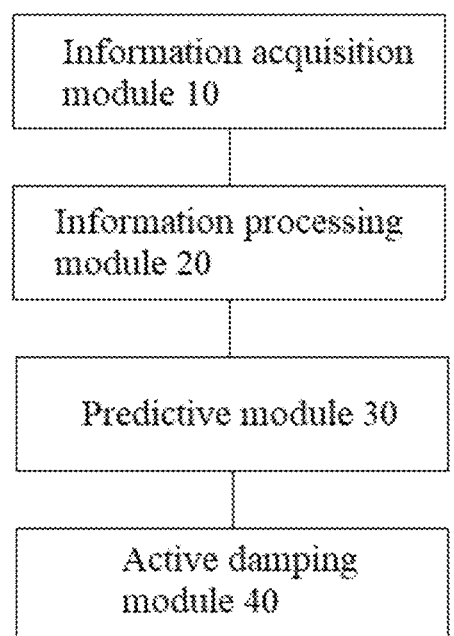
FIG. 30 is a block diagram according to a fourth embodiment of the present invention.

Based on the same technical concept, this embodiment also provides a multi-degree-of-freedom active damping mechanism control system, referring to FIG. 30, including:

an information acquisition module 10 configured to acquire information about a road segment in front of a vehicle in real time via a visual sensor;

an information processing module 20 configured to process the information about the road segment to obtain a time-domain signal curve of the road segment ahead;

a predictive module 30 configured to acquire predicted vibration information about a vehicle chassis according to a predictive model and the time-domain signal curve; and an active damping module 40 configured to send the control instruction in advance to perform active damping according to the predicted vibration information.

Specifically, the information acquisition module 10 is mainly used for acquiring information about the road segment ahead of a vehicle, then processing the information about the road segment via an information processing module 20, and combining necessary parameters such as a vehicle velocity to obtain a time-domain signal curve of the road segment ahead; then, the vibration information of the vehicle chassis at a future time is predicted by a predictive module 30, and finally, active damping is performed by an active damping module 40.

On the basis of this embodiment, the information processing module 20 specifically comprises:

a computer vision sub-module configured to identify the information about the road segment by a computer vision technology;

a road segment information processing sub-module configured to process the information about the road segment according to an identification result of the computer vision sub-module;

specifically, the computer vision sub-module identifies the information about the road segment photographed by a visual sensor through a computer vision technology, and then obtains a time-domain signal curve of the road segment ahead of the vehicle through the information about the road segment processing sub-module in combination with parameters such as a vehicle speed.

On the basis of this embodiment, the active damping module 40 specifically comprises:

a software delay sub-module configured to determine the time required for a software delay;

a mechanical delay sub-module configured to determine the time required for a mechanical delay; and a damping sub-module configured to actively damp vibration according to the time required by the software delay and the mechanical delay.

Specifically, there are two delays in the process of active damping, one is a software-controlled delay determined by a software delay sub-module, and the other is the time of mechanical conduction, and the delay time is determined by a mechanical delay sub-module; and after the total delay time is determined according to the two sub-modules, a control instruction is sent in advance by a damping sub-module to perform active damping.

On the basis of this embodiment, the present invention provides a system further comprising:

Specifically, the multi-dimensional active damping device comprises an inertial navigation unit which can sense the vibration information of the vehicle chassis, and can obtain actual vertical displacement, a pitch angle and a roll angle of the chassis as well as velocity and acceleration information of the corresponding dimension after being processed by a sensing fusion algorithm; and the actual vibration information is compared with the predicted vibration information, and the predictive model is continuously optimized and adjusted to achieve a better use effect.

In this embodiment, a computer vision recognition technology is used for predicting obstacle and fluctuation information of the road segment ahead of the vehicle by the visual sensor and the computer vision technology in advance, to provide sufficient control time for the in-vehicle damping device, and to take into account the delay caused by the mechanical conduction, so that the active damping effect is better than that of the conventional damping device.

The pose information of the vehicle chassis at the future time, including the displacement, velocity and acceleration in vertical, pitch and roll directions, is estimated by analyzing a vehicle dynamics model through the visual predetermined road segment excitation. Thus, multi-dimensional active damping is achieved.

The vehicle pose information predicted by the vehicle dynamics model and the vehicle pose information measured by the inertial navigation unit are fused, and the predictive model of the former is corrected according to the latter information, and the predictive model is continuously optimized.

A person skilled in the art will recognize that the various illustrative elements and steps described in connection with the embodiments disclosed herein can be implemented as electronic hardware, or combinations of computer software and electronic hardware. Whether such functionality is implemented as hardware or software depends upon the particular application and design constraints imposed on the implementation. Skilled artisans may implement the described functionality in varying ways for each particular application, but such implementation decisions should not be interpreted as causing a departure from the scope of the present application.

In the embodiments provided herein, it should be understood that the disclosed method, system, and damping mechanism for controlling a multi-degree-of-freedom active damping mechanism may be implemented in other ways. For example, a multi-degree-of-freedom active damping mechanism control method, system, and damping mechanism embodiment described above is merely illustrative, e.g. the partitioning of the modules or units is merely a logical function partitioning, and may be implemented in additional partitioning, e.g. multiple units or modules may be combined or integrated into another system, or some features may be omitted, or not performed. Alternatively, the communication connections shown or discussed may be communication connections or integrated circuits through some interface, device or unit, which may be electrical, mechanical among others.

The elements described as separate elements may or may not be physically separated, the elements shown as elements may or may not be physical elements, i.e. may be located in one place, or may be distributed over a plurality of network elements. Some or all of the elements may be selected to achieve the objectives of the embodiments according to actual needs.

In addition, each functional unit in various embodiments of the present application may be integrated in one processing unit, may be physically present in a single unit, or may be integrated in one unit by two or more units. The above-mentioned integrated units may be implemented in the form of hardware or in the form of software functional units.

It should be noted that the above-mentioned embodiments illustrate only preferred embodiments of the present invention, and that a person skilled in the art will be able to design many modifications and variations without departing from the spirit and scope of the present invention.

What is claimed is:

1. A multi-degree-of-freedom active damping mechanism control method, comprising steps of:
    step S1: acquiring information about a road segment in front of a carrier in real time via a visual sensor, wherein the carrier comprises a vehicle or a vessel;
    step S2: processing the information about the road segment to obtain a time-domain signal curve of the road segment ahead;
    step S3: acquiring predicted vibration information about the carrier according to a predictive model and the time-domain signal curve; and
    step S4: sending a control instruction in advance to perform active damping according to the predicted vibration information;
    wherein the method is applied to a multi-degree-of-freedom active damping mechanism, wherein an upper platform coordinate system of the multi-degree-of-freedom active damping mechanism relatively moves in three degrees-of-freedom in roll, pitch, and vertical directions with respect to an inertial coordinate system, comprising:
    correcting a load moment of inertia of the multi-degree-of-freedom active damping mechanism in pitch and roll damping directions according to an adaptive control algorithm with a preset adaptation rate to obtain a corrected load moment of inertia;
    calculating an electric cylinder output force in a skyhook active damping control algorithm adopted by the multi-degree-of-freedom active damping mechanism in a vertical damping direction; and
    comprehensively controlling the multi-degree-of-freedom active damping mechanism to perform active damping according to the corrected load moment of inertia and the electric cylinder output force.

2. The multi-degree-of-freedom active damping mechanism control method according to claim 1, wherein
    the step S1 comprises:
        acquiring a maximum field-of-view distance and a minimum field-of-view distance of the visual sensor according to a mounting position of the visual sensor and an advancing direction of the carrier while the carrier is traveling;
        obtaining a field-of-view width of the visual sensor according to the maximum field-of-view distance and the minimum field-of-view distance; and
        acquiring the information about the road segment within the field-of-view width in real time;
    the step S2 comprises:
        processing the information about the road segment by a computer vision technology to identify obstacle information and fluctuation information about the road segment ahead;
        acquiring a longest predictive time according to a velocity of the carrier and the maximum field-of-view distance, wherein the longest predictive time is greater than a delay time of a multi-dimensional active damping device; and
        acquiring the time-domain signal curve of the road segment ahead according to the velocity of the carrier, the longest predictive time, and the obstacle information and the fluctuation information about the road segment;
    the step S3 comprises:
        obtaining, according to a carrier dynamics model, the predicted vibration information within the longest predictive time by combining the time-domain signal curve, wherein the predicted vibration information comprises vertical displacement, a pitch angle, a roll angle and a corresponding velocity and acceleration information of the carrier;
    the step S4 comprises:
        acquiring a delay time of active damping of the multi-dimensional active damping device; and
        sending the control instruction in advance to perform active damping according to the delay time, wherein the delay time comprises a software delay and a mechanical delay.

3. The multi-degree-of-freedom active damping mechanism control method according to claim 1, further comprising, after sending the control instruction in advance to perform active damping according to the predicted vibration information:
    reading actual vibration information about the carrier in real time according to an inertial navigation unit mounted on the carrier; and
    comparing the actual vibration information with the predicted vibration information and adjusting the predictive model.

4. The multi-degree-of-freedom active damping mechanism control method according to claim 3, wherein
    the step of acquiring the pitch angle and the roll angle of the carrier in real time while the carrier is traveling comprises:
        step a1: acquiring the actual vibration information about the carrier; and
        step a2: calculating the pitch angle and the roll angle by an attitude solution algorithm according to the actual vibration information;
        wherein in step a1, the actual vibration information comprises triaxial acceleration information and triaxial angular velocity information, the triaxial acceleration information is detected by a triaxial accelerometer, and the triaxial angular velocity information is detected by a triaxial gyroscope;
    the step a2 comprises the following steps:
        step a2.1: eliminating deviation and noise in the vibration information by a filtering algorithm; and
        step a2.2: performing attitude solution by a complementary filtering algorithm to obtain the pitch angle and the roll angle according to the vibration information obtained after eliminating the deviation and noise;
    wherein the step of performing attitude solution by a complementary filtering algorithm comprises the following steps:
        step b1: calculating a gravity acceleration direction according to the filtered gyroscope data, wherein the calculation formula is:

$$vg_{est} = \begin{bmatrix} 2(q_1 q_3 - q_0 q_1) \\ 2(q_0 q_1 + q_2 q_3) \\ 1 - 2(q_1^2 - q_2^3) \end{bmatrix},$$

wherein q=[$q_0$, $q_1$, $q_2$, $q_3$], q is a unit quaternion, and $q_0$, $q_1$, $q_2$, and $q_3$ are components of the unit quaternion q;

step b2: calculating the gravity acceleration direction according to the filtered acceleration data $a_x$, $a_y$, and $a_z$, wherein the calculation formula is as follows:

$$vg = \frac{1}{\sqrt{a_x^2 + q_y^2 + a_z^2}} \begin{bmatrix} a_x \\ a_y \\ a_z \end{bmatrix},$$

wherein $a_x$, $a_y$ and $a_z$ are accelerations in three directions measured by an accelerometer, and $v_g$ is a value obtained from acceleration normalization;

step b3: calculating an attitude direction error, wherein the calculation formula is:

error=$vg_{est} \times vg$, wherein error is a value of the attitude direction error;

step b4: calculating to obtain an attitude of the gyroscope, wherein the calculation formula is:

$vg_{new}=vg_{est}+k_p$ error–best, wherein best is an integral form of error, and $k_p$ is an error proportion coefficient;

step b5: updating a quaternion in step 1 according to the filtered gyroscope angular velocity data $\omega_x$, $\omega_y$, and $\omega_z$:

$$q_0 = q_0 + qdt = q_0 + \frac{1}{2}(-\omega_x q_1 - \omega_y q_2 - \omega_z q_3)dt,$$

wherein $\omega_x$, $\omega_y$, and $\omega_z$ are gyroscope measurements; and step b6: calculating the roll angle and the pitch angle from the updated quaternions.

5. The multi-degree-of-freedom active damping mechanism control method according to claim 1, wherein the multi-degree-of-freedom active damping mechanism adopts the skyhook active damping control algorithm combined with a double-motor synchronous force control scheme in the vertical damping direction, and a spring damper, a first output electric cylinder and a second actuator are arranged between an upper platform and a lower platform of the multi-degree-of-freedom active damping mechanism;

the step of calculating the electric cylinder output force in the skyhook active damping control algorithm adopted by the multi-degree-of-freedom active damping mechanism in the vertical damping direction comprises:

respectively calculating an electric cylinder output force of the first electric cylinder and an equivalent actuator output force of the second actuator in the skyhook active damping control algorithm;

wherein the step of calculating the electric cylinder output force in the skyhook active damping control algorithm adopted by the multi-degree-of-freedom active damping mechanism in the vertical damping direction comprises: 1) or 2);

1) the formula is as follows:

$F_{di}=-k_s(x_s-x_t)-c_s(\dot{x}_s-\dot{x}_t)+F_a$;

wherein $x_s$ is displacement of the upper platform of the multi-degree-of-freedom active damping mechanism, $x_t$ is displacement of a lower platform of the multi-degree-of-freedom active damping mechanism, $k_s$ is an elastic coefficient of the spring damper, $c_s$ is a damping coefficient of the spring damper, and the equivalent actuator output force is $F_a$;

2) the formula is as follows:

$F_a=-c_{sky}\dot{x}_s$;

wherein $c_{sky}$ is a skyhook damping coefficient.

6. The multi-degree-of-freedom active damping mechanism control method according to claim 1, wherein the step of correcting the load moment of inertia of the multi-degree-of-freedom active damping mechanism in the pitch and roll damping directions according to the adaptive control algorithm with the preset adaptation rate comprises:

presetting an adaptation rate of the adaptive control algorithm as follows:

$u=[j\ddot{\theta}_r+B\dot{\theta}_r+G(\theta)]-K_{D_S}$;

wherein u is an external force applied at a rotational axis of a degree of freedom, $B\dot{\theta}_r$ is a Coriolis force, a centrifugal force, and a viscous friction; $G(\theta)$ is gravity moment and coulomb friction; J is a load moment of inertia at the rotational axis of the degree of freedom, $K_D$ is a velocity error feedback coefficient, and $\ddot{\theta}_r$ and $\dot{\theta}_r$ are a first reference variable and a second reference variable respectively, $s=\dot{\theta}-\dot{\theta}_r$;

the load moment of inertia of the multi-degree-of-freedom active damping mechanism in the pitch and roll damping directions is corrected;

the first reference variable is calculated as follows:

$\dot{\theta}_r=\dot{\theta}_d-\lambda e_\theta$;

the second reference variable is calculated as follows:

$\ddot{\theta}_r=\ddot{\theta}_d-\lambda \dot{e}_\theta$ presetting an adaptive law of the moment of inertia as follows:

$$J = -\frac{\ddot{\theta}_r}{W};$$

wherein W is an adaptive coefficient.

7. The multi-degree-of-freedom active damping mechanism control method according to claim 1, wherein vibration inertia of the multi-degree-of-freedom active damping mechanism in three degrees-of-freedom in roll, pitch, and vertical directions is measured according to an inertial navigation unit respectively provided to the upper and lower platforms of the multi-degree-of-freedom active damping mechanism.

8. The multi-degree-of-freedom active damping mechanism control method according to claim 1, wherein the multi-degree-of-freedom active damping mechanism comprises: an upper platform and a lower platform, wherein centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising:

acquiring pose information about the upper and lower platforms respectively, wherein the pose information comprises a pitch angular velocity, a roll angular velocity, and a vertical velocity;

respectively calculating a spinor equation of a central point of the upper platform, a first articulation point and a second articulation point, wherein the spinor equation comprises a velocity spinor equation and a force spinor equation, the first articulation point is a connection point of the active coupling mechanism and the upper platform, and the second articulation point is a connection point of the active coupling mechanism and the lower platform and a connection point of the passive coupling mechanism and the lower platform;

dynamically modeling the damping mechanism according to the spinor equation to obtain a dynamics model of the damping mechanism;

calculating a control force of the driving mechanism, i.e., an electric cylinder output force, from the pose information of the upper and lower platforms and the dynamics model; and controlling the active coupling mechanism according to the control force to adjust the pose information of the upper platform.

9. The multi-degree-of-freedom active damping mechanism control method according to claim 8, wherein the step of calculating the electric cylinder output force from the pose information and the dynamics model comprises:

calculating a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;

calculating a vertical error value between the lower and upper platforms according to the vertical velocities of the upper and lower platforms, wherein the vertical error value comprises a vertical displacement difference, a vertical velocity difference and a vertical acceleration difference; and substituting the pitch angle difference, the roll angle difference, the pitch angular velocity difference, the roll angular velocity difference, the pitch angle acceleration difference, the roll angle acceleration difference, and the vertical error value into the dynamics model to calculate to obtain the electric cylinder output force;

the step of calculating the pitch angle difference, the roll angle difference, the pitch angular velocity difference, the roll angular velocity difference, the pitch angle acceleration difference, and the roll angle acceleration difference between the lower and upper platforms according to the pitch angular velocity and the roll angular velocity of the upper and lower platforms comprises:

calculating a pitch angle and a roll angle of the upper and lower platforms and a pitch angle acceleration and a roll angle acceleration of the lower platform according to the pitch angular velocity and the roll angular velocity of the upper and lower platforms;

calculating the pitch angle difference, the roll angle difference, the pitch angular velocity difference and the roll angular velocity difference between the upper platform and the lower platform according to the pitch angle, the roll angle, the pitch angular velocity and the roll angular velocity of the upper and lower platforms;

calculating the pitch angle acceleration difference between the upper platform and the lower platform using a proportional integral (PI) control algorithm according to the pitch angle acceleration, the pitch angle, and the pitch angle acceleration of the lower platform; and calculating the roll angle acceleration difference between the upper platform and the lower platform using the PI control algorithm according to the roll angle acceleration, the roll angle, and the roll angular velocity of the lower platform;

the step of calculating the vertical error value between the lower and upper platforms according to the vertical velocities of the upper and lower platforms comprises:

calculating vertical displacement of the upper and lower platforms and a vertical acceleration of the lower platform according to the vertical velocities of the upper and lower platforms;

calculating the vertical displacement difference and the vertical velocity difference between the lower and upper platforms according to the vertical velocities and the vertical displacement of the upper and lower platforms; and calculating the vertical acceleration difference between the lower and upper platforms using a skyhook damping control algorithm according to the vertical acceleration of the lower platform, the vertical velocity of the upper platform, the vertical displacement difference, and the vertical velocity difference.

10. The multi-degree-of-freedom active damping mechanism control method according to claim 8, wherein the step of dynamically modeling the damping mechanism according to the spinor equation to obtain the dynamics model of the damping mechanism comprises:

dynamically modeling the damping mechanism according to the following formula:

$$\dot{q}^T(F - F_f)\delta t + \left[\sum_{i=1}^{4}(T_{P_i}^T W_{P_i}) + \sum_{i=1}^{5}(T_{D_i}^T W_{D_i}) + T_P^T W_P\right]\delta t = 0;$$

wherein $\dot{q}$ is a driving linear velocity of the coupling mechanism, F is an electric cylinder output force vector, $F_f$ is an electric cylinder friction vector, $T_{P_i}$ is a velocity spinor of the first articulation point, $W_{P_i}$ is a force spinor of the first articulation point, $T_{D_i}$ is a velocity spinor of the second articulation point, $W_{D_i}$ is a force spinor of the second articulation point, $T_P$ is a velocity spinor of the central point of the upper platform, and $W_P$ is a force spinor of the central point of the upper platform; and obtaining the dynamics model of the damping mechanism by combining an inverse Jacobian matrix according to the formula.

11. The multi-degree-of-freedom active damping mechanism control method according to claim 8, wherein the step of respectively calculating the spinor equation of the central point of the upper platform, the first articulation point and the second articulation point comprises:

establishing a satellite coordinate system according to a central point of the lower platform;

calculating the velocity spinor equation of the central point of the upper platform according to the velocity and angular velocity of the central point of the upper platform;

calculating the force spinor equation of the central point of the upper platform according to a unit vector in a telescopic direction of the passive coupling mechanism and the acceleration, angular velocity and angular acceleration of the central point of the upper platform;

calculating an angular velocity and a driving linear velocity of the active coupling mechanism according to a unit vector in a telescopic direction of the active coupling mechanism, the velocity of the central point of the upper platform, the angular velocity of the central point of the upper platform, and coordinates of the first articulation point in the satellite coordinate system;

calculating an angular acceleration of the active coupling mechanism according to the angular velocity and the driving linear velocity of the active coupling mechanism and the acceleration of the central point of the upper platform;

calculating the velocity spinor equations of the first articulation point and the second articulation point according to a velocity of the first articulation point and the angular velocity of the active coupling mechanism; and calculating a force spinor equation of the first articulation point and the second articulation point from an acceleration of the first articulation point, the angular velocity of the active coupling mechanism, the angular acceleration of the active coupling mechanism, the unit vector in the telescopic direction of the active coupling mechanism, and a mass parameter of the damping mechanism.

12. The multi-degree-of-freedom active damping mechanism control method according to claim 8, wherein after the controlling the active coupling mechanism according to the control force to adjust the pose information of the upper platform, the multi-degree-of-freedom active damping mechanism control method further comprises:

acquiring current pose information about the upper platform in real time; and adjusting the electric cylinder output force according to the pose information of the lower platform and the current pose information.

13. The multi-degree-of-freedom active damping mechanism control method according to claim 1, comprising steps of:

S100: performing kinematic and dynamic analysis on a multi-dimensional damping device, establishing a linear dynamics equation near an equilibrium point, and establishing a predictive model according to the linear dynamics equation;

S200: estimating an output quantity of a predictive time domain by controlling a control quantity of the time-domain according to the predictive model, setting an optimization objective according to a control objective that the output quantity of the predictive time domain is close to an expected trajectory, setting constraints, and determining an optimization problem of the control quantity;

S300: determining the expected trajectory according to pose information about the carrying device at time t;

S400: solving the optimization problem to determine an optimal control quantity sequence, and taking a first value in the optimal control quantity sequence as an actual control quantity at the current moment to control the multi-dimensional damping device; and S500: t=t+1, returning to S300.

14. The multi-degree-of-freedom active damping mechanism control method according to claim 13, wherein the linear dynamics equation near the equilibrium point in S100 is:

$$M_0\ddot{\varphi}+C_0\dot{\varphi}+K_0\varphi=J_0^T u$$

wherein $\varphi$ is a task space coordinate, $\dot{\varphi}$ is a task space velocity, $M_0$ is a task space mass matrix at the equilibrium point, $C_0$ is a task space damping matrix at the equilibrium point, $K_0$ is a task space stiffness matrix at the equilibrium point, $J_0$ is a Jacobian matrix at the equilibrium point, and u is a control force;

the predictive model established according to the linear dynamics equation is:

$$Y_p(t+1|t)=S_x\Delta x(t)+S_y y(t)+S_u\Delta U_m(t)$$

wherein $Y_p(t+1|t)$ is an output sequence vector for predicting N future moments at time t, $\Delta U_m(t)$ is an input sequence vector for predicting m future moments at time t, and, $S_x$, $S_y$, and $S_u$ are parameter matrixes;

the step of estimating the output quantity of the predictive time domain by controlling the control quantity of the time-domain according to the predictive model, and setting the optimization objective according to the control objective that the output quantity of the predictive time domain is close to the expected trajectory in S200 comprises:

S201: determining the optimization objective as $$J(x(t),\Delta U_m(t)=\|\Gamma_y[Y_p(t+1|t)-R(t+1)]\|^2+\|\Gamma_u\Delta U_m(t)\|^2$$

wherein R(t+1) is an expected trajectory point vector; $\Gamma_y$ is an output weight matrix; and $\Gamma_u$ is an input weight matrix;

S202: obtaining an equivalent objective value of the optimization objective according to the predictive model as follows:

$$\bar{J}(x(t),\Delta U_m(t))=\Delta U_m(t)^T H\Delta U_m(t)+G(t+1|t)^T\Delta U_m(t)$$

wherein $$H=S_u^T\Gamma_y^T\Gamma_y S_u+\Gamma_u^T\Gamma_u$$

$$G(t+1|t)=2S_u^T\Gamma_y^T\Gamma_y[Y_p(t+1|t)-R(t+1)]$$

the constraints include, but are not limited to, travel limits, motion space limits, and execution mechanism power/output limits;

the optimization problem is determined as $$\min_{\Delta U_m(t)} \Delta U_m(t)^T H\Delta U_m(t) + G(t+1\,|\,t)^T\Delta U_m(t) \text{ s.t. } L\Delta U_m(t) \le b$$

the step of determining the expected trajectory according to pose information about the carrying device at time t in S300 comprises:

measuring the pose information of the carrying device at time t using the inertial navigation unit, taking the position and velocity in the corresponding dimension of the damping device task space as an input pose quantity $r_{In}$, and setting the expected trajectory as $r(t)=-r_{In}$;

after the measuring the pose information of the carrying device at time t using the inertial navigation unit, the multi-degree-of-freedom active damping mechanism control method further comprises: filtering the obtained pose information by a multi-sensor perception fusion algorithm.

15. A multi-degree-of-freedom active damping mechanism control system, comprising:

an information acquisition module configured to acquire information about a road segment in front of a carrier in real time via a visual sensor;

an information processing module configured to process the information about the road segment to obtain a time-domain signal curve of the road segment ahead;
a predictive module configured to acquire predicted vibration information about a carrier according to a predictive model and the time-domain signal curve;
an active damping module configured to send the control instruction in advance to perform active damping according to the predicted vibration information;
a correction module configured to acquire actual vibration information about the carrier and adjusting the predictive model;
wherein the information processing module comprises:
  a computer vision sub-module configured to identify the information about the road segment by a computer vision technology; and
  a road segment information processing sub-module configured to process the information about the road segment according to an identification result of the computer vision sub-module;
the active damping module comprises:
  a software delay sub-module configured to determine a time required for a software delay;
  a mechanical delay sub-module configured to determine a time required for a mechanical delay; and
  a damping sub-module configured to actively damp vibration according to the time required for the software delay and the time required for the mechanical delay.

16. The multi-degree-of-freedom active damping mechanism control system according to claim 15, applied to a multi-degree-of-freedom active damping mechanism, wherein an upper platform coordinate system of the multi-degree-of-freedom active damping mechanism relatively moves in three degrees-of-freedom in roll, pitch, and vertical directions with respect to an inertial coordinate system, and the multi-degree-of-freedom active damping mechanism control system comprises:
  a correction module configured to correct a load moment of inertia of the multi-degree-of-freedom active damping mechanism in pitch and roll damping directions according to an adaptive control algorithm with a preset adaptation rate to obtain a corrected load moment of inertia;
  a calculation module configured to calculate an electric cylinder output force in a skyhook active damping control algorithm adopted by the multi-degree-of-freedom active damping mechanism in a vertical damping direction; and
  a control module configured to be respectively connected to the correction module and the calculation module, and comprehensively control the multi-degree-of-freedom active damping mechanism to perform active damping according to the corrected load moment of inertia and the electric cylinder output force.

17. The multi-degree-of-freedom active damping mechanism control system according to claim 15, wherein the multi-degree-of-freedom active damping mechanism comprises: an upper platform and a lower platform, wherein centers of the upper and lower platforms are connected via a passive coupling mechanism, the upper platform is fixedly connected to the passive coupling mechanism, the lower platform is movably connected to the passive coupling mechanism, and all four corners of the upper and lower platforms are movably connected via an active coupling mechanism, and the active coupling mechanism is driven by a driving mechanism, comprising:
  a first acquisition module configured to acquire pose information about the upper and lower platforms respectively, wherein the pose information comprises a pitch angular velocity, a roll angular velocity, and a vertical velocity;
  a first calculation module configured to respectively calculate a spinor equation of a central point of the upper platform, a first articulation point and a second articulation point, wherein the spinor equation comprises a velocity spinor equation and a force spinor equation, the first articulation point is a connection point of the driving mechanism and the upper platform, and the second articulation point is a connection point of the driving mechanism and the lower platform and a connection point of the passive coupling mechanism and the lower platform;
  a second acquisition module configured to dynamically model the damping mechanism according to the spinor equation to obtain a dynamics model of the damping mechanism;
  a second calculation module configured to calculate the electric cylinder output force according to the pose information of the upper and lower platforms and the dynamics model; and
  an adjustment module configured to control the active coupling mechanism according to the control force to adjust the pose information of the upper platform;
wherein the second calculation module comprises:
  a first calculation sub-module configured to calculate a pitch angle difference, a roll angle difference, a pitch angular velocity difference, a roll angular velocity difference, a pitch angle acceleration difference, and a roll angle acceleration difference between the lower and upper platforms according to the pitch angular velocity and the roll angular velocity of the upper and lower platforms;
  a second calculation sub-module configured to calculate a vertical error value between the lower and upper platforms according to the vertical velocities of the upper and lower platforms, wherein the vertical error value comprises a vertical displacement difference, a vertical velocity difference and a vertical acceleration difference; and
  a third calculation sub-module configured to substitute the pitch angle difference, the roll angle difference, the pitch angular velocity difference, the roll angular velocity difference, the pitch angle acceleration difference, the roll angle acceleration difference, and the vertical error value into the dynamics model to calculate to obtain the electric cylinder output force;
the first calculation sub-module comprises:
  a first calculation unit configured to calculate a pitch angle and a roll angle of the upper and lower platforms and a pitch angle acceleration and a roll angle acceleration of the lower platform according to the pitch angular velocity and the roll angular velocity of the upper and lower platforms;
  a second calculation unit configured to calculate the pitch angle difference, the roll angle difference, the pitch angular velocity difference and the roll angular velocity difference between the upper platform and the lower platform according to the pitch angle, the roll angle, the pitch angular velocity and the roll angular velocity of the upper and lower platforms;
  a third calculation unit configured to calculate the pitch angle acceleration difference between the upper platform and the lower platform using a proportional integral (PI) control algorithm according to the pitch angle acceleration, the pitch angle, and the pitch angle acceleration of the lower platform; and the third calculation unit is further configured to calculate the roll angle acceleration difference between the upper platform and the lower platform using the PI control algorithm according to the roll angle acceleration, the roll angle, and the roll angular velocity of the lower platform;

the second calculation sub-module comprises:

a fourth calculation unit configured to calculate vertical displacement of the upper and lower platforms and a vertical acceleration of the lower platform according to the vertical velocities of the upper and lower platforms;

a fifth calculation unit configured to calculate the vertical displacement difference and the vertical velocity difference between the lower and upper platforms according to the vertical velocities and the vertical displacement of the upper and lower platforms; and a sixth calculation unit configured to calculate the vertical acceleration difference between the lower and upper platforms using a skyhook damping control algorithm according to the vertical acceleration of the lower platform, the vertical velocity of the upper platform, the vertical displacement difference, and the vertical velocity difference.

18. The multi-degree-of-freedom active damping mechanism control system according to claim 15, comprising:

a model establishment module configured to perform kinematic and dynamic analysis on a multi-dimensional damping device, establish a linear dynamic equation near an equilibrium point, and establish a predictive model according to the linear dynamics equation;

an optimization module configured to estimate an output quantity of a predictive time domain by controlling the control quantity of the time-domain according to the predictive model, setting an optimization objective according to a control objective that the output quantity of the predictive time domain is close to an expected trajectory, setting constraints, and determining an optimization problem of the control quantity;

a measurement module configured to determine the expected trajectory according to pose information about the carrying device at time t; and a control module configured to solve the optimization problem to determine an optimal control quantity sequence, and take a first value in the optimal control quantity sequence as an actual control quantity at the current moment to control the multi-dimensional damping device.

19. A multi-degree-of-freedom active damping mechanism, wherein the multi-degree-of-freedom active damping mechanism has an upper platform coordinate system relatively movable in three degrees-of-freedom in roll, pitch, and vertical directions with respect to an inertial coordinate system, comprising a processor, a memory and a computer program stored in the memory and operable on the processor, wherein the processor is configured for executing the computer program stored on the memory to implement operations performed by the multi-degree-of-freedom active damping mechanism control method according to claim 1;

the multi-degree-of-freedom active damping mechanism comprises:

a lower platform fixed on a carrying device;

an inertial navigation unit mounted on the lower platform for measuring pose information about the carrying device; and a robot mechanism comprising a control unit, an execution unit, and an encoder, wherein the control unit is electrically connected to the inertial navigation unit, the control unit comprises a memory for storing a control program and a processor for loading and executing the control program to implement the multi-degree-of-freedom active damping mechanism control method according to claim 1;

the execution unit is electrically connected to the control unit and is used for executing an operation according to a control instruction of the control unit; and the encoder is electrically connected to the control unit and the execution unit for detecting an actual execution condition of the execution unit and feeding back the actual execution condition of the execution unit to the control unit; and an upper platform connected to a base via the robot mechanism for carrying a person or an object.

* * * * *